United States Patent [19]

Umeno et al.

[11] Patent Number: 5,412,584
[45] Date of Patent: May 2, 1995

[54] DYNAMIC SYSTEM DIAGNOSING APPARATUS, TIRE AIR PRESSURE DIAGNOSING APPARATUS AND VEHICLE BODY WEIGHT CHANGE DETECTING APPARATUS USING SAME

[75] Inventors: Takaji Umeno, Aichi; Katsuhiro Asano, Toyoake; Norio Iwama, Aichi, all of Japan

[73] Assignee: Kabushiki Kaisha Toyota Chuo Kenkyusho, Aichi, Japan

[21] Appl. No.: 159,196

[22] Filed: Nov. 30, 1993

[30] Foreign Application Priority Data

Nov. 30, 1992 [JP] Japan ................................. 4-345362
Jul. 15, 1993 [JP] Japan ................................. 5-197828

[51] Int. Cl.⁶ .......................................... G06F 15/20
[52] U.S. Cl. ..................................... 364/558; 364/550
[58] Field of Search ..................... 364/424.01, 424.05, 364/550, 558

[56] References Cited

U.S. PATENT DOCUMENTS

| | | | |
|---|---|---|---|
| 4,063,311 | 12/1977 | Jeremiah et al. | 364/184 X |
| 5,023,045 | 6/1991 | Watanabe et al. | 364/184 X |
| 5,041,976 | 8/1991 | Marko et al. | 364/424.03 |
| 5,107,447 | 4/1992 | Ozawa et al. | 364/551.01 |
| 5,214,595 | 5/1993 | Ozawa et al. | 364/551.01 |

FOREIGN PATENT DOCUMENTS 63-22707 1/1988 Japan.

OTHER PUBLICATIONS

*The Aion Product Series*—Aion Corporation—Pamphlet (approximately 1986).
*INRECA—Induction and Reasoning From Cases*—Pamphlet (approximately Aug. 1993).
*The Cure For The Common Call*—Inference Corporation—Pamphlet (approximately Jan. 1994).
*CBR Express TM and Casepoint TM—Solutions From Experience*—Inference Corporation—Pamphlet (approximately 1993).
*In the Crowded Help Desk Software Marketplace, Top Of Mind is Unique*—The Molloy Group—Pamphlet (approximately Jul. 1993).

*Primary Examiner*—Edward R. Cosimano
*Attorney, Agent, or Firm*—Oblon, Spivak, McClelland, Maier & Neustadt

[57] ABSTRACT

A diagnosing apparatus for diagnosing a dynamic system by detecting a fault of the dynamic system. The diagnosing apparatus comprises: disturbance estimating means for estimating an integrated disturbance vector, which is the sum of external and internal disturbance vectors of the dynamic system, based on an internal state vector of the dynamic system; correlation calculating means for calculating a cross-correlation between the estimated integrated disturbance vector and the internal state vector and for separating from the integrated disturbance a component relating to the internal disturbance; and diagnosing means for specifying a corresponding fault portion of the dynamic system from the separated component relating to the internal disturbance.

30 Claims, 38 Drawing Sheets $x = \begin{bmatrix} x_2, \dot{x}_2, y, \dot{y}, f \end{bmatrix}^T$

FAULTY PORTION

1  $k_1$
2  $k_2$   } CHANGE ⟶ INTERVAL DISTURBANCE w
3  $D_m$

DYNAMIC SYSTEM DIAGNOSING APPARATUS, TIRE AIR PRESSURE DIAGNOSING APPARATUS AND VEHICLE BODY WEIGHT CHANGE DETECTING APPARATUS USING SAME

BACKGROUND OF THE INVENTION

1. Field of the Invention

This invention relates to a dynamic system diagnosing apparatus, and a tire air pressure diagnosing apparatus and a vehicle body weight change detecting apparatus using the dynamic system diagnosing apparatus. More particularly the invention relates to a diagnosing apparatus for estimating a fault in terms of disturbance generated in a dynamic system to diagnose fault in a dynamic system, to detect an abnormality of a tire air pressure or to detect a change of a vehicle body weight, and also to a tire air pressure diagnosing apparatus and a vehicle body weight change detecting apparatus using such diagnosing apparatus.

2. Description of the Related Art

An apparatus for diagnosing a fault of a dynamic system is currently known. The diagnosing apparatus discriminates the presence/absence of the fault and the fault portion using a residual between the dynamic system's response estimated from a normal model of the dynamic system and the actual response measured by a sensor.

This conventional art is exemplified by "A Generalized Likelihood Ratio Approach to Detection and Estimation of Jumps in Linear Systems" by A.S. Willskey & H.L. Jones, IEEE Trans. AC-21, No. 1.

FIG. 7 shows a fault diagnosing apparatus 20 embodying this method. The fault diagnosing apparatus diagnoses a dynamic system 10 to be controlled based on a control input 14 from a controller 12. In FIG. 7, reference characters u and d designate a control input vector and an external disturbance vector, respectively, which are to be inputted to the dynamic system 10. The symbol y is a control output of the dynamic system 10, and x is an internal state vector of the dynamic system 10 measured using a sensor.

The fault diagnosing apparatus 20 comprises a normal model observer 22, a number of fault model observers 24-1, 24-2, . . . , 24-n, likelihood ratio detecting and estimating parts 26-1, 26-2, . . . , 26-n situated so as to correspond to the respective fault model observers, and a fault discriminating part 28.

The normal model observer 22 estimates the quantity of state of the dynamic system 10 based on the normal model from the control input vector u and the control output vector y of the dynamic system 10 and outputs an estimation output signal 23. A residual 25 between the estimation output signal 23 and the state vector x of the dynamic system 10, which is actually measured by a sensor, is inputted to the likelihood ratio detecting and estimating parts 26-1, 26-2, . . . , 26-n.

Each fault model observer 24-1, 24-2, . . . , 24-n estimates and calculates the state of the dynamic system 10 based on the respective different fault model. Residuals 29-1, 29-2, . . . , 29-n between estimation outputs 27-1, 27-2, . . . , 27-n of the respective fault model observer 24-1, 24-2, . . . , 24-n and state x of the dynamic system 10 actually measured are inputted to the corresponding likelihood ratio detecting and estimating parts 26-1, 26-2, . . . , 26-n.

Each likelihood ratio detecting and estimating part 26-1, 26-2, . . . , 26-n calculates a probability (likelihood ratio) of the corresponding model matching with the present dynamic system 10, from the residual signals 25 and 29 from the normal model observer 22 and the fault model observer 24, respectively. The result of this calculation will be outputted to the fault discriminating part 28.

Thus each likelihood ratio detecting and estimating part 26-1, 26-2, . . . , 26-n calculates the likelihood ratio of the respective model matching with the present dynamic system 10, for every assumed fault model. The fault discriminating part 28 determines the fault model of the maximum likelihood ratio from the input signal, thereby discriminating the occurence of a fault of the dynamic system 10 and a fault portion.

However, the conventional apparatus 20 has the following problems:

Firstly, this conventional apparatus 20 obtains a model which corresponds to the fault, from the residuals 25, 29 between the states 23, 27 estimated by the observers 22, 24 and the actually measured value x. This residual is considerably dependent on the design of the observer; the higher the rate of detecting the state of the observer (fault detecting rate), the smaller the residual so that the fault detection sensitivity will be lowered.

In a noisy system in particular, only a large and sudden fault can be detected.

With the conventional apparatus, it is complex in calculating the likelihood ratio for fault detection. Besides, this calculation must take place for each fault model. Consequently the calculation quantity would be extremely so that the conventional apparatus could not cope with diagnosis in real time.

Further, if even a single quantity of internal state x of the dynamic system 10 to be diagnosed could not be measured, it would be impossible to detect and specify the internal fault of the diagnosing object. Namely, the quantity of internal state x of the dynamic system 10 is detected as a state vector composed of a number of elements. Therefore, if even a single element of the state vector x could be be measured, it would be impossible to detect or specify the internal fault of the diagnosing object.

Furthermore, the conventional apparatus does not utilize the concept of separating an external disturbance d, which is to penetrate from an external source, from an internal disturbance, which is generated due to the internal fault. Therefore the measuring accuracy tends to be influenced by the external disturbance.

SUMMARY OF THE INVENTION

It is therefore an object of this invention to provide a dynamic system diagnosing apparatus which can specify a fault portion of a dynamic system to perform an accurate diagnosis using a smaller calculation quantity and, without requiring many observers corresponding to a number of portions to be diagnosed.

Another object of the invention is to provide a tire air pressure diagnosing apparatus, for a dynamic system constituted by a suspension and a wheel, which can diagnose a tire air pressure of the wheel simply and accurately.

Still another object of the invention is to provide a vehicle body weight change detecting apparatus for detecting a change in vehicle body weight of a dynamic system constituted by a suspension and a wheel.

(1) Dynamic System Diagnosing Apparatus

According to a first aspect of the invention, there is provided a diagnosing apparatus for diagnosing a dynamic system by detecting a fault of the dynamic system, comprising:

disturbance estimating means for estimating an integrated disturbance vector, which is the sum of external and internal disturbance vectors of the dynamic system, based on an internal state vector of the dynamic system;

correlation calculating means for calculating a cross-correlation between the estimated integrated disturbance vector and the internal state vector and for separating from the integrated disturbance a component relating to the internal disturbance; and diagnosing means for specifying a corresponding fault portion of the dynamic system from the separated component relating to the internal disturbance and for making a diagnosis.

Preferably, the correlation calculating means is designed so as to calculate a cross-correlation between an element of the integrated disturbance vector and an element of the internal state vector uncorrelated with the external disturbance vector and so as to separate from the element of the integrated disturbance vector a component relating to the internal disturbance.

Alternatively, the correlation calculating means may be designed so as to execute the calculation of a direction vector of the integrated disturbance, having the internal state vector as a base vector, in such a manner that the time-related sum of the square of an error between the integrated disturbance vector and the product of the internal disturbance vector and the internal state vector is minimal and so as to separate from the element of the integrated disturbance vector a component relating to the internal disturbance.

In another alternative form, the correlation calculating means may be designed so as to calculate a cross-correlation between a plurality of elements of the estimated integrated disturbance vector and an element uncorrelated with the external disturbance of the internal state vector and so as to separate, from the elements of the integrated desturbance vector, elements of components relating to the internal disturbance. The diagnosing means may be designed so as to specify the fault portion of the dynamic system from the elements of the separated component relating to the internal disturbances.

Preferably, the diagnosing means includes: a memory part in which a predetermined fault detecting standard value corresponding to each element of the component relating to the internal disturbance is stored; and a fault specifying part for comparing each element of the separated component relating to the internal disturbance with the corresponding fault detecting standard value and for specifying the fault portion of the dynamic system.

Preferably the diagnosing apparatus further comprises a sensor for measuring all or part of the elements of the internal state vector of the dynamic system.

The disturbance estimating means may be designed so as to estimate and calculate all or part of the elements of the internal state vector of the dynamic system.

FIG. 1 shows a dynamic system diagnosing apparatus 30 according to the first invention. The dynamic system 10 to be diagnosed by the diagnosing apparatus 30 is controlled based on a control input 14 from a controller 12. In the dynamic system 10, the internal state varies based on the control input 14 and an external disturbance 15 inputted from an external source, so that a control output 16 will vary. The controller 12 controls the dynamic system 10 using the control output 16 as a feedback signal.

The dynamic system 10 has a number n of quantity of internal state (i.e., the degree of the system is n). u represents a control input vector 14 to the system 10 which vector is composed of a number m of elements. y represents a control output vector 16 composed of a number p of elements to be outputted from the system 10. d represents an external disturbance vector 15 composed of the number n of elements equal to the degree of the dynamic system 10.

The diagnosing apparatus 30 comprises a disturbance estimating means 32, a correlation calculating means 34 and a diagnosing means 36, and detects a fault of the dynamic system 10 as an internal disturbance.

The disturbance estimating means 32 estimates an integrated disturbance vector w, which is the sum of the external disturbance vector d and an internal disturbance vector of the dynamic system 10, based on an internal state vector of the dynamic system 10 (vector composed of elements representing the quantity of internal state of the dynamic system 10), and outputs the integrated disturbance vector w to the correlation calculating means 34.

In FIG. 1, the control output vector y of the dynamic system 10 is inputted to the disturbance estimating means 32. The disturbance estimating means 32 estimates and calculates an internal state vector x of the dynamic system 10 from the control output vector y, and outputs the calculated vector x to the correlation calculating means 34. This estimating and calculating will take place if the control output vector y contains information which can calculate the individual elements of the internal state vector x. The estimating and calculating of the above-mentioned internal state vector x will take place simultaneously with the estimating of the integrated disturbance vector w. Specifically, a new quantity of state composed of the integrated disturbance vector w and the quantity of state x expressed by Formula 8 is obtained as calculated according to the conventional linear control theory (e.g., "Introduction to Linear System Theory" written by Furuta & Sano, issued 1978 from Corona Co., Ltd, pp. 127-137).

If the information quantity contained in the control output vector y does not suffice to estimate the internal state vector, a sensor for detecting a quantity of internal state may be mounted in the dynamic system 10 so that its output will be inputted to the disturbance estimating means 32.

Further, if information about every internal state vector x can be obtained directly from the control output vector y of the dynamic system 10 or, if necessary, from the quantity of internal state sensor in the dynamic system 10, the quantity of internal state x is output directly to the correlation calculating means 34.

The correlation calculating means 34 calculates a cross-correlation between each element of the estimated integrated disturbance vector w and the element of the internal state vector x, and separates from each element of the integrated disturbance vector w a component relating to the internal disturbance. The separated component relating to the internal disturbance is then outputted to the diagnosing means 36.

The diagnosing means 36 is designed so as to specify the fault portion of the dynamic system 10 from the separated component relating to the internal disturbance and to obtain its state.

Preferably, the correlation calculating means 34 is designed so as to calculate a cross-correlation for the plural elements of the integrated disturbance vector w and to separate from the plural elements of the integrated disturbance vector w the component relating to the internal disturbance.

Each element of the separated component relating to the internal disturbance corresponds to the respective fault portion generated in the dynamic system 10. Therefore the diagnosing means 36 can specify the occurence of a fault in the dynamic system 10 and its fault portion from each element of the separated component relating to the internal disturbance.

In this case, the diagnosing means 36 is designed so as to preferably include a memory part 40 in which a fault detecting standard value corresponding to each element of the component relating to the internal disturbance is previously stored, and a fault specifying part 38 for comparing the element of the separated component relating to the internal disturbance with the corresponding fault detecting standard value and specifying the fault portion of the dynamic system 10.

The operation of the diagnosing apparatus according to the first embodiment of the invention will now be described.

First of all, the operation of the disturbance estimating means 32 will be described.

When a fault occurs in the dynamic system 10 to be diagnosed, the quantity of internal state of the diagnosing object shows a response different from that under a normal condition. In other words, this response can be regarded as a composition of a response under the normal condition and a kind of disturbance corresponding to the fault. This is an internal disturbance generated in the diagnosing object 10 as opposed to an external one from outside the diagnosing object 10. The disturbance estimating means 32 estimates the internal disturbance, which occurs due to the fault, as an integrated disturbance w which is the sum of the internal disturbance and the external disturbance.

The disturbance estimation principle of the disturbance estimating means 32 will now be described.

It is assumed that the dynamic system 10 is expressed by the following equation:

[Formula 1]

$$\dot{x}(t) = Ax(t) + Bu(t) + d(t)$$

$$y(t) = Cx(t)$$

where $x(t)$ is an internal state vector of the dynamic system 10 to be diagnosed, $u(t)$ is a control input vector, $y(t)$ is a control output vector, and $d(t)$ is an external disturbance vector. Each of matrices A, B and C is a constant matrix (parameters of the system to be diagnosed) to be determined by the structure of the diagnosing object.

Therefore [Formula 1] can be expressed by the following equation:

[Formula 2]

$$\frac{d}{dt}\begin{pmatrix} x_1 \\ x_2 \\ \vdots \\ x_n \end{pmatrix} = \begin{pmatrix} a_{11} & a_{12} & \cdots & a_{1n} \\ a_{21} & a_{22} & \cdots & a_{2n} \\ \vdots & & & \vdots \\ a_{n1} & a_{n2} & \cdots & a_{nn} \end{pmatrix}\begin{pmatrix} x_1 \\ x_2 \\ \vdots \\ x_n \end{pmatrix} +$$

$$\begin{pmatrix} b_{11} & b_{12} & \cdots & b_{1m} \\ b_{21} & b_{22} & \cdots & b_{2m} \\ \vdots & & & \vdots \\ b_{n1} & b_{n2} & \cdots & b_{nm} \end{pmatrix}\begin{pmatrix} u_1 \\ u_2 \\ \vdots \\ u_m \end{pmatrix} + \begin{pmatrix} d_1 \\ d_2 \\ \vdots \\ d_n \end{pmatrix}$$

$$\begin{pmatrix} y_1 \\ y_2 \\ \vdots \\ y_p \end{pmatrix} = \begin{pmatrix} c_{11} & c_{12} & \cdots & c_{1n} \\ c_{21} & c_{22} & \cdots & c_{2n} \\ \vdots & & & \vdots \\ c_{p1} & c_{p2} & \cdots & c_{pn} \end{pmatrix}\begin{pmatrix} x_1 \\ x_2 \\ \vdots \\ x_n \end{pmatrix}$$

The diagnosing object 10 having a fault can be equivalently expressed using changes of the matrices A and B (changes of parameters). In other words, assuming that matrices A and B change by $\Delta A(t)$ and $\Delta B(t)$, respectively, the diagnosing object after fault, i.e., the dynamic system 10 after fault can be expressed by the following equation:

[Formula 3]

$$\begin{aligned}\dot{x}(t) &= Ax(t) + Bu(t) + (\Delta A(t)x(t) + \Delta B(t)u(t) + d(t)) \\ &= Ax(t) + Bu(t) + Dw(t)\end{aligned}$$

Where $Dw(t)$ can be expressed by the following equation:

[Formula 4]

$$Dw(t) = \Delta A(t)x(t) + \Delta B(t)u(t) + d(t)$$

Matrix D shows which route of the diagnosing object 10 a disturbance resulting from the fault has occurred in, and is determined according to the route of penetration of the external disturbance and to the assumed fault.

Formulae 3 and 4 can be expressed by the following general determinants:

[Formula 5]

$$\frac{d}{dt}\begin{pmatrix} x_1 \\ x_2 \\ \vdots \\ x_n \end{pmatrix} = \begin{pmatrix} a_{11} & a_{12} & \cdots & a_{1n} \\ a_{21} & a_{22} & \cdots & a_{2n} \\ \vdots & & & \vdots \\ a_{n1} & a_{n2} & \cdots & a_{nn} \end{pmatrix}\begin{pmatrix} x_1 \\ x_2 \\ \vdots \\ x_n \end{pmatrix} +$$

$$\begin{pmatrix} b_{11} & b_{12} & \cdots & b_{1m} \\ b_{21} & b_{22} & \cdots & b_{2m} \\ \vdots & & & \vdots \\ b_{n1} & b_{n2} & \cdots & b_{nm} \end{pmatrix} \begin{pmatrix} u_1 \\ u_2 \\ \vdots \\ u_m \end{pmatrix} +$$

$$\begin{pmatrix} \Delta a_{11} & \Delta a_{12} & \cdots & \Delta a_{1n} \\ \Delta a_{21} & \Delta a_{22} & \cdots & \Delta a_{2n} \\ \vdots & & & \vdots \\ \Delta a_{n1} & \Delta a_{n2} & \cdots & \Delta a_{nn} \end{pmatrix} \begin{pmatrix} x_1 \\ x_2 \\ \vdots \\ x_n \end{pmatrix} +$$

$$\begin{pmatrix} \Delta b_{11} & \Delta b_{12} & \cdots & \Delta b_{1m} \\ \Delta b_{21} & \Delta b_{22} & \cdots & \Delta b_{2m} \\ \vdots & & & \vdots \\ \Delta b_{n1} & \Delta b_{n2} & \cdots & \Delta b_{nm} \end{pmatrix} \begin{pmatrix} u_1 \\ u_2 \\ \vdots \\ u_n \end{pmatrix} + \begin{pmatrix} d_1 \\ d_2 \\ \vdots \\ d_n \end{pmatrix} =$$

$$\begin{pmatrix} a_{11} & a_{12} & \cdots & a_{1n} \\ a_{21} & a_{22} & \cdots & a_{2n} \\ \vdots & & & \vdots \\ a_{n1} & a_{n2} & \cdots & a_{nn} \end{pmatrix} \begin{pmatrix} x_1 \\ x_2 \\ \vdots \\ x_n \end{pmatrix} +$$

$$\begin{pmatrix} b_{11} & b_{12} & \cdots & b_{1m} \\ b_{21} & b_{22} & \cdots & b_{2m} \\ \vdots & & & \vdots \\ b_{n1} & b_{n2} & \cdots & b_{nm} \end{pmatrix} \begin{pmatrix} u_1 \\ u_2 \\ \vdots \\ u_m \end{pmatrix} + D \begin{pmatrix} w_1 \\ w_2 \\ \vdots \\ w_n \end{pmatrix}$$

[Formula 6]

$$D \begin{pmatrix} w_1 \\ w_2 \\ \vdots \\ w_n \end{pmatrix} = \begin{pmatrix} \Delta a_{11} & \Delta a_{12} & \cdots & \Delta a_{1n} \\ \Delta a_{21} & \Delta a_{22} & \cdots & \Delta a_{2n} \\ \vdots & & & \vdots \\ \Delta a_{n1} & \Delta a_{n2} & \cdots & \Delta a_{nn} \end{pmatrix} \begin{pmatrix} x_1 \\ x_2 \\ \vdots \\ x_n \end{pmatrix} +$$

$$\begin{pmatrix} \Delta b_{11} & \Delta b_{12} & \cdots & \Delta b_{1m} \\ \Delta b_{21} & \Delta b_{22} & \cdots & \Delta b_{2m} \\ \vdots & & & \vdots \\ \Delta b_{n1} & \Delta b_{n2} & \cdots & \Delta b_{nm} \end{pmatrix} \begin{pmatrix} u_1 \\ u_2 \\ \vdots \\ u_m \end{pmatrix} + \begin{pmatrix} d_1 \\ d_2 \\ \vdots \\ d_n \end{pmatrix}$$

Thus the response of the state vector when a fault occurs in the diagnosing object can be expressed by the sum of the response under the normal condition $\{Ax(t) + Bu(t)\}$ and the disturbance $\{Dw(t)\}$. The disturbance estimating means 32 is designed so as to estimate the disturbance $Dw(t)$.

At that time, the disturbance is estimated in the following manner.

As a first step, an extended form of the diagnosing object 10 whose state contains the disturbance $w(t)$ is constructed. For this purpose, $w(t)$ is assumed as follows, and $w(t)$ is added as the state of the diagnosing object.

[Formula 7]

$$\dot{w}(t) = O$$

Therefore the extended system of the system, whose state contains $w(t)$, can be expressed by the following equation:

[Formula 8]

$$\frac{d}{dt}\begin{bmatrix} x \\ w \end{bmatrix} = \begin{bmatrix} A & D \\ 0 & 0 \end{bmatrix} \begin{bmatrix} x \\ w \end{bmatrix} + \begin{bmatrix} B \\ 0 \end{bmatrix} u$$

$$y = [C \; 0]\begin{bmatrix} x \\ w \end{bmatrix}$$

As a second step, the state $[x^T w^T]^T$ of Formula 8 is estimated and calculated using the conventional linear control theory.

The assumption of Formula 7, as shown in FIG. 2, means that a disturbance 100, which originally varies continuously, is approximated stepwise as indicated by 110. The smaller the width of the step, the more accurate the approximation. Since the step width corresponds to the disturbance estimating time of the disturbance estimating means 32 which can be partically made very short, compared to the disturbance varying rate, this approximation is sufficiently suitable for practical use.

Thus, if the extended system is observable, the disturbance estimating means 32 can estimate the state which cannot be measured, and at the same time the disturbance corresponding to the fault, even when all of the states of the diagnosing object cannot be measured.

Secondly, the operation of the correlation calculating means 34 will be described.

As described above, the integrated disturbance vector $w(t)$ estimated by the disturbance estimating means 32 contains an internal disturbance which occurs due to the fault of the diagnosing object 10, and an external disturbance d which penetrates the diagnosing object from an external source irrespective of whether the diagnosing object is normal or has a fault.

The external disturbance d is an irregular signal but is characterized such that its mean value for a certain time will be zero. In this invention, utilizing the characteristic feature of the external disturbance d, a calculation is made for separating the components (differential components $\Delta A$, $\Delta B$ of parameters) relating to the internal disturbance, which is generated due to the fault, from the estimated integrated disturbance $w(t)$. A typical method of this calculation is the least squares method.

Firstly, from Formula 4, the following equation is defined:

[Formula 112]

$$\theta^T = [\Delta A \; \Delta B], \; \zeta^T = [x^T u^T]$$

Then, using the least squares method, $\hat{\theta}$ which makes Formula 113 minimal is obtained from the N data values.

$$J(\hat{\theta}) = \sum_{k=1}^{N} (\hat{\theta}^T \zeta(k) - D\hat{w}(k))^2 \qquad \text{[Formula 113]}$$

This is obtained by assuming a partial differential equation, which is the result of partial differentiation of formula 113 by $\hat{\theta}$, to be zero; as a result, it can be expressed by the following equation:

$$\hat{\theta} = \left\{ \sum_{k=1}^{N} \zeta(k)\zeta^T(k) \right\}^{-1} \left\{ \sum_{k=1}^{N} \zeta(k)D\hat{w}(k) \right\} \qquad \text{[Formula 114]}$$

As this is rewritten by the following asymptotic equation:

$$\Gamma(N) = \Gamma(N-1) - \frac{\Gamma(N-1)\zeta(N)\zeta^T(N)\Gamma(N-1)}{1 + \zeta^T(N)\Gamma(N-1)\zeta(N)} \qquad \text{[Formula 115]}$$

$$\hat{\theta}(N) = \hat{\theta}(N-1) - \frac{\Gamma(N-1)\zeta(N)}{1 + \zeta^T(N)\Gamma(N-1)\zeta(N)} e(N)$$

where, $e(N) = \zeta^T(N)\hat{\theta}(N-1) - D\hat{w}(N)$ $\hat{\theta}$ is a direction vector, $\zeta$ is a base vector the parameter differentials $\Delta A$ and $\Delta B$ can be estimated one after another. $\theta$ represents a direction vector, and $\zeta$ represents a base vector.

The calculation of this cross-correlation will now be described in connection with the case where there is no correlation between the external disturbance and each of the elements of the vector $\zeta$. In this case, by obtaining the correlation between the integrated disturbance w(t) and the quantity of internal state x(t) uncorrelated with the external disturbance, it is possible to separate from the integrated disturbance w(t) a component relating to the internal disturbance.

For example, the i-th element of the estimated value of the disturbance vector w(t) can be expressed by the following equation:

[Formula 9]

$$\hat{w}_i = \Delta a_{i1} + \Delta a_{i2}x_2 + \ldots + \Delta b_{i1}u_i + \ldots + d_i$$

where $\hat{w}_i$ represents an estimated value of $\hat{w}_i$

As is apparent from Formula 9, the i-th element of the estimated disturbance is a linear combination of a quantity $\Delta a_{ij}$ representing a fault of the diagnosing object 10 and the respective element x1, x2, ..., xn of the internal state vector x(t).

In order to take the fault quantity from the i-th element of the estimated disturbance, the cross-correlation between the i-th element of the estimated disturbance and the quantity of internal state of the diagnosing object 10 is calculated. At that time, the quantity of internal state of the diagnosing object which quantity is to be used for calculating the cross-correlation may be a value measured directly by a sensor in the dynamic system 10 or may be a value estimated by the disturbance estimating means 32 as mentioned above.

The cross-correlation function between the i-th element of the estimated disturbance shown in Formula 9 and the j-th element xj of x to be obtained is obtained now. Here, the cross-correlation function is defined by the following equation:

[Formula 10]

$$C(\hat{w}_i, x_j) \triangleq C_{ij} = \Delta a_{ij} v_i$$

As mentioned above, it is assumed that there is no correlation between each element of the external disturbance vector d(t) and each element of the internal state vector x because of the action of the controller 12.

The cross-correlation function and auto-correlation functions are expressed by the following equation:

$$C(\hat{w}_i, x_j) = \frac{1}{N} \sum_{k=1}^{N} (\hat{w}_i - \bar{\hat{w}}_i)(x_j - \bar{x}_j) \qquad \text{[Formula 11]}$$

$$v_{xj} = \frac{1}{N} \sum_{k=1}^{N} (\bar{x}_j - x_j)^2$$

The values of [Formula 11] can be expressed by the following equations:

$$\bar{\hat{w}}_i = \frac{1}{N} \sum_{k=1}^{N} \hat{w}_i \qquad \text{[Formula 12]}$$

$$\bar{x}_j = \frac{1}{N} \sum_{k=1}^{N} x_j$$

The calculation using Formula 9 is executed based on the assumption that the quantity of internal state xj is measured directly by a sensor. If xj is not directly measured, the cross-correlation function should be obtained using the estimated value from the disturbance estimating means 32, based on the following equations:

$$C(\hat{w}_i, \hat{x}_j) = \frac{1}{N} \sum_{k=1}^{N} (\hat{w}_i - \bar{\hat{w}}_i)(\hat{x}_j - \bar{\hat{x}}_j) \qquad \text{[Formula 13]}$$

where $\hat{x}_j$ represents an estimated value of $x_j$ $$\bar{\hat{w}}_i = \frac{1}{N} \sum_{k=1}^{N} \hat{w}_i \qquad \text{[Formula 14]}$$

$$\bar{\hat{x}}_j = \frac{1}{N} \sum_{k=1}^{N} \hat{x}_i$$

Since the disturbance estimating means 32 can estimate the quantity of internal state xj of the diagnosing object, without any error, irrespective of whether or not there exists a fault and an external disturbance, almost the same result, as in the case where the internal state is directly measured, can be obtained from the functions of Formula 13 and Formula 14.

The operation of the diagnosing means 3 6 will be described.

The diagnosing means 36 detects a fault arisen and specify a fault portion from the correlation function Cij which is a component relating to the internal disturbance calculated by the correlation calculating means 34. Namely, by normalizing the correlation Cij by dividing it by an auto-correlation vxj of the state, it is possible to detect the parameter change $\Delta a_{ji}$. This yields as follows:

$$\Delta a_{ij} = \frac{\sum_{k=1}^{N} (\hat{w}_i - \bar{\hat{w}}_i)(x_j - \bar{x}_j)}{\sum_{k=1}^{N} (x_j - \bar{x}_j)^2} \qquad \text{[Formula 116]}$$

Assuming that the mean value of Formula 116 is zero, this equation is identical to the case where there is no correlation between the individual elements of the vector in Formula 114.

For example, assume that the elements of the dynamic system 10 to be diagnosed are an element I and an element II, the parameter representing the element I is situated at the first column in the first line of matrix A of the dynamic system expressed by the state equation of Formula 1, and that the parameter representing the element II is situated at the first and second columns in the first line of matrix A. At that time, if the correlation function $C_{12}$, i.e. $\Delta a_{12}$ has a value, the diagnosing means 36 then immediately judges the element II to be fault. If $C_{12}$ has no value but $C_{11}$, i.e. $\Delta a_{11}$ has a value, the diagnosing means 36 then judges the element I to be faulty.

Thus, according to this invention, it is possible to reliably detect a fault which occurs in the individual element of the dynamic system 10 and to specify the fault portion accurately.

Whereas in the conventional art in which the quantity corresponding to a fault is obtained from the residual between the state estimated by the observer and the state directly measured, since this residual has no simple relationship with the fault (like Formula 9), it is impossible to specify the fault by a simple calculation such as the calculation of correlation.

According to this invention, any of the following modes may be taken, depending on the design of the disturbance estimating means 32.

In the first mode, every quantity of internal state x(t) of the diagnosing object 10 can be measured using a sensor, and the disturbance estimating means 32 is designed so as to estimate only the integrated disturbance vector w(t). In this case, since the degree of the disturbance estimating means 32 is only the degree of disturbance, it is possible to achieve the maximum fault detecting precision with the simplest construction.

The second example is the case where part of the quantity of internal state x(t) of the diagnosing object 10 cannot be measured or can be estimated by the disturbance estimating means without being measured. In this case, the disturbance estimating means 32 is designed so as to estimate and calculate the integrated disturbance vector w(t) and the quantity of internal state which cannot be measured or is not measured.

In this example, since it is unnecessary to measure part of the quantity of internal state of the diagnosing object 10, the number of sensors can be reduced. Since the disturbance estimating means 32 estimates not only the disturbance quantity but also the quantity of internal state which cannot be measured, it is possible to measure the fault, in substantially the same manner as the case every internal state is measured, using this estimated value for calculating the correlation.

In the third example, if part of the quantity of internal state x(t) of the diagnosing object 10 cannot be measured, the disturbance estimating means 32 estimates and calculates the mutual disturbance vector w(t) and all internal state quantities x(t) including the quantity of internal state which cannot be measured.

In this example, like the second example, it is possible to reduce number of sensors and to specify the fault in substantially the same manner as the case where every quantity of internal state is measured.

Further, it is possible to make the design of the disturbance estimating means 32 slightly simpler than the second example.

The calculation in each of the first to third examples will now be described in detail.

Firstly, in the first example, in which every quantity of internal state of the diagnosing object 10 is measured, taking the mean of the disturbance vector of Formula 9 the formula can be expressed by the following equation:

$$\bar{\hat{w}}_i = \Delta a_{i1} \underbrace{\frac{1}{N} \sum_{k=1}^{N} x_1}_{x_1: \text{ mean value}} + \Delta a_{i2} \underbrace{\frac{1}{N} \sum_{k=1}^{N} x_2}_{\bar{x}_2} + \ldots + \quad [\text{Formula 52}]$$

$$\Delta b_{i1} \frac{1}{N} \sum_{k=1}^{N} u_1 + \ldots + \frac{1}{N} \sum_{k=1}^{N} d_1 =$$

$$\Delta a_{i1} \bar{x}_1 + \Delta a_{i2} \bar{x}_2 + \ldots + \Delta b_{i1} \bar{u}_1 + \ldots + \bar{d}_i$$

Therefore, in the case where every quantity of state of the diagnosing object can be measured, the cross-correlation function between the estimated disturbance vector and the quantity of state xj gives the value shown by the following equation:

$$C(\hat{w}_i, x_j) = \frac{1}{N} \sum_{k=1}^{N} (\hat{w}_i - \bar{\hat{w}}_i)(x_j - \bar{x}_j) = \quad [\text{Formula 53}]$$

$$\Delta a_{i1} \frac{1}{N} \sum_{k=1}^{N} (x_1 - \bar{x}_1)(x_j - \bar{x}_j) +$$

$$\Delta a_{i2} \frac{1}{N} \sum_{k=1}^{N} (x_2 - \bar{x}_2)(x_j - \bar{x}_j) + \ldots +$$

$$\Delta a_{ij} \frac{1}{N} \sum_{k=1}^{N} (x_j - \bar{x}_j)(x_j - \bar{x}_j) + \ldots +$$

$$\Delta b_{i1} \frac{1}{N} \sum_{k=1}^{N} (u_1 - \bar{u})(x_j - \bar{x}_j) + \frac{1}{N} \sum_{k=1}^{N} (d_i - \bar{d}_i)(x_j - \bar{x}_j)$$

From the assumption that there is no correlation between the state quantities of the diagnosing object, the individual terms of Formula 53 can be expressed by the following equations:

$$\frac{1}{N} \sum_{k=1}^{N} (x_1 - \bar{x}_1)(x_j - \bar{x}_j) \simeq 0 \quad [\text{Formula 54}]$$

$$\frac{1}{N} \sum_{k=1}^{N} (x_2 - \bar{x}_2)(x_j - \bar{x}_j) \simeq 0$$

$$\vdots$$

$$\frac{1}{N} \sum_{k=1}^{N} (x_j - \bar{x}_j)(x_j - \bar{x}_j) = \frac{1}{N} \sum_{k=1}^{N} (x_j - \bar{x}_j)^2 \Delta v_{xj} \neq 0$$

Since it is assumed that there is no correlation also between the state xj of the diagnosing object and the external disturbance, a relation represented by the following equation is secured:

$$\frac{1}{N} \sum_{k=1}^{N} (d_1 - \bar{d}_1)(x_j - \bar{x}_j) \simeq 0 \quad [\text{Formula 55}]$$

As a result, the value of the correlation function is finally expressed by the following equations:

$$C(\hat{w}_i, x_j) \simeq \Delta a_{ij} \frac{1}{N} \sum_{k=1}^{N} (x_j - \bar{x}_j)(x_j - \bar{x}_j) \quad [\text{Formula 56}]$$

-continued $$= \Delta a_{ij} v_{xj}$$

$$v_{xj} = \frac{1}{N} \sum_{k=1}^{N} (x_j - \bar{x}_j)^2 \qquad \text{[Formula 57]}$$

$$\bar{x}_j = \frac{1}{N} \sum_{k=1}^{N} x_j$$

In this case, as in the first and second embodiments, where the cross-correlation is to be calculated using the estimated value from the disturbance estimating means 32, the calculation can be expressed by the following equation:

$$C(\hat{w}_i, \hat{x}_j) = \frac{1}{N} \sum_{k=1}^{N} (\hat{w}_i - \bar{\hat{w}}_i)(\hat{x}_j - \bar{\hat{x}}_j) = \qquad \text{[Formula 58]}$$

$$\Delta a_{i1} \frac{1}{N} \sum_{k=1}^{N} (x_1 - \bar{x}_1)(\hat{x}_j - \bar{\hat{x}}_j) +$$

$$\Delta a_{i2} \frac{1}{N} \sum_{k=1}^{N} (\hat{x}_2 - \bar{\hat{x}}_2)(\hat{x}_j - \bar{\hat{x}}_j) \ldots +$$

$$\Delta a_{ij} \frac{1}{N} \sum_{k=1}^{N} (x_j - \bar{x}_j)(\hat{x}_j - \bar{\hat{x}}_j) + \ldots +$$

$$\Delta b_{i1} \frac{1}{N} \sum_{k=1}^{N} (u_1 - \bar{u}_1)(\hat{x}_j - \bar{\hat{x}}_j) + \ldots +$$

$$\frac{1}{N} \sum_{k=1}^{N} (d_i - \bar{d}_i)(\hat{x}_j - \bar{\hat{x}}_j)$$

Since it is assumed that there is no correlation between the state quantities of the diagnosing objects, the individual terms of Formula 58 can be expressed by the following:

$$\frac{1}{N} \sum_{k=1}^{N} (x_1 - \bar{x}_1)(\hat{x}_j - \bar{\hat{x}}_j) \simeq 0 \qquad \text{[Formula 59]}$$

$$\frac{1}{N} \sum_{k=1}^{N} (x_2 - \bar{x}_2)(\hat{x}_j - \bar{\hat{x}}_j) \simeq 0$$

$$\vdots$$

$$\frac{1}{N} \sum_{k=1}^{N} (x_1 - \bar{x}_j)(\hat{x}_j - \bar{\hat{x}}_j) \Delta v_{xj} \neq 0$$

$$\vdots$$

$$\frac{1}{N} \sum_{k=1}^{N} (d_i - \bar{d}_i)(\bar{x}_j - \bar{\hat{x}}_j) \simeq 0$$

Therefore, the value of the cross-correlation can be expressed by the following:

$$C(\hat{w}_{i1}, \hat{x}_j) \simeq \Delta a_{ij} \frac{1}{N} \sum_{k=1}^{N} (x_j - \bar{x}_j)(\hat{x}_j - \bar{\hat{x}}_j) = \Delta a_{ij} v_{xj} \qquad \text{[Formula 60]}$$

$$v_{xj} = \frac{1}{N} \sum_{k=1}^{N} (x_j - x_j)(\hat{x}_j - \bar{x}_j) \qquad \text{[Formula 61]}$$

$$\bar{\hat{x}}_j = \frac{1}{N} \sum_{k=1}^{N} \hat{x}_j$$

Using the thus obtained cross-correlation function, it is also possible to specify the occurrence of a fault and the fault portion.

As mentioned above, according to this invention, since a disturbance estimating means for estimating a disturbance, which is due to the fault, as a state of the diagnosing object is used as the fault detecting means, there would exist no trade-off between the fault detecting speed and the fault detecting sensitivity, which would have been caused in the conventional art, so that the fault detecting speed and the fault detecting sensitivity can be significantly improved.

Since the relation between the estimated disturbance and the fault portion can be expressed by an external simple formula, it is possible to easily separate a disturbance and an internal disturbance which has occurred due to the fault from one another and to specify the fault portion.

At that time, the quantity of internal state to be used in calculating a correlation should by no means be limited to the quantity directly measured by a sensor and may be the quantity of internal state estimated by the disturbance estimating means simultaneously with the estimation of the disturbance at need. Therefore a detailed fault detection can be achieved without measuring every quantity of internal state of the diagnosing object.

According to this invention, it is possible to specify a fault portion of the diagnosing object with high sensitivity, without using as many observers according to the fault like in the conventional art and without measuring every state of the diagnosing object according to need.

Further, since the calculation result used in specifying the fault corresponds to the scale of fault of the diagnosing object, it can be used as information for identifying the parameters after fault and for redesigning the control system.

(2) Tire Air Pressure Diagnosing Apparatus

A tire air pressure diagnosing apparatus constructed according to the principles of the foregoing dynamic system diagnosing apparatus will now be described in detail.

According to a second aspect of the invention, there is provided a tire air pressure diagnosing apparatus for diagnosing the state of a tire air pressure of a dynamic system constituted by a suspension and a wheel, comprising:

disturbance estimating means for estimating an integrated disturbance vector, which is the sum of an internal disturbance vector to be generated due to a change of the tire air pressure in the dynamic system and an external disturbance vector to be inputted to the dynamic system from the road surface, based on an internal state vector of the dynamic system;

correlation calculating means for calculating a cross-correlation between the estimated integrated disturbance vector and the internal state vector and for separating from elements of the integrated disturbance vector a component relating to the internal disturbance; and diagnosing means for specifying the state of the tire air pressure of the dynamic system from the separated component relating to the internal disturbance.

Preferably, the correlation calculating means is designed so as to calculate a cross-correlation between an element of the integrated disturbance vector and an element of the internal state vector uncorrelated with the external disturbance vector and so as to separate from the element of the integrated disturbance vector a component relating to the internal disturbance.

Alternatively, the correlation calculating means may be designed so as to execute the calculation of a direction vector of the integrated disturbance having the internal state vector as a base vector, in such a manner that the time-related sum the square of an error between the integrated disturbance vector and the product of the internal disturbance vector and the internal state vector is minimal and so as to separate from the element of the integrated disturbance vector a component relating to the internal disturbance.

In another alternative form, the correlation calculating means may be designed so as to calculate a cross-correlation between a number of elements of the estimated integrated disturbance vector and an element uncorrelated with the external disturbance in the internal state vector and so as to separate, from the elements of the integrated desturbance vector, elements of components relating to the internal disturbance. And the diagnosing means may be designed so as to specify the fault portion of the dynamic system from the element of the separated component relating to the internal disturbance.

The tire air pressure diagnosing apparatus of this invention will now be described in detail based on the above-mentioned dynamic system diagnosing apparatus of FIG. 1.

The dynamic system 10 to be diagnosed is a system composed of a suspension and a wheel. When a tire air pressure, for example, varies, each quantity of state of the system shows a response different from that under the normal condition. In other words, this response can be regarded as a composite response of the response under the normal condition and the internal disturbance corresponding to a change in, for example, air pressure. Consequently, by estimating this disturbance, i.e., an integrated disturbance vector using the disturbance estimating means 32, it is possible to detect the tire air pressure change.

Now it is assumed that the dynamic system 10, which is composed of a suspension and a wheel, is expressed by the following state equation:

[Formula 20]

$$\dot{x} = Ax + Bu + d$$

$$y = Cx$$

where x is the internal state vector of the system 10, and u is a control input. The suspension corresponds to the operating quantity when it is an active suspension. y is a control output vector (internal state vector) to be detected and outputted directly from, for example, a sensor of the system 10. d represents a road face disturbance received from the road surface. Matrices A, B and C are constant matrices to be determined by physical parameters of the system 10.

This invention will now be described in connection with two separate cases: one case where an input u to the dynamic system 10 exists as the suspension of the system 10 like an active suspension, and the other where an input u to the system 10 does not exist like a conventional suspension.

FIRST CASE WHERE SYSTEM INPUT EXISTS

In this case, a change in tire air pressure, etc. is substituted by a change in a physical parameter of the system 10. This change can be expressed using a change in matrix A. Assuming that the matrix A varies by $\Delta A$ due to the change in air pressure, etc., the system after the change can be expressed by the following:

$$\begin{aligned}\dot{x} &= Ax + Bu + (\Delta Ax + d) \\ &= Ax + Bu + Dw\end{aligned} \quad \text{[Formula 21]}$$

Dw is expressed by the following equation:
[Formula 22]

$$Dw = \Delta Ax + d$$

It is understood from Formula 22 that a new disturbance $\Delta Ax$ is generated due to the change in tire air pressure. D is a matrix composed of elements of 1 and 0 and to be determined according to a route of penetration of the road surface disturbance and a source of the disturbance caused by the change in parameter of the system 10.

Thus, a state vector response due to the change can be expressed by the sum of a response under the normal condition and a disturbance Dw(t). The disturbance estimating means 32 is designed to estimate this disturbance w.

The disturbance estimating means 32 is constructed in the following two separate steps:

In the first step, an extended system of the system including the disturbance w(t) as a state is constructed. For this purpose, the following assumption is provided for w(t), and w(t) is added as a state of the diagnosing object 10.
[Formula 23]

$$\dot{w} = 0$$

As a result, the extended system of the system 10 is expressed by the following equations:

$$\frac{d}{dt}\begin{bmatrix} x \\ w \end{bmatrix} = \begin{bmatrix} A & D \\ 0 & 0 \end{bmatrix}\begin{bmatrix} x \\ w \end{bmatrix} + \begin{bmatrix} B \\ 0 \end{bmatrix}u \quad \text{[Formula 24]}$$

$$y = [C \quad 0]\begin{bmatrix} x \\ w \end{bmatrix} \quad \text{[Formula 25]}$$

In the second step, the estimating means 32 for estimating the state $[x^T w^T]^T$ of the Formula 24 is constructed using the conventional linear control theory. By the thus designed estimating means 32, the disturbance w is estimated.

As already explained, the assumption of Formula 23 means that the continuously varying disturbance w(t) is approximated in steps as shown in FIG. 2.

Even if not every state vector x of the system 10 can be measured, the disturbance estimating means 32 thus designed can estimate the unmeasurable state and, at the same time, can estimate a disturbance corresponding to the change in air pressure, etc.

As is apparent from Formula 22, the disturbance to be estimated by the estimating means 32 is the sum of an external disturbance d to be received from the road surface and an internal disturbance $\Delta Ax$ to be generated in the system 10 by the change in tire air pressure, etc. Formula 22 is expressed in terms of vector; the first element, for example, of this vector can be expressed by the following equation:
[Formula 26]

$$[Dw]_1 = \Delta a_{11} x_1 \Delta a_{12} x_2 + \ldots + \Delta a_{ij} x_j + \ldots + d_1$$

where $\Delta a_{ij}$ is a line 1 row j element of a matrix $\Delta A$

The detailed description will now be made based on Formula 26.

In Formula 26, $\Delta a_{11}$ is an element due to the change in tire air pressure, and the remaining elements are due to the change in something other than tire air pressure. In this case, it shows that the internal disturbance due to the change in tire air pressure depends on the quantity of state x1. This is, in this case the quantity of state that influences on the system 10 by the tire air pressure change is x1.

Accordingly in order to detect only the component relating to the internal disturbance resulting from the tire air pressure change by removing the external disturbance d1 such as a road disturbance from the disturbance $[Dw]_1$ estimated by the estimating means 32, a cross-correlation between the estimated disturbance $[Dw]_1$ and the quantity of state x1 is calculated. This calculation is done by the correlation calculating means 34. Assuming that the cross-correlation to be calculated at that time is $C([Dw]_1, x1)$, the result has a value expressed by the following equation:

$$C([Dw]_1, x_1) = \Delta a_{11} \cdot \frac{1}{N} \sum_{k=1}^{N} (x_1 - \bar{x}_1)^2 \qquad \text{[Formula 27]}$$

where, $$\bar{x}_1 = \frac{1}{N} \sum_{k=1}^{N} x_1:$$

N represents the number of samples used for correlation calculation

As described above, the external disturbance such as road disturbance and the terms of other internal disturbance due to the change in something other than air pressure are not correlated with the quantity of state x1. Therefore, by calculating the correlation of Formula 27, it is possible to extract only the internal disturbance corresponding to the tire air pressure change from the estimated disturbance w.

The thus calculated correlation function has, out of various frequency components contained in the estimated disturbance w, a value equivalent to the frequency component of the internal disturbance resulting from only the change in spring constant of tire. Therefore, from this calculated value of the correlation function, it is possible to detect the change quantity of spring constant.

The cross-correlation function of Formula 27 can be expressed by the product of a term $\Delta a_{11}$ representing the change of spring constant and an auto-correlation function of the quantity of state represented by the following equation. The diagnosing means 36 can detect the change quantity $\Delta a_{11}$ of spring constant quantitatively by, for example, dividing the cross-correlation function by the auto-correlation function of quantity of state.

$$\frac{1}{N} \sum_{k=1}^{N} (x_1 - \bar{x}_1)^2 \qquad \text{[Formula 28]}$$

The diagnosing means 36 judges the air pressure abnormal when the obtained change quantity $\Delta a_{11}$ of spring constant reaches the spring constant change quantity corresponding to the tire air pressure to be judged as abnormal.

SECOND CASE WHERE NO INPUT EXISTS IN SYSTEM 10

The second case where the suspension is not an active suspension, and there exists no input in the system 10, like the conventional suspension will now be described.

In this case, the dynamic system 10 composed of a suspension and a wheel is expressed by the following state equation:

[Formula 29]

$$\dot{x} = Ax + d$$

$$y = Cx$$

where x is a state vector of the system 10, y is an output vector to be measured directly by a sensor, etc. of the system, and d is a road surface disturbance to be received from a road surface. Matrices A, B and C are constant matrices to be determined by physical parameters of the system 10. The difference of this suspension from an active suspension is that there exists no input u to the system 10 as seen from Formula 20.

Assuming that matrix A changes by $\Delta A$ due to the change in air pressure, etc., the system after the change can be expressed by the following:

$$\begin{aligned} \dot{x} &= Ax + (\Delta Ax + d) \\ &= Ax + Dw \end{aligned} \qquad \text{[Formula 30]}$$

where Dw can be expressed by the following:
[Formula 31]

$$Dw = \Delta Ax + d$$

From Formulae 30 and 31, an extended system of the system 10 containing the disturbance w can be expressed by the following equations:

$$\frac{d}{dt}\begin{bmatrix} x \\ w \end{bmatrix} = \begin{bmatrix} A & D \\ 0 & 0 \end{bmatrix}\begin{bmatrix} x \\ w \end{bmatrix} \qquad \text{[Formula 32]}$$

$$y = [C \; 0]\begin{bmatrix} x \\ w \end{bmatrix} \qquad \text{[Formula 33]}$$

The remaining construction including the disturbance observer 32 and operation is completely identical with the active suspension except the input u.

Thus, even if there is no input to the system 10, like the conventional suspension, it is possible to detect a tire air pressure abnormality.

COMPARISON WITH CONVENTIONAL ART

The conventional means for detecting a tire air pressure abnormality is generally divided into the following two types:

The first means includes, on the tire (rotation) side, a pressure sensor, and a wireless-type signal transmitter for transmitting a signal from the pressure sensor to the vehicle body side, and discriminates whether or not the tire air pressure is abnormal depending on the signal received at the vehicle body side.

However, this conventional art requires not only a special process for burying the pressure sensor in the tire but also measures against air leakage, etc. from the sensor attaching portion. Further, the pressure sensor and the signal transmitter, which are to be mounted in the rotating tire, are exposed to severe environment receiving vibration, impact, centrifugal force, temperature change, cold water, snow, etc. and would therefore be difficult to maintain high reliability over a long period of time.

Further, according to the second means, the sensor is not directly attached to the tire for detecting a tire air pressure abnormality.

The latter conventional means is exemplified by a method of measuring the distance between the wheel axles for four wheels and the ground and judging the tire air pressure at the short-distance portion abnormal, a method of detecting the rotational speed of four wheels and regarding the air pressure of a tire in high-speed rotation as being abnormal, and a method of detecting a tire air pressure abnormality using acceleration signals of vertical movements of the wheel axles.

According to a proposal by, for example, Japanese Patent Laid-Open Publication No. SHO 63-22707, an air pressure abnormality is detected utilizing a phenomenon that if the tire air pressure changes, a change will occur also in acceleration frequency (acceleration spectrum) received by the vehicle body.

FIG. 17 is a block diagram of this conventional apparatus. In the conventional apparatus, an acceleration converter 1 detects an acceleration of vertical movement of each wheel to be detected, and this detected acceleration is outputted to respective filters 3a, 3b via an amplifier 2. These filters 3a, 3b are band-pass filters whose frequency bands to be passed are different from each other. Level converters 4a, 4b convert respective output signal root-mean-square values of the individual filters 3a, 3b into signals of d.c. voltage levels V1, V2 and output the signals to a divider 5. The divider 5 divides the inputted voltages V1, V2 and outputs its result value V=V2/V1 to a comparator 6.

The acceleration level of vertical movement of the wheel which level is obtained from the acceleration converter 1 has a large value at a frequency band, and the frequency band will change due to the tire air pressure, irrespective of the road condition and the running speed, and will shift toward the low-frequency side when the air pressure is lowered.

The filter 3a is designed to pass only signals in the frequency band when the air pressure is normal, and the filter 3b is designed to pass only signals in the frequency band of the air pressure to be judged as abnormal. As a result, when the tire air pressure is normal, a voltage V1 corresponding to the root-mean-square value of the output of the filter 3a is large, while a voltage V2 corresponding to the root-mean-square value of the output of the filter 3b is small. Therefore, the output V to be obtained by the divider 5 has a small value.

On the other hand, if an acceleration level frequency band approaches the frequency band preset by the filter 3b as the air pressure is lowered, the value of voltage V2 will be small and the value of voltage V1 will be large. Therefore, the output V to be obtained by divider 5 will have a large value.

Accordingly, a comparator 6 compares the voltage V outputted from the divider 5 with a standard value preset in a standard value setter 7 and outputs a signal, if V is larger than the standard value, to activate an alarm 8.

Although it is able to discriminate the air pressure only by the signal from a single wheel, this conventional art has a problem that the acceleration level frequency band would scarcely vary from the normal value if the air pressure change is small, thus causing only a poor degree of accuracy in air pressure detection.

FIG. 18 shows an acceleration spectrum of vertical movements of the wheels when the tire air pressure is normal; the frequency region indicated by an arrow A where the acceleration level is maximal is about 10 Hz.

FIG. 19 shows an acceleration spectrum of vertical movements of the wheels when the tire spring constant is reduced by 20%; the frequency where the acceleration level is maximal is about 10 Hz as indicated by arrow B.

As is apparent from FIGS. 18 and 19, since the acceleration level frequency band would scarcely shift if the air pressure change is small, it is impossible to detect the change so that this abnormality cannot be detected until a large change in air pressure to occur.

Whereas in the tire air pressure diagnosing apparatus of this invention, unlike the conventional art, it is unnecessary to mount directly on the tire side a pressure sensor and a signal transmitter and so there would be no problem in reliability, durability, etc. of the pressure sensor and the signal transmitter.

In addition, in this invention, the disturbance estimating means 32 for estimating the disturbance due to an air pressure change as a state of the diagnosing object is used as the air pressure detecting means and the relationship between the estimated disturbance and the air pressure can be expressed by a simple formula. Therefore, by a simple calculation for the correlation with a state of the diagnosing object, it is easy to detect a value of the air pressure and to discriminate whether or not the air pressure is abnormal.

More particularly, in this invention, even when the air pressure change is small, it is possible to detect such value reliably.

As described above, according to this invention, partly since the disturbance estimating means 32 for estimating the disturbance due to an air pressure change as a state of the diagnosing object is used as the air pressure detecting means, and partly since the relationship between the estimated disturbance and the air pressure is obtained by a simple calculation of correlation, it is possible to achieve a tire air pressure diagnosing apparatus which can detect a tire air pressure change accurately in a simple construction.

In the case where the apparatus of this invention is applied for diagnosing the air pressure of a tire attached to an active suspension, since the tire air pressure can be diagnosed using the sensor, such as an acceleration detector, which is used for suspension control, without any reconstruction, it is unnecessary to add a new acceleration sensor for detecting an air pressure abnormality.

In the case where the tire attached to the conventional suspension, which is not active, is diagnosed, it is possible to diagnose the tire air pressure by only an acceleration sensor for detecting the acceleration of vertical movements of an upper portion and a lower portion of the spring of the suspension.

In addition, by comparing the tire air pressure change quantity obtained by the disturbance estimating means with a standard value of air pressure change quantity of the tire which should be judged as abnormal, it is possible to discriminate whether or not the tire air pressure is abnormal.

Further, the diagnosing means can include an autocorrelation calculating part for calculating an auto-correlation of the element uncorrelated with an external disturbance in the internal state vector, and can be designed to diagnose the tire air pressure state based on the cross-correlation function value and the auto-correlation value, thereby detecting the tire air pressure change as a spring constant change quantity with precision. The tire air pressure change can therefore be used as a source of information for use as an air pressure monitor for indicating an air pressure abnormality to the driver whenever it arises. Furthermore, by using this information as the control rule for the active suspension or for the suspension which can change a damper constant, it is possible to realize for the driver and passenger a suitable comfortability which copes with the air pressure change.

(3) Vehicle Body Weight Change Detecting Apparatus

A vehicle body weight change detecting apparatus constructed according to the principles of the foregoing dynamic system diagnosing apparatus will now be described.

According to a third aspect of the invention, there is provided a vehicle body weight change detecting apparatus for diagnosing a change in vehicle body weight of a dynamic system constituted by a suspension and a wheel, comprising:

disturbance estimating means for estimating an integrated disturbance vector, which is the sum of an internal disturbance vector to be generated due to the change in vehicle body weight of the dynamic system and an external disturbance vector to be inputted to the dynamic system from the road surface, based on an internal state vector of the dynamic system;

correlation calculating means for calculating a cross-correlation between the estimated integrated disturbance vector and the internal state vector and for separating from the integrated disturbance vector a component relating to the internal disturbance; and detecting means for detecting the change in vehicle body weight in the dynamic system from the separated component relating to the internal disturbance.

Preferably, the correlation calculating means is designed so as to calculate a correlation between an element of the integrated disturbance vector and an element of the internal state vector uncorrelated with the external disturbance and so as to separate from the element of the integrated disturbance vector a component relating to the internal disturbance.

Alternatively, the correlation calculating means may be designed so as to execute the calculation of a direction vector of the integrated disturbance having the internal state vector as a base vector, in such a manner that the time-related sum of the square of an error between the integrated disturbance vector and the product of the internal disturbance vector and the internal state vector is minimal and so as to separate from the element of the integrated disturbance vector a component relating to the internal disturbance.

With this arrangement, it is possible to diagnose a vehicle body weight change of the dynamic system by the principles of the above-mentioned dynamic system diagnosing apparatus.

(4) Dynamic System Diagnosing Apparatus In Alternative Forms

A dynamic system diagnosing apparatus which is effective when there is a correlation between the quantity of internal state and the external disturbance will now be described.

According to a fourth aspect of the invention, there is provided a diagnosing apparatus for diagnosing a dynamic system by detecting a fault of the dynamic system, comprising:

disturbance estimating means for estimating an integrated disturbance vector, which is the sum of external and internal disturbance vectors of the dynamic system, based on an internal state vector of the dynamic system;

compensation value storing means for storing a correlation between the internal state vector in a predetermined standard state and an external disturbance vector as a compensation value;

correlation calculating means for calculating a cross-correlation between the estimated integrated disturbance vector and the internal state vector;

correlation compensating means for separating from the integrated disturbance vector a component relating to the internal disturbance, without any influence by the external disturbance, by compensating the cross-correlation calculated by the correlation calculating means, based on the internal state vector and the compensation value; and diagnosing means for specifying a corresponding fault portion of the dynamic system from the separated component relating to the internal disturbance.

As the standard state, it is advisable to assume the case in which the dynamic system is operating normally under a predetermined condition. For example, for diagnosing the tire air pressure as described blow, it is advisable to assume that the state in which the tire air pressure has a value in normal condition is the standard state.

With this arrangement, when the correlation calculating means calculates a cross-correlation between an element of the integrated disturbance vector and an element of the internal state vector, the correlation compensating means reads a compensation value preset in the compensation value storing means and corrects the cross-correlation. In this way, it is possible to separate from the element of the integrated disturbance vector a component relating to the internal disturbance, without any influence by the external disturbance.

Thus it is possible to diagnose the dynamic system accurately, without any influence by the external disturbance.

Using the foregoing method it is possible to diagnose the tire air pressure of a dynamic system and also to detect the vehicle body weight change.

According to a fifth aspect of the invention, there is provided a tire air pressure diagnosing apparatus for diagnosing the state of a tire air pressure of a dynamic system constituted by a suspension and a wheel, comprising:

disturbance estimating means for estimating an integrated disturbance vector, which is the sum of an internal disturbance vector to be generated due to a change of the tire air pressure in the dynamic system and an external disturbance vector to be inputted to the dynamic system from the road surface, based on an internal state vector of the dynamic system;

compensation value storing means for storing a correlation between the internal state vector in a predetermined standard state and an external disturbance vector as a compensation value;

correlation calculating means for calculating a cross-correlation between the estimated integrated disturbance vector and the internal state vector;

correlation compensating means for separating from the integrated disturbance vector a component relating to the internal disturbance, without any influence by the external disturbance, by compensating the cross-correlation calculated by the correlation calculating means, based on the internal state vector and the compensation value; and diagnosing means for specifying the state of the tire air pressure of the dynamic system from the separated component relating to the internal disturbance.

With this arrangement, it is possible to diagnose the tire air pressure state of a dynamic system, without any influence by the external disturbance.

According to a sixth aspect of the invention, there is provided a vehicle body weight change detecting apparatus for diagnosing a change in vehicle body weight of a dynamic system constituted by a suspension and a wheel, comprising:

disturbance estimating means for estimating an integrated disturbance vector, which is the sum of an internal disturbance vector to be caused due to the change in vehicle body weight of the dynamic system and an external disturbance vector to be inputted to the dynamic system from the road surface, based on an internal state vector of the dynamic system;

compensation value storing means for storing a correlation between the internal state vector in a predetermined standard state and an external disturbance vector as a compensation value;

correlation calculating means for calculating a cross-correlation between the estimated integrated disturbance vector and the internal state vector;

correlation compensating means for separating from the integrated disturbance vector a component relating to the internal disturbance without being influenced by the external disturbance by compensating the cross-correlation calculated by the correlation calculating means, based on the internal state vector and the compensation value; and detecting means for detecting the change in vehicle body weight in the dynamic system from the separated component relating to the internal disturbance.

As the standard state, it is advisable to assume the case in which the vehicle body weight has a constant value.

With this arrangement it is possible to detect a vehicle body weight change without any influence by the external disturbance.

DETAILED DESCRIPTION

First Embodiment

A first embodiment of this invention will now be described, in which this invention is applied to detecting a fault in an active suspension control system of a car.

Figure 1:
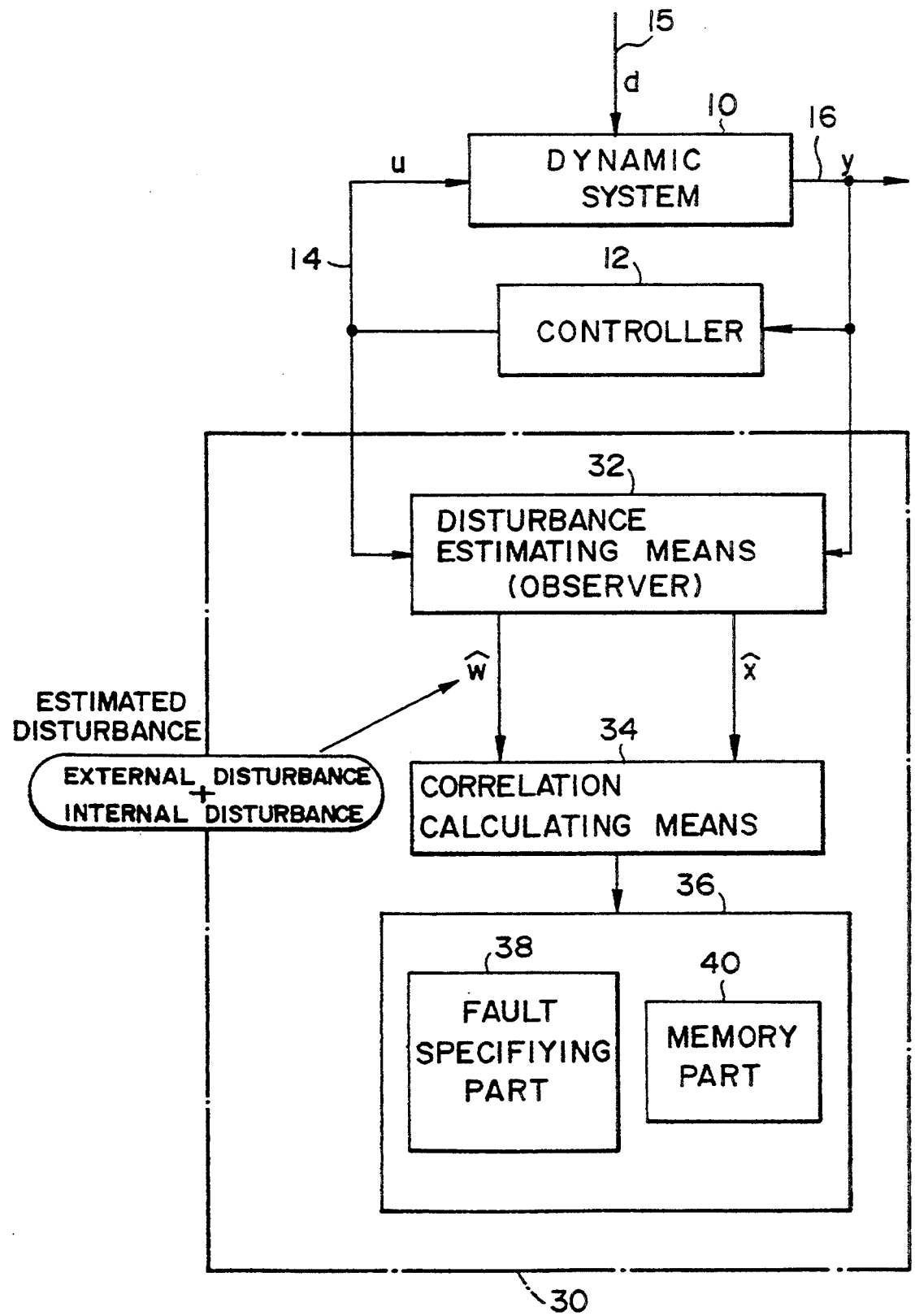
FIG. 1 is a block diagram showing one example of dynamic system diagnosing system according, to a first aspect of this invention.
Figure 2:
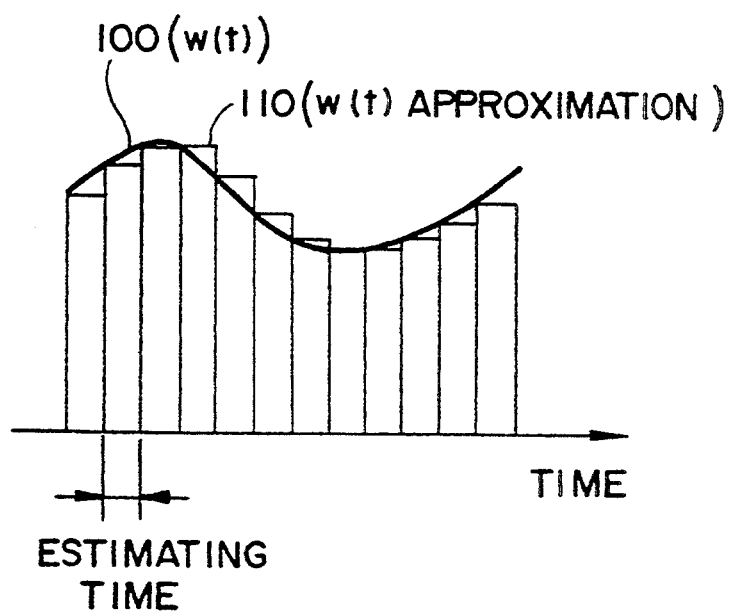
FIG. 2 is a curve showing a disturbance approximation method to be used in a first embodiment of this invention.
Figure 3:
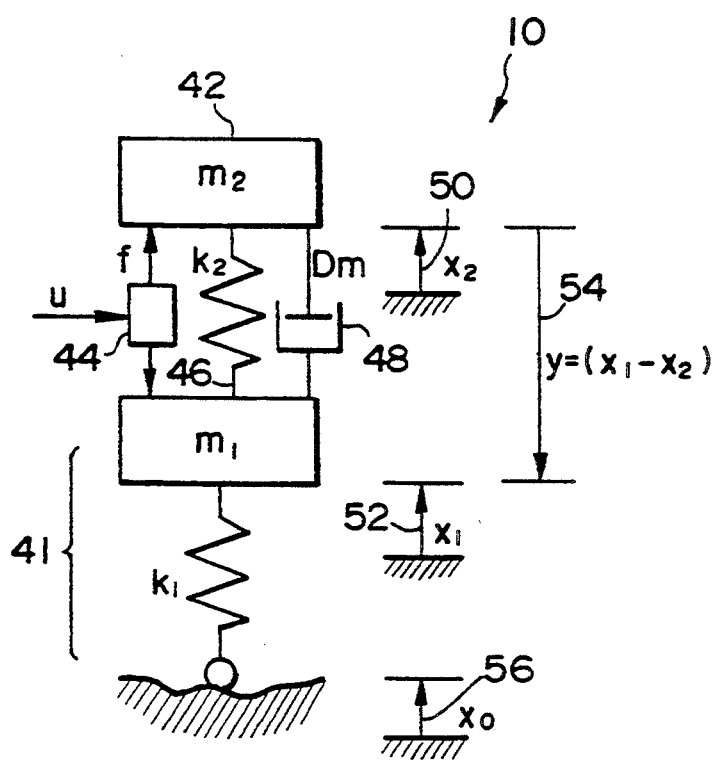
FIG. 3 is a diagram showing an automotive suspension system as a diagnosing object in the first embodiment.

FIG. 3 shows a practical form of dynamic system 10 as a diagnosing object of this embodiment. The dynamic system 10 represents a vibrating model of a cat's single-wheel suspension. In FIG. 3, a wheel 41 includes an under-spring mass part indicated by a parameter m1, and a spring part of the wheel (tire) indicated by a spring constant k1 Reference numeral 42 designates a vehicle body part having an over-spring constant m2; 46, a gas spring having a spring constant k2; 48, a damper having a damper constant Dm; and 56, a road face change indicated by a variable x0. Further, 52 designates an under-spring change indicated by a variable x1; 50, an over-sprint, change indicated by a variable x2; 54 a relative change (x1−x2) indicated by a variable y; and 44, a control force generator for generating an active control force f, which is needed for control from an operating, quantity u to be outputted from a controller for controlling the suspension.

From FIG. 3, the state equation of Formula 1 can be expressed as follows:

$$\frac{d}{dt}\begin{bmatrix} y \\ \dot{y} \\ x_2 \\ \dot{x}_2 \\ f \end{bmatrix} = \begin{bmatrix} 0 & 1 & 0 & 0 & 0 \\ -a & -Dm\cdot b & -k_1/m_1 & 0 & -b \\ 0 & 0 & 0 & 1 & 0 \\ k_2/m_2 & Dm/m_2 & 0 & 0 & 1/m_2 \\ 0 & 0 & 0 & 0 & -1/T \end{bmatrix}\begin{bmatrix} y \\ \dot{y} \\ x_2 \\ \dot{x}_2 \\ f \end{bmatrix} + \begin{bmatrix} 0 \\ 0 \\ 0 \\ 0 \\ 1/T \end{bmatrix} u + \begin{bmatrix} 0 \\ k_1/m_1 \\ 0 \\ 0 \\ 0 \end{bmatrix} x_0 \quad \text{[Formula 15]}$$

where T is a response time of the control force generator 44, namely, a time-related lag between the operating quantity u and the active control force f.

a, b are expressed by the following equation:

$$a = k_1/m_1 + k_2/m_1 + k_2/m_2$$

$$b = 1/m_1 + 1/m_2$$

In this embodiment, the road face change 56 is a disturbance x0 from outside.

Assumed as faults in this embodiment are the following: an abnormality in air pressure of the faulty tire, an abnormality in pressure of the gas spring 46, and a fault of the damper 48. These faults are handled as changes in the respective parameters k1, k2, Dm. The disturbance observer 32 is designed based on the vibrating model 10.

Namely, in Formula 15, the parameters k1, k2, Dm are in the second and fourth elements on the right hand side of the equation. Therefore the routes of incoming of the internal disturbance to be caused by the assumed faults are set up in these two portions. This setting-up takes place based on a matrix D expressed by Formula 3. In this case, it is advisable to set up as the following equation:

$$Dw = \begin{bmatrix} 0 & 0 \\ 1 & 0 \\ 0 & 0 \\ 0 & 1 \\ 0 & 0 \end{bmatrix}\begin{bmatrix} w_2 \\ w_4 \end{bmatrix} = \begin{pmatrix} 0 \\ w_2 \\ 0 \\ w_4 \\ 0 \end{pmatrix} \quad \text{[Formula 16]}$$

Figure 4:
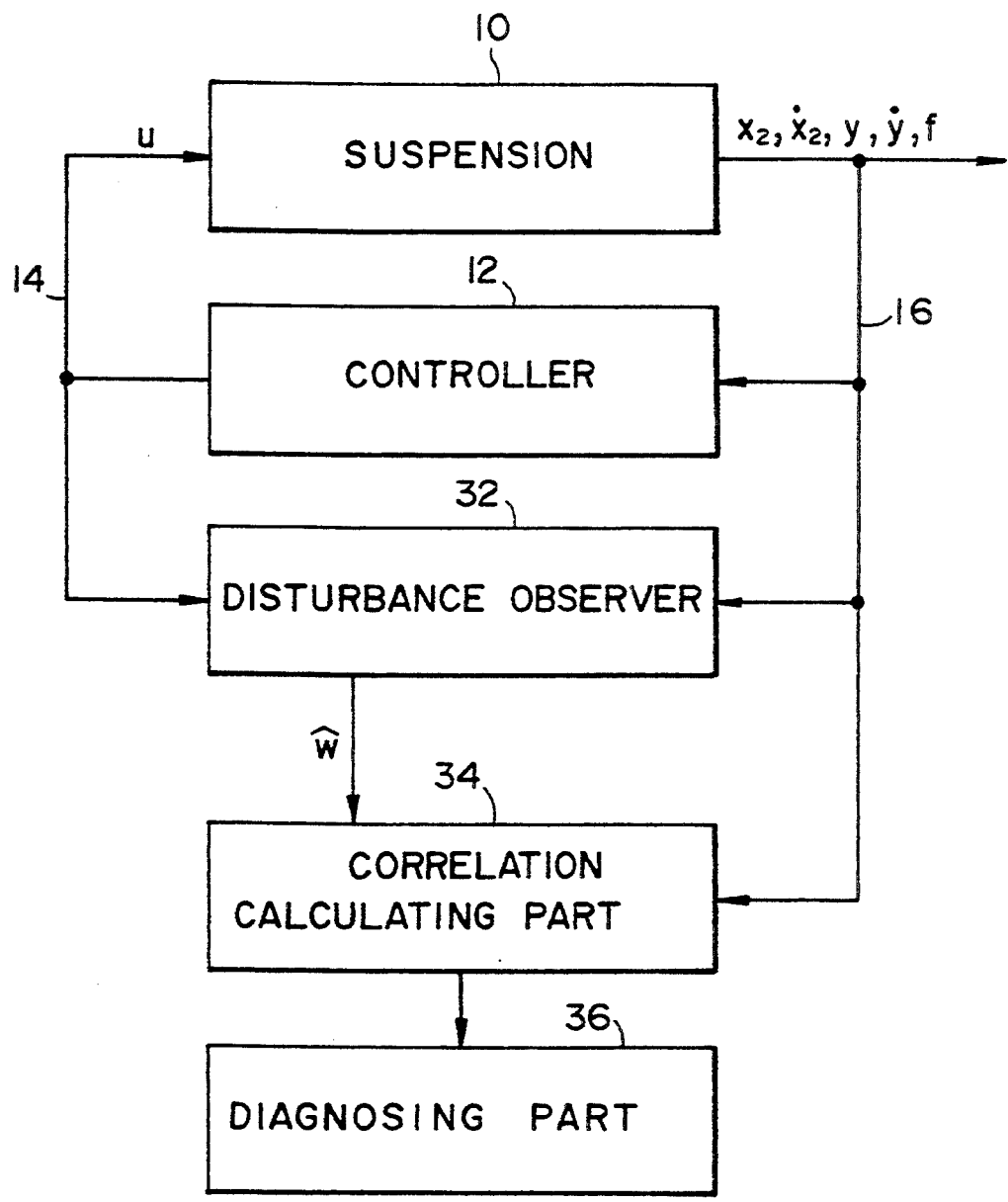
FIG. 4 is a block diagram showing a first mode of the diagnosing apparatus of the first embodiment, in which the suspension model of FIG. 3 is the diagnosing object.

Using this D, an extended system shown in Formula 8 is created to design the disturbance observer 32 of FIG. 4.

In this embodiment, the disturbance observer 32 is designed in the following three separate forms.

In the first mode, the over-spring change x2, the over-spring speed, the relative change y, the relative speed and the active control force f in the suspension model 10 can be all measured. The disturbance observer 32 to be used in such case does not have to estimate the quantity of internal state. The over-spring speed and the relative speed are expressed by the following:

[Formula 17]

$$\text{over-spring speed} = \dot{x}_2$$

$$\text{relative speed} = \dot{y}$$

In the second mode, only the over-spring change x2 and the relative change y can be measured, and the disturbance observer 32 estimates the other unmeasurable quantity of internal state (here the over-spring speed and the relative speed).

In the third mode, only the over-spring change x2 and the relative change y can be measured, and the disturbance observer 32 estimates all internal state quantities including those.

The disturbance observer 32 to be used in connection with each of the foregoing forms and the diagnosing apparatus 30 to be designed using the disturbance observer 32 will now be described in detail.

First Mode

FIG. 4 is a block diagram of the diagnosing apparatus 30 to be used in connection with the first mode. In FIG. 4, reference numeral 10 represents the dynamic system (single-wheel suspension) of FIG. 3; 12, a controller for controlling the suspension; 14, the operating quantity outputted from the controller 12 for controlling the suspension; and 16, every quantity of internal state of the suspension measured using a non-illustrated sensor.

Since all of the internal state quantities are measured using the sensor, it is unnecessary for the disturbance observer 32 to estimate part or all of the internal state quantities as in the second and third modes described below.

The disturbance observer 32 of this form regards a tire air pressure abnormality of the diagnosing object 10 and a pressure abnormality of the gas spring and a fault of the damper as the internal disturbances of the dynamic system 10 to be diagnosed. The integrated disturbance vector $\hat{w}$ as the sum of external and internal disturbance vectors of the dynamic system 10 is calculated from the operating quantity 14 of the controller 12 and all of the state quantities 16 of the measured suspension 10, and is outputted to the correlation calculating part 34.

The correlation calculating part 34 calculates a cross-correlation between the integrated disturbance vector $\hat{w}$, which is estimated and calculated by the disturbance observer 32, and the internal state quantities, i.e. the over-spring change, relative change and relative speed, of the dynamic system 10. At that time, the internal state quantities, such as the over-spring change, relative change and relative speed, are elements uncorrelated with the external disturbance. Accordingly, by calculating the cross-correlation between these internal state quantities and the integrated disturbance vector $\hat{w}$ to eliminate any influence of the road face change penetrating as the external disturbance, it is possible to separate the component relating to the internal disturbance due to a fault and to output the result of calculation to the diagnosing part 36.

The diagnosing part 36 is designed so as to detect any occurrence of fault in the dynamic system 10, based on the calculation result inputted from the cross-correlation calculating part 34, and so as to specify a definite fault portion of the suspension, based on the portion of occurrence of the internal disturbance calculated by the correlation calculating part 34.

The operation of the fault diagnosing apparatus 30 will now be described.

It is now assumed that an assumed fault has occurred in the vibrating model 10 of FIG. 3. In this case, the disturbance observer 32 estimates the second and fourth element of the integrated disturbance w2, w4, which are preset according to possible faults, from the control input f to the suspension 10 and the state of the diagnosing object. At that time, assuming that the estimated delay of these disturbances is negligible, these estimated values can be expressed by the following:

[Formula 18]
$$\hat{w}_2 \simeq -\left(\frac{\Delta k_1}{m_1} + \frac{\Delta k_2}{m_1} + \frac{\Delta k_2}{m_2}\right)\dot{y} - \Delta Dmby -$$

$$\frac{\Delta k_1}{m_1} x_2 + \frac{k_1 + \Delta k_1}{m_1} x_0$$

$$\hat{w}_4 \simeq \frac{\Delta k_2}{m_2} y + \frac{\Delta Dm}{m_2} \dot{y}$$

$$\hat{w}_1 = \hat{w}_3 = \hat{w}_5 = 0$$

where, $\hat{w}_1, \hat{w}_2, \hat{w}_3, \hat{w}_4, \hat{w}_5$ represent estimated values of $\hat{w}_1, \hat{w}_2, \hat{w}_3, \hat{w}_4, \hat{w}_5$
where $\Delta k_1$ represents a parameter change due to the tire air pressure abnormality, $\Delta k_2$ represents a parameter change due to the gas spring pressure abnormality, and $\Delta Dm$ is a parameter change due to the damper fault.

The estimated integrated disturbance $\hat{w}$ is the sum of the product of the above-mentioned parameter change and the state variables (relative change y, its relative speed and over-spring change x2) of the suspension, and the road face change x0 added as the external disturbance.

Accordingly, the cross-correlation calculating part 34 and the diagnosing part 36 perform separation of the external and internal disturbances from the estimated disturbance $\hat{w}$ and judgment of the fault in the following manner.

Firstly, a correlation function $C_{21}$ between an estimated value and a measured value y of w2, a correlation function $C_{41}$ between an estimated value and a measured value y of w4, and a correlation function $C_{42}$ between an estimated value and a measured value (relative speed) of w4 are calculated. The estimated value of w2 contains the road change the external disturbance; however, by taking a correlation between the estimated value and the measured value y, any influence of the road face change uncorrelated with y is removed so that only the fault-related components will be extracted as, for example, the value of the correlation function $C_{21}$.

Then the fault portion is specified from the values of these correlation functions. For example, only the element for the gas spring change appears in the correlation function $C_{41}$. Accordingly if an abnormality is in this value, it is possible to specify the gas spring fault readily.

Likewise, if an abnormality is in the correlation function $C_{42}$, it will be judged that the damper is faulty.

Lastly, correlation function $C_{21}$ will have a value according to the gas spring fault or the tire air pressure abnormality; however, since the gas spring fault is detected by the judgment according to $C_{41}$, it is possible to judge, if no fault is in the gas spring and an abnormality is in $C_{21}$, that the tire has an abnormal air pressure. If a gas spring fault and a tire air pressure abnormality occur at the same time, it is impossible to distinguish one from the other; however, such would scarcely happen in practice.

In this form, the relationship between an estimated integrated disturbance $\hat{w}$ and a fault portion can be expressed by a simple formula; by a simple calculation for a correlation with the state of the diagnosing object, it is possible to separate the internal disturbance, which is due to the fault, from the disturbance from outside easily and hence to specify the fault portion.

Second Mode

Figure 5:
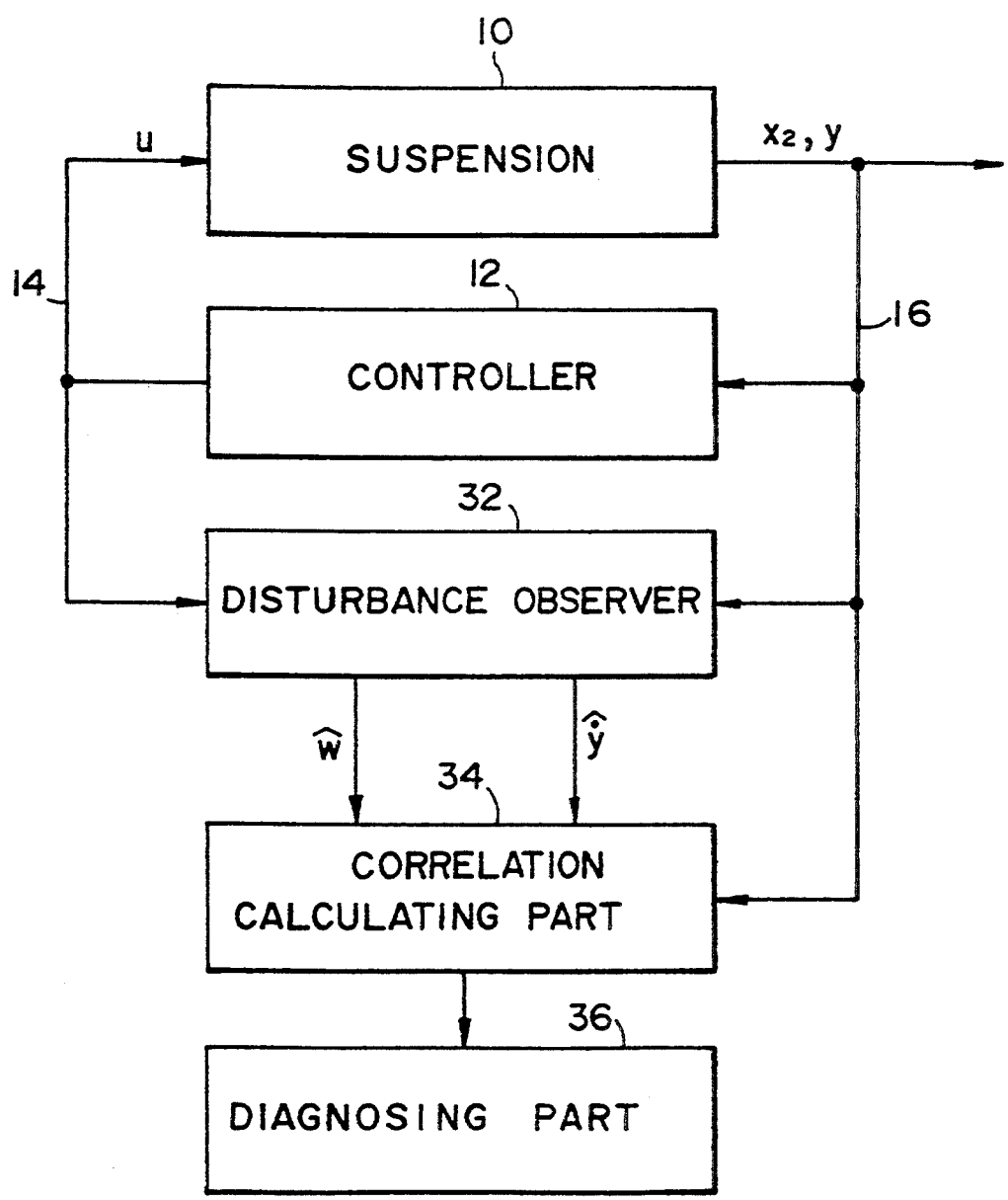
FIG. 5 is a block diagram showing a second mode of the diagnosing apparatus of the first embodiment.

FIG. 5 is a block diagram showing the disturbance observer 32 designed according to the second mode, and the diagnosing apparatus 30 designed using the disturbance observer 32. The parts or elements corresponding to those of the first mode of FIG. 4 are designated by like reference numerals, and their descriptions are omitted here.

In this mode, only the over-spring change x2 and relative change y as the internal state quantities are detected from the dynamic system 10 constituting a vibration model of suspension, while the remaining internal state quantities, e.g. the relative speed, are not directly measured.

In such case, the disturbance observer 32 estimates and calculates the integrated disturbance vector as well as the over-spring speed, relative speed and active control force, which are the unmeasured states out of the internal state quantities of the suspension 10, from the operating quantity 14 and the measured values 16, and then the disturbance observer 32 outputs the result of calculation to the correlation calculating part 36.

This observer is designed as follows:

Firstly, an extended system (following) is created based on Formulae 8, 15 and 16.

[Formula 62]

$$\frac{d}{dt}\begin{bmatrix} y \\ \dot{y} \\ x_2 \\ \dot{x}_2 \\ f \\ w_2 \\ w_4 \end{bmatrix} = \begin{bmatrix} 0 & 1 & 0 & 0 & 0 & 0 & 0 \\ -a & -Dmb & -\frac{k_1}{m_1} & 0 & -b & 1 & 0 \\ 0 & 0 & 0 & 1 & 0 & 0 & 0 \\ \frac{k_2}{m_2} & \frac{Dm}{m_2} & 0 & 0 & \frac{1}{m_1} & 0 & 1 \\ 0 & 0 & 0 & 0 & -\frac{1}{T} & 0 & 0 \\ 0 & 0 & 0 & 0 & 0 & 0 & 0 \\ 0 & 0 & 0 & 0 & 0 & 0 & 0 \end{bmatrix}\begin{bmatrix} y \\ \dot{y} \\ x_2 \\ \dot{x}_2 \\ f \\ w_2 \\ w_4 \end{bmatrix} + \begin{bmatrix} 0 \\ 0 \\ 0 \\ 0 \\ -\frac{1}{T} \\ 0 \\ 0 \end{bmatrix}u$$

Then, in Formula 62, the measurable state quantities y and x2, and the unmeasurable state quantities are separated from one another as follows:

[Formula 63]

$$\frac{d}{dt}\begin{bmatrix} y \\ x_2 \\ \dot{y} \\ \dot{x}_2 \\ f \\ w_2 \\ w_4 \end{bmatrix} = \begin{bmatrix} 0 & 0 & | & 1 & 0 & 0 & 0 & 0 \\ 0 & 0 & | & 0 & 1 & 0 & 0 & 0 \\ -a & -\frac{k_1}{m_1} & | & -Dm \cdot b & 0 & -b & 1 & 0 \\ \frac{k_2}{m_2} & 0 & | & \frac{Dm}{m_2} & 0 & \frac{1}{m_2} & 0 & 1 \\ 0 & 0 & | & 0 & 0 & -\frac{1}{T} & 0 & 0 \\ 0 & 0 & | & 0 & 0 & 0 & 0 & 0 \\ 0 & 0 & | & 0 & 0 & 0 & 0 & 0 \end{bmatrix}\begin{bmatrix} y \\ x_2 \\ \dot{y} \\ \dot{x}_2 \\ f \\ w_2 \\ w_4 \end{bmatrix} +$$

-continued $$\begin{bmatrix} 0 \\ 0 \\ 0 \\ 0 \\ -\frac{1}{T} \\ 0 \\ 0 \end{bmatrix}u$$

For simplicity, Formula 63 is substituted by the following equation:

[Formula 64]

$$\frac{d}{dt}\begin{bmatrix} x_a \\ x_b \end{bmatrix} = \begin{bmatrix} A_{11} & A_{12} \\ A_{21} & A_{22} \end{bmatrix}\begin{bmatrix} x_a \\ x_b \end{bmatrix} + \begin{bmatrix} B_1 \\ B_2 \end{bmatrix}u$$

where, $$x_a = \begin{bmatrix} y \\ x_2 \end{bmatrix}, \quad x_b = [\dot{y}\ \dot{x}_2\ f\ w_2\ w_4]^T$$

And the unmeasurable quantity of state xb containing the integrated disturbance is estimated based on the following equation:

[Formula 65]

$$\dot{\hat{x}}_b = A_{21}x_a + A_{22}\hat{x}_b + B_2u + G\{x_a - (A_{11}x_a + A_{12}\hat{x}_b + B_1u)\}$$

Now from Formulae 64 and 65, an error between a true value xb and its estimated value can be written as follows:

[Formula 66]

$$\dot{\hat{x}}_b - \dot{x}_b = A_{21}x_a + A_{21}\hat{x}_b + B_2u + G\{\dot{x}_a - (A_{11}x_a + A_{12}x_b + B_1u)\} - (A_{21}x_a + A_{22}x_b + B_2u)$$

$$= A_{22}(\hat{x}_b - x_b) + G\{(A_{11}x_a + A_{12}x_b + B_1u) - (A_{11}x_a + A_{12}\hat{x}_b + B_1u)\}$$

$$= (A_{22} - GA_{12})(\hat{x}_b - x_b)$$

where, $\hat{x}_b$ represents an estimated value, and $x_b$ represents an actual value Therefore, assuming that a real matrix G is defined in such a manner that an eigenvalue of every vector of $(A_{22}-GA_{12})$ in Formula 66 is negative, the error expressed by Formula 66 will converge to zero with time. This is, the estimated value will converge to a true value.

Figure 20:
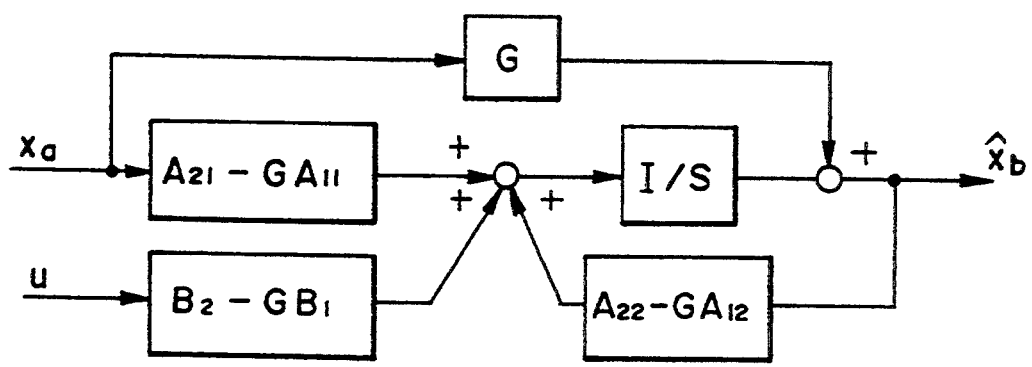
FIG. 20 is a block diagram showing a minimum dimension observer of the present invention.

FIG. 20 equivalently shows Formula 65. As shown in FIG. 20, it is possible to estimate the unmeasurable quantity of state xb by the control input u and the measurable quantity of state $x_a = [y\ x_2]^T$.

Thus, the disturbance observer 65 is designed as a minimum order observer for estimating the integrated disturbance $\hat{w}$ and the unmeasurable internal state quantities, e.g. the relative speed, based on the control input to the suspension and the measured internal state quantities x2, y of the suspension. Even if the disturbance observer 32 is thus designed, the estimated disturbance w can be expressed by Formula 18. Therefore, as the correlation calculating part 34 calculates a correlation in the same manner as the case of the first mode, the diagnosing part 36 can specify occurrence of the fault and its fault portion.

So an estimated value of the relative speed necessary for calculation of correlation can be expressed by the following:

[Formula 19]

$$\text{estimated value of } \dot{y} = \hat{\dot{y}}$$

Therefore it is advisable to execute the similar calculation of correlation as in the first mode, substituting the estimated value for the relative speed.

Since it estimates the internal state quantities with almost no error even if a fault occurs, the disturbance observer 32 can obtain a correlation function almost in the same manner as in the first mode even by calculating the correlation using the estimated value as mentioned above. After the correlation function has been obtained, it is possible to specify a fault in a similar manner as in the first mode; so its description is omitted here.

Thus in this form, the quantity of state used for the correlation function should by no means be limited to that directly measured simply by a sensor, etc., and may be the quantity of the internal state estimated along with the integrated disturbance w by the disturbance observer 32. Accordingly, even though all of the quantities of the internal state of the diagnosing object 10 are not directly measured, it is possible to detect the fault in detail.

Third Mode

Figure 6:
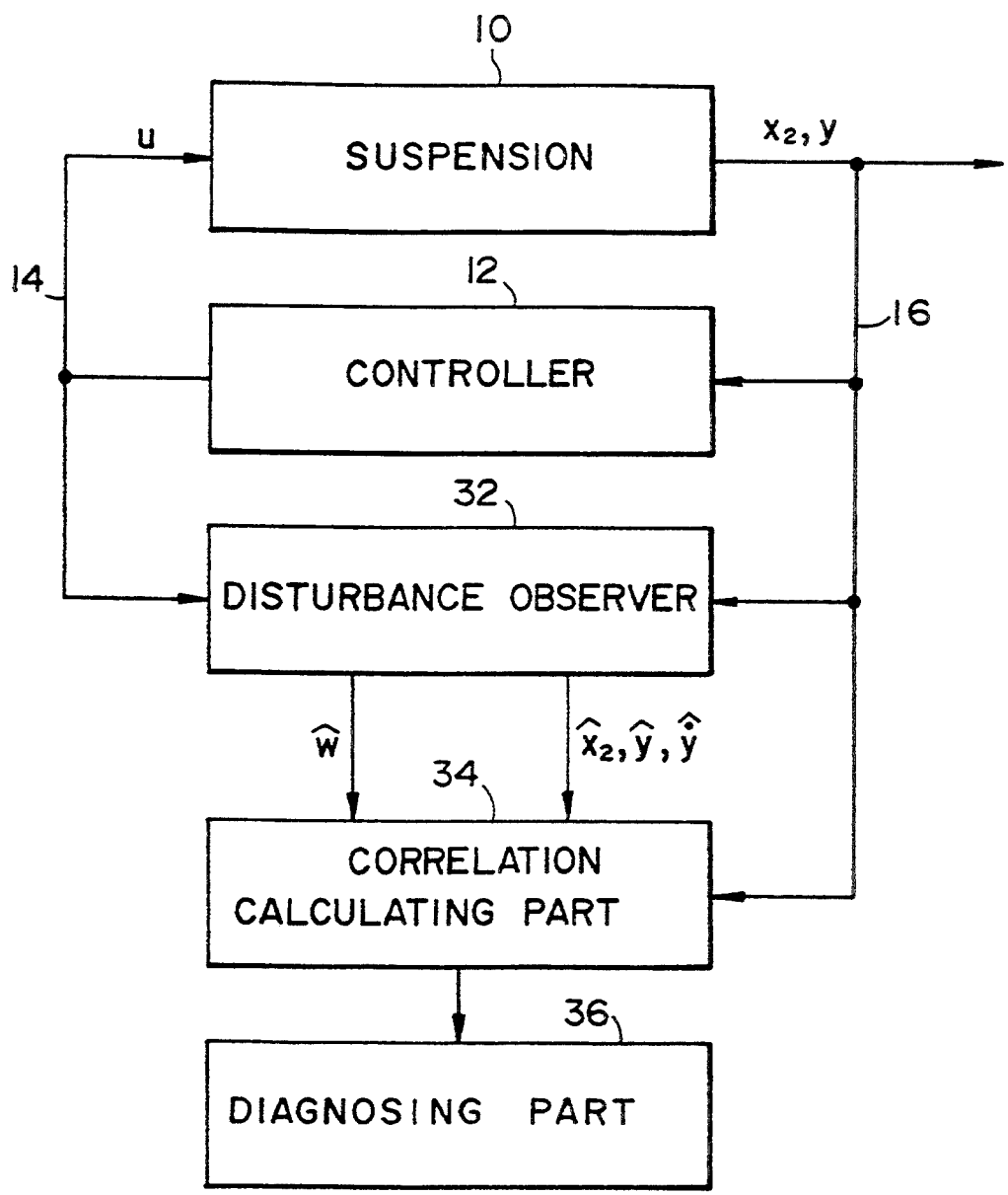
FIG. 6 is a block diagram showing a third mode of the diagnosing apparatus of the first embodiment.
Figure 7:
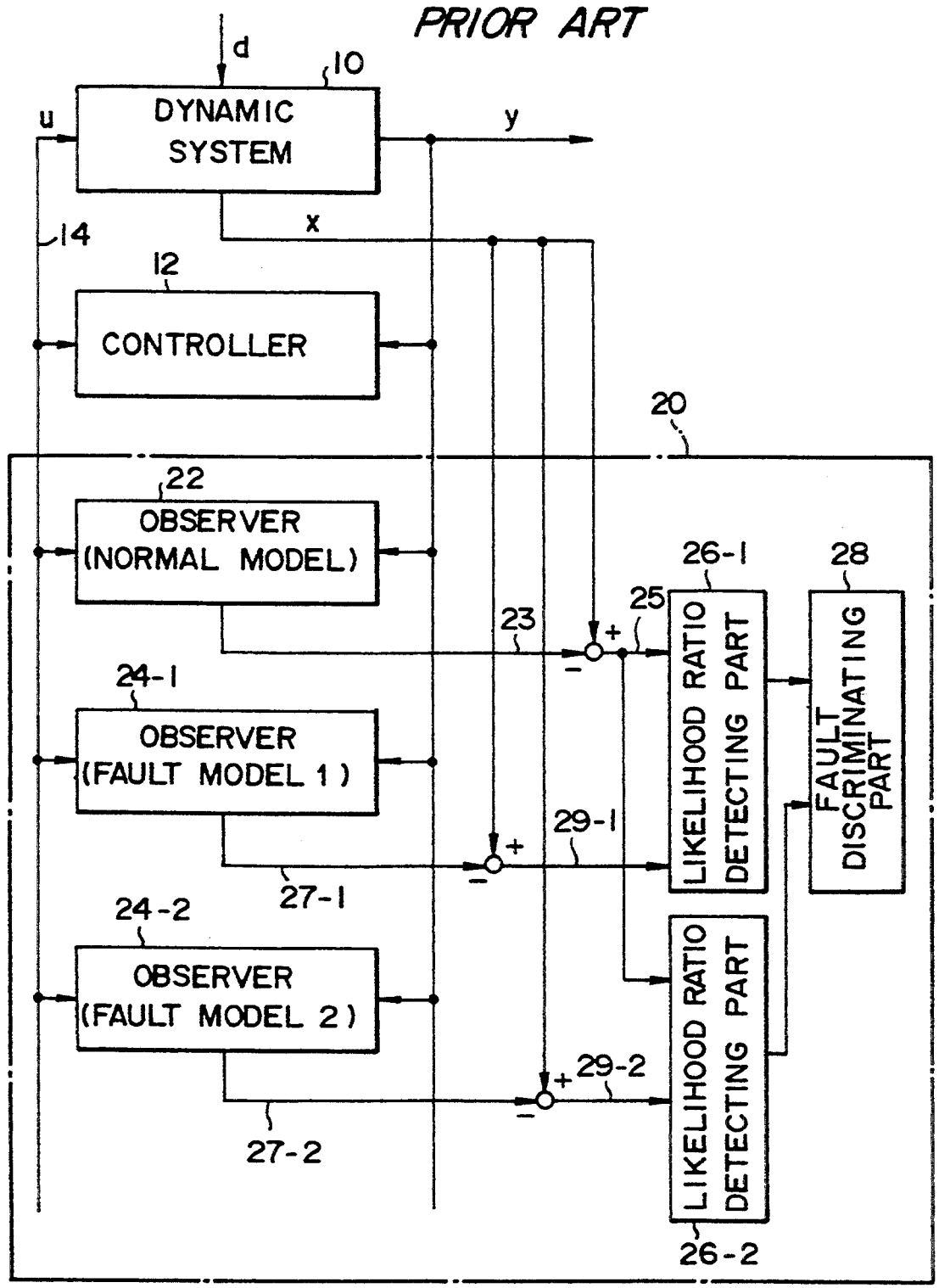
FIG. 7 is a block diagram showing a conventional diagnosing apparatus.

FIG. 6 is a block diagram showing the disturbance observer 32 to be used according to the third mode and the diagnosing apparatus 30 designed using the disturbance observer 32.

This mode is similar to the second mode except that the disturbance observer 32 is designed as a full dimension observer.

Specifically, the disturbance observer 32 of this form is designed so as to estimate the integrated disturbance w and all the quantities of the internal state of the diagnosing object 10 from the control input f of the suspension 10 and the quantities of the internal state x2, y directly measured in the diagnosing object.

This observer is designed from Formulae 8, 15 and 16, based on the following:

[Formula 67]

$$\frac{d}{dt} \begin{bmatrix} \hat{y} \\ \hat{\dot{y}} \\ \hat{x}_2 \\ \hat{\dot{x}}_2 \\ \hat{f} \\ \hat{w}_2 \\ \hat{w}_4 \end{bmatrix} = \begin{bmatrix} 0 & 1 & 0 & 0 & 0 & 0 & 0 \\ -a & -Dm \cdot b & -\frac{k_1}{m_1} & 0 & -b & 1 & 0 \\ 0 & 0 & 0 & 1 & 0 & 0 & 0 \\ \frac{k_2}{m_2} & \frac{Dm}{m_2} & 0 & 0 & \frac{1}{m_1} & 0 & 1 \\ 0 & 0 & 0 & 0 & -\frac{1}{T} & 0 & 0 \\ 0 & 0 & 0 & 0 & 0 & 0 & 0 \\ 0 & 0 & 0 & 0 & 0 & 0 & 0 \end{bmatrix} \begin{bmatrix} \hat{y} \\ \hat{\dot{y}} \\ \hat{x}_2 \\ \hat{\dot{x}}_2 \\ \hat{f} \\ \hat{w}_2 \\ \hat{w}_4 \end{bmatrix} +$$

-continued $$\begin{bmatrix} 0 \\ 0 \\ 0 \\ 0 \\ \frac{1}{T} \\ 0 \\ 0 \end{bmatrix} u + G \left( \begin{bmatrix} y \\ x_2 \end{bmatrix} - \begin{bmatrix} 1 & 0 & 0 & 0 & 0 & 0 & 0 \\ 0 & 0 & 1 & 0 & 0 & 0 & 0 \end{bmatrix} \begin{bmatrix} \hat{y} \\ \hat{\dot{y}} \\ \hat{x}_2 \\ \hat{\dot{x}}_2 \\ \hat{f} \\ \hat{w}_2 \\ \hat{w}_4 \end{bmatrix} \right)$$

where, ^ indicates an estimated value.
G is a real number matrix of 7 lines and 2 rows.

Also at that time, a differential equation, similar to Formula 66, relating to the error between the estimated value and a true value should be formed. And a real matrix G is defined in such a manner that an eigenvalue of every vector of this equation is negative. The larger the absolute value of the eigenvalue, the better; it is desirable to set up within a range of about −300 to −700 rad/s.

Thus from the control input u and the estimated values y, x2, the estimated value expressed by the following formula can be obtained:

[Formula 68]

$$\text{estimated value } [\hat{y} \ \hat{\dot{y}} \ \hat{x}_2 \ \hat{\dot{x}}_2 \ \hat{f} \ \hat{w}_2 \ \hat{w}_4]^T$$

The estimated disturbance $\hat{w}$ is expressed by Formula 18, and so the correlation is calculated in the same manner as in the first mode. The estimated values of the relative change and relative speed are used for calculation of correlation, and after the correlation function has been obtained, the fault portion is specified in the same manner as in the first mode.

In this form, it is possible to specify the fault portion by a simple calculation. Besides, since the disturbance observer 32 to be used in this form is designed as a full dimension observer, it is simpler in design procedure than the minimum dimension observer used in the second mode.

Second to Sixth Embodiments

Second to sixth embodiments of this invention will now be described. In the second and third embodiments, this invention is applied to the dynamic system composed of an active suspension and a wheel. In the fourth to sixth embodiments, the invention is applied to the dynamic system composed of a wheel and a conventional suspension which includes a spring and a damper.

DYNAMIC SYSTEM HAVING ACTIVE SUSPENSION

Second and Third Embodiments

Second Embodiment

Figure 8:
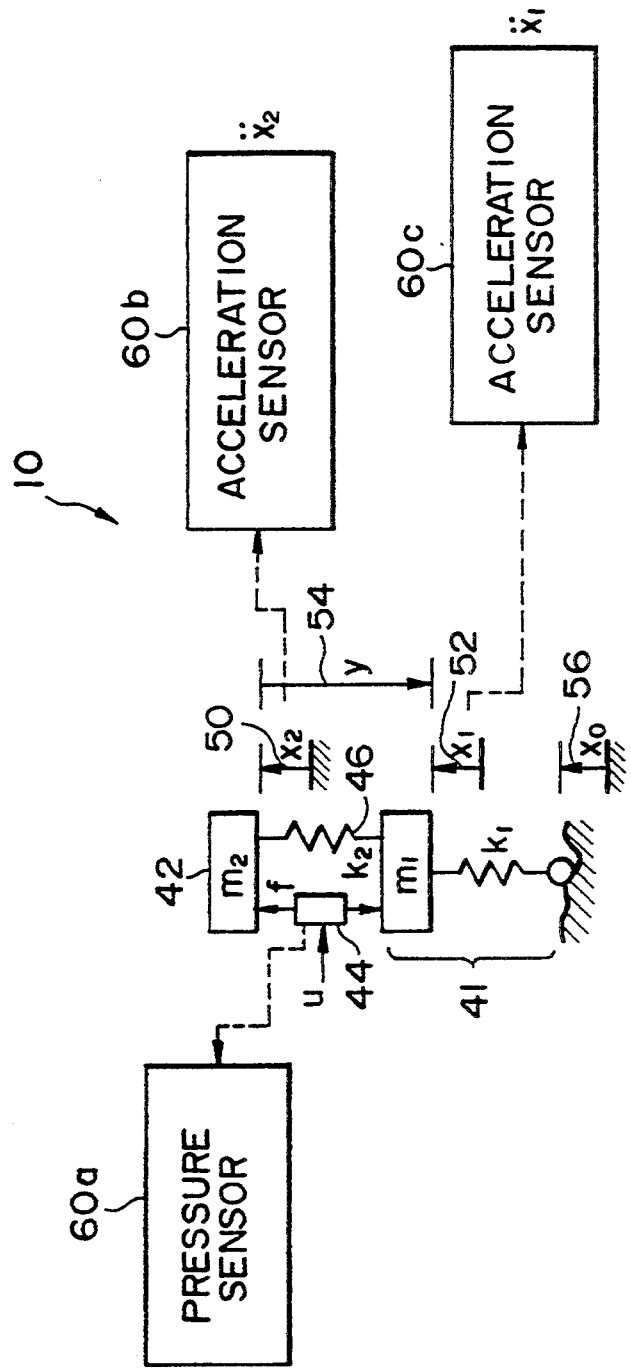
FIG. 8 is a diagram showing a dynamic system composed of an active suspension and a wheel.

FIG. 8 shows a practical example of the dynamic system 10 to be diagnosed. Parts or elements corresponding to those of the dynamic system of FIG. 3 are designated by like reference numerals, and their description is omitted here.

The dynamic system 10 of this embodiment is a system composed of an active suspension and a wheel. In this dynamic system 10, a wheel 41 includes an under-spring mass part indicated by a parameter m1, and a spring part of the tire indicated by a spring constant k1. Reference numeral 42 designates a vehicle body part having an over-spring mass quantity m2; 46, a gas spring having a spring constant k2; 56, a road face change indicated by a variable x0; 52, an under-spring change indicated by a variable x1; 50, an over-spring change indicated by a variable x2; and 54, a relative change (x1−x2) indicated by a variable y. Further, 44 designates a control force generator for generating an active control force f, which is needed for control, from an operating quantity u to be outputted from a controller 12 for controlling the suspension.

Generally, such an active suspension system is equipped with a pressure sensor 60a needed for active control of the suspension. The pressure sensor 60a is situated in a control force generator 44 to measure an active control force f. Further, the system is also equipped with acceleration sensors 60b, 60c for detecting an abnormality in tire air pressure. These acceleration sensors 60b, 60c are mounted on the over-spring part and under spring part respectively, for detecting accelerations of vertical vibrations.

In such dynamic system 10, the state equation of Formula 24 is expressed practically by the following equation:

[Formula 34]

$$\frac{d}{dt}\begin{bmatrix}\dot{x}_2\\x_2\\\dot{y}\\y\\f\end{bmatrix}=\begin{bmatrix}0 & 1 & 0 & 0 & 0\\0 & 0 & k_2/m_2 & 0 & -1/(m_2 T)\\0 & 0 & 0 & 1 & 0\\-k_1/m_1 & 0 & -a & 0 & b/T\\0 & 0 & 0 & 0 & -1/T\end{bmatrix}\begin{bmatrix}\dot{x}_2\\x_2\\\dot{y}\\y\\f\end{bmatrix}+\begin{bmatrix}0\\1/(m_2 T)\\0\\-b/T\\1/T\end{bmatrix}u+\begin{bmatrix}0\\0\\0\\k_1/m_1\\0\end{bmatrix}\dot{x}_0$$

where, $a=k_1/m_1+k_2/m_1+k_2/m_2$, $b=1/m_1+1/m_2$ T represents a delay time between an operated quantity u and an active control force f.

Figure 9:
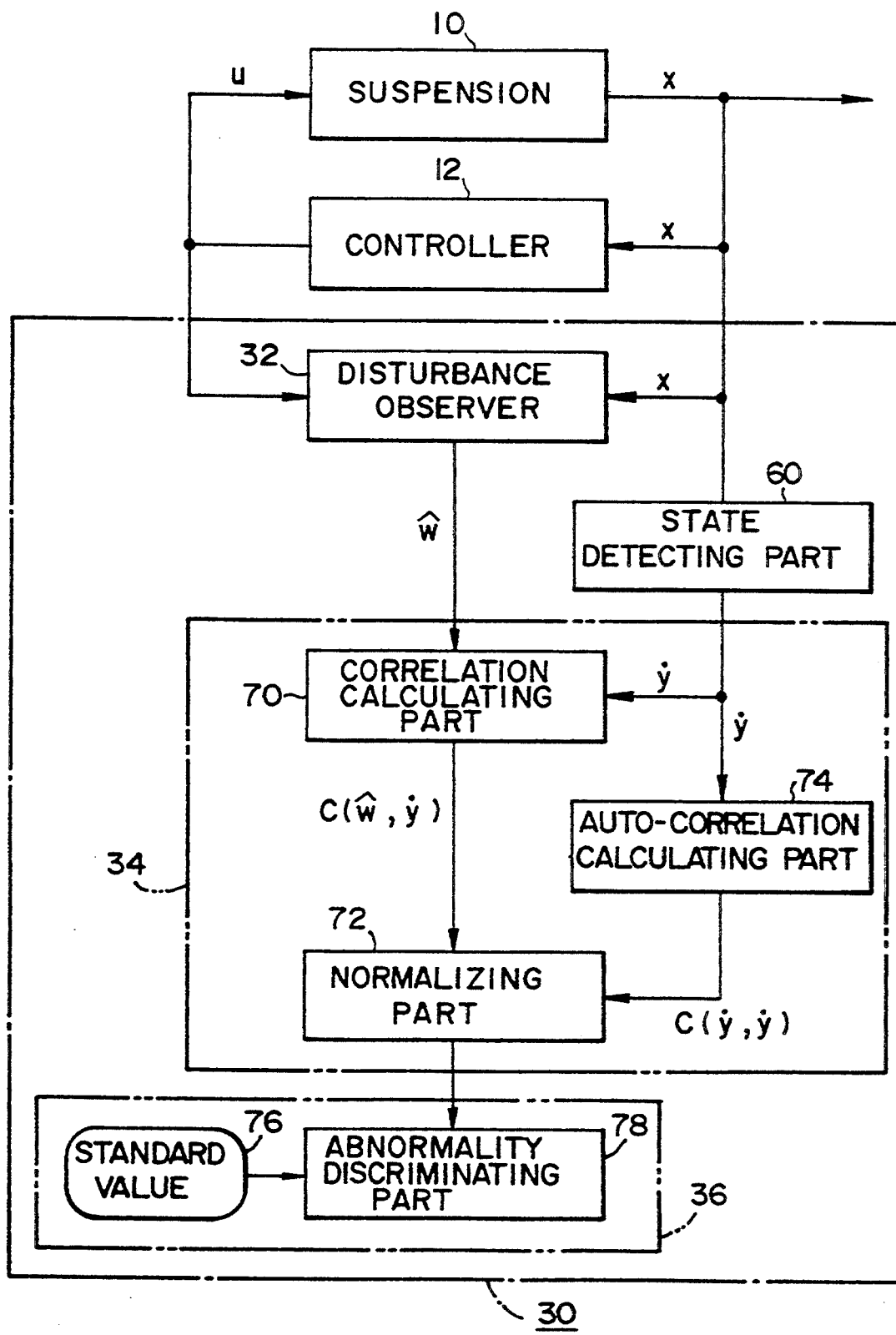
FIG. 9 is a block diagram showing a diagnosing apparatus according to a second embodiment of the present invention, in which the dynamic system of FIG. 8 is a diagnosing object.

FIG. 9 is a block diagram showing the system of this embodiment. As mentioned above, the suspension system 10 to be diagnosed is a system which is designed in such a manner that the operating quantity u to be outputted from a controller 12 is an input and a vector $$x=[\dot{x}_2\ x_2\ \dot{y}\ y\ f]^T$$

contained in Formula 34 is the quantity of the internal state.

Of various elements contained in the internal state vector x, an over-spring acceleration is detected directly from the acceleration sensor 60b of FIG. 8, and the over-spring speed is obtained by integrating the over-spring acceleration. The relative acceleration is obtained from the difference between the under-spring acceleration to be detected by the acceleration sensor 60c and the over-spring acceleration. The relative speed is obtained by integrating the relative acceleration. The individual calculating part for performing the respective calculations are normally incorporated in the suspension system 10 of this embodiment. Therefore, the output of the suspension system 10 will be the internal state vector $$\hat{x}=[\hat{\dot{x}}_2\ x_2\ \dot{y}\ y\ f]^T$$

contained in Formula 34.

The controller 12 of this embodiment receives, as an input signal, the thus outputted internal state vector x and calculates and outputs the operating quantity u as an input signal for the active suspension system 10.

Further, the diagnosing apparatus 30 of this embodiment, in which the active suspension system 10 is to be diagnosed, comprises the disturbance observer 32, the correlation calculating part 34 and the diagnosing part 36.

The disturbance observer 32 is designed so as to receive, as input signals, the output u of the controller 12 and the output x of the active suspension 10 and so as to estimate and calculate a change of the tire spring constant k1 as the internal disturbance occurred in the suspension system 10.

The state detecting part 60 extracts from the output x of the active suspension system 10, the quantity of the state (relative speed in this case) acting on the system 10 by the tire air pressure change.

The correlation calculating part 34 includes a cross-correlation calculating part 70, a normalizing part 72 and an auto-correlation calculating part 74.

The cross-correlation calculating part 70 calculates a cross-correlation between the integrated disturbance estimated by the disturbance observer 32 and the relative speed.

The auto-correlation calculating part 74 calculates an auto-correlation function of the relative speed.

The normalizing part 72 normalizes the cross-correlation function, which is calculated by the cross-correlation calculating part 70, by dividing it by the auto-correlation function calculation by the auto-correlation calculating part 74, extracts only the change quantity of the tire spring constant and outputs the extracted change quantity to the diagnosing part 36.

The diagnosing part 36 includes a memory 76 in which a standard value is stored, and an abnormality discriminating part 78. The diagnosing part 36 is designed so as to compare the change quantity of the tire spring constant obtained by the normalizing part 72 with the standard value of spring constant change quantity corresponding to air pressure to be judged as the abnormality stored in the memory 76, and so as to judge and output the tire air pressure abnormality.

The operation of the apparatus according to the second embodiment will now be described.

In the system 10 composed of an active suspension and a wheel as shown in FIG. 8, when the air pressure of the tire changes and hence the spring constant of the tire changes, the individual quantity of state x of the system 10 indicates a response different from that when the air pressure is normal. This response can be regarded as a composite response under the normal condition and the internal disturbance corresponding to the air pressure change.

The disturbance observer 32 receives, as input signals, the output signal x of the suspension system 10 and the operating quantity u to be added to the suspension system 10, and estimates and calculates the integrated disturbance w containing the internal disturbance and the external disturbance (external disturbance such as road face change penetrating from outside the system), and outputs the result of the calculation.

Therefore, assuming that the tire spring constant is k1 when the tire air pressure is normal, the external disturbance expressed by the following equation is calculated and outputted from the disturbance observer 32.

$$\hat{w} = \frac{k_1}{m_1} \dot{x}_0 \qquad \text{[Formula 35]}$$

The external disturbance to be estimated, calculated and outputted in this manner is a random disturbance equivalent to a differential value of the road face disturbance and totally uncorrelated at all with the state of the system 10.

Now, assuming that the tire air pressure varies and its spring constant varies by $\Delta k_1$ to be $(k_1 + \Delta k_1)$, the disturbance observer 32 outputs an integrated disturbance signal expressed by the following equation:

$$\hat{w} = -\frac{\Delta k_1}{m_1} \dot{x}_2 - \frac{\Delta k_1}{m_1} \dot{y} + \frac{k_1 + \Delta k_1}{m_1} \dot{x}_0 \qquad \text{[Formula 36]}$$

Therefore, it is required to remove an external disturbance such as a road face disturbance from $\hat{w}$ estimated and calculated by the disturbance observer 32 and hence to detect only the internal disturbance due to the tire air pressure change. Accordingly, the correlation calculating part 70 calculates a cross-correlation between the estimated disturbance $\hat{w}$ and an element of the quantity of the internal state uncorrelated with the external disturbance. Formula 36 contains a relative speed and an over-spring speed as the corresponding quantities of state; in this embodiment, a correlation with the relative speed obtained from the suspension system 10 is calculated. As suming that its correlation function is:

$$C(\hat{w}, \dot{y})$$

this can be calculated as follows:

$$C(\hat{w}, \dot{y}) = \frac{1}{N} \sum_{k=1}^{N} (\hat{w} - \bar{w})(\dot{y} - \bar{\dot{y}}) \qquad \text{[Formula 37]}$$

By calculating such cross-correlation, it is possible to extract the tire air pressure change quantity $\Delta k$ and to separate it from the term of tile road face disturbance. Namely, the estimated disturbance $\hat{w}$ and relative speed to be outputted are sampled successively at N points to obtain mean values shown by the following:

$$\bar{w} = \frac{1}{N} \sum_{k=1}^{N} w, \quad \bar{\dot{y}} = \frac{1}{N} \sum_{k=1}^{N} \dot{y} \qquad \text{[Formula 38]}$$

Using these mean values, the calculation of correlation of Formula 37 is performed. Thus if the correlation function:

$$C(w, \dot{y})$$

is obtained, the term of the over-spring speed and the road surface change speed are canceled so that this value is given by the following:

$$C(\hat{w}, \dot{y}) \simeq -\frac{\Delta k_1}{m_1} \cdot \frac{1}{N} \sum_{k=1}^{N} (\dot{y} - \bar{\dot{y}})^2 \qquad \text{[Formula 39]}$$

The thus calculated correlation function can be expressed by the product of the term $(\Delta k_1/m_1)$ representing a change in tire spring constant and the auto-correlation function (indicated by Formula 40 below) of relative speed of the suspension, which speed is used for calculation of correlation. Therefore, by dividing the obtained correlation function by the auto-correlation function of the quantity of the state (relative speed), it is possible to detect the change quantity in spring constant quantitatively.

$$\frac{1}{N} \sum_{k=1}^{N} (\dot{y} - \bar{\dot{y}})^2 \qquad \text{[Formula 40]}$$

Namely, as is apparent from Formula 39, of various frequency components of the estimated disturbance w, the above-mentioned correlation function $$C(\hat{w}, \dot{y})$$

has a value equivalent to frequency components of the internal disturbance caused only by the change in tire spring constant. Therefore, from this correlation function $$C(\hat{w}, \dot{y})$$

it is possible to detect the change quantity of the spring constant.

The above mentioned auto-correlation function of the relative speed is calculated by the auto-correlation calculating part 74 and is inputted to the normalizing part 72. The normalizing part 72 detects and outputs the change quantity in spring constant of a tire, as indicated by the following formula, by dividing the correlation function, $$C(\hat{w}, \dot{y})$$

which is to be outputted from the cross-correlation calculating part 70, by the auto-correlation function $$C(\dot{y}, \dot{y})$$

to be output ted from the auto-correlation calculating part 74.

$$J \stackrel{\Delta}{=} \frac{C(\hat{w}, \dot{y})}{C(\dot{y}, \dot{y})} \simeq -\frac{\Delta k_1}{m_1} \qquad \text{[Formula 41]}$$

where the parameter m1 is an already known tire mass value, it is possible to know the change quantity $\Delta k_1$ of the spring constant accurately from the output J of the normalizing part 72.

The abnormality discriminating part 78 compares the thus obtained spring constant change quantity $\Delta k_1$ with the standard value of the change quantity to be judged as an abnormality, and discriminates an abnormality of the air pressure.

Figure 11:
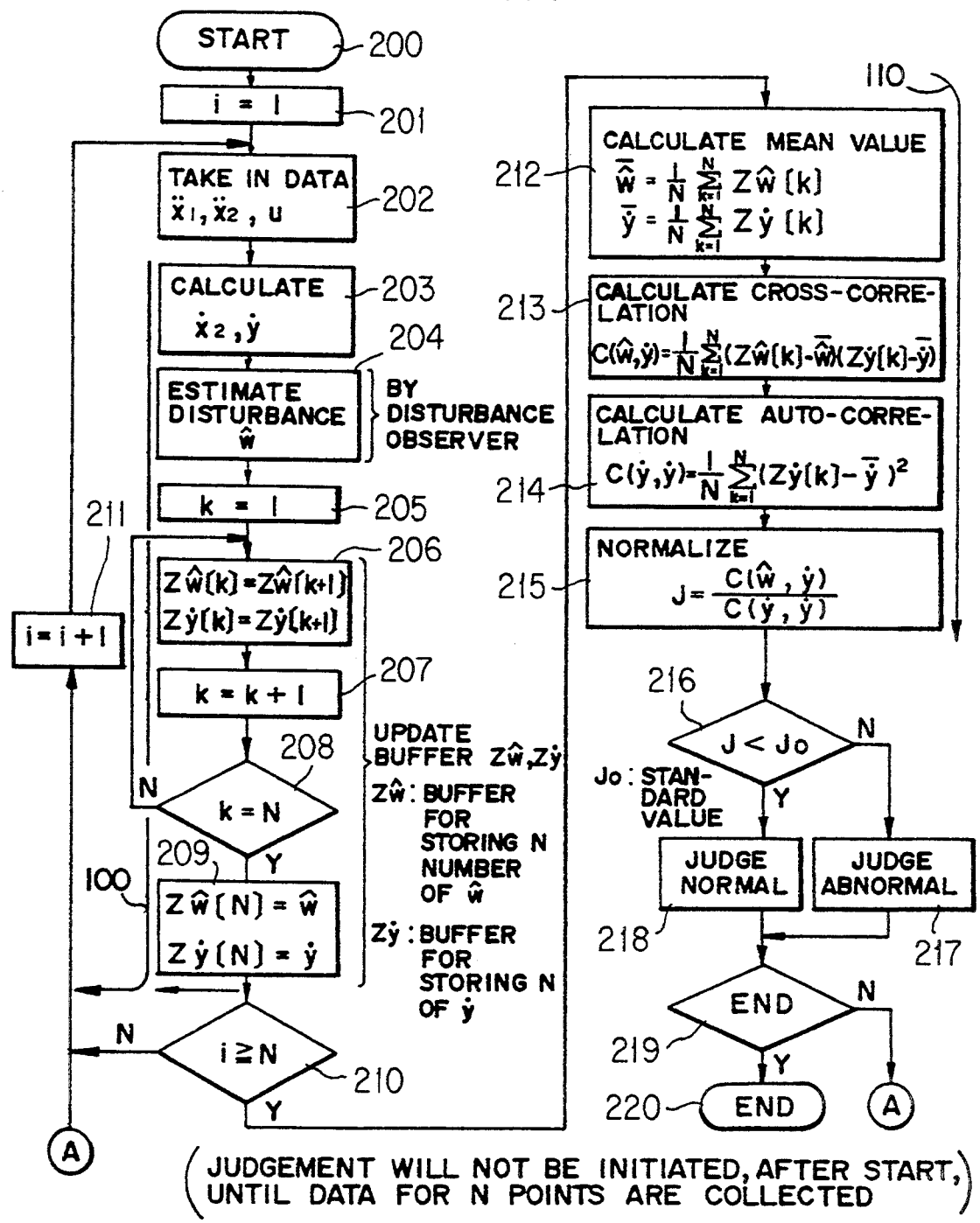
FIG. 11 is a flow diagram showing the operation of the diagnosing apparatus of FIG. 9.

FIG. 11 is a flow diagram showing an algorithm for detecting an abnormality in tire air pressure as described above.

In this embodiment, disturbance estimation and data sampling take place every 5 ms along flow 100 and repeated N=400 times.

Then, along a flow 110, using data obtained by the previous 400 times repeated samplings (sampling in past two seconds), the cross-correlation and auto-correlation are calculated, the normalized value j of Formula 41 is obtained to discriminate whether the tire air pressure is normal or abnormal.

In this embodiment, since the disturbance observer 32 has a response of 5 ms, a relationship such that a differential value of the integrated disturbance w of the dynamic system 10 is approximately zero is concluded. As shown in FIG. 11, the computations begin (step 200), and the value "i" is initialized at 1 (step 201). Then, the values $\dot{x}_1$, $\dot{x}_2$ and u are input from the acceleration sensors 60b, 60c and the controller 12 (step 202). From these values, $\dot{x}_2$ and $\dot{y}$ are calculated (step 203) and the disturbance value $\hat{w}$ is estimated by the disturbance estimating means 32. Then, the value "k" is set to 1 (step 205) and the terms $Z\hat{w}[k]$ and $Z\dot{y}[k]$ are incremented by k+1 until k=N (steps 206-208). When k has become equal to N, the buffer functions $Z\hat{w}$ and $Z\dot{y}$ are set to $\hat{w}$ and $\dot{y}$, respectively, (step 209) and steps 202 through 209 are repeated while incrementing "i" by 1 each time. When "i" has become equal to or greater than N, steps 212 through 215 are executed so that the output J of normalizing means 72 is determined. J is compared with a standard value Jo (step 216), in order to discriminate a normal vs. abnormal state (steps 217-220). This process will be explained in greater detail below.

Figure 12:
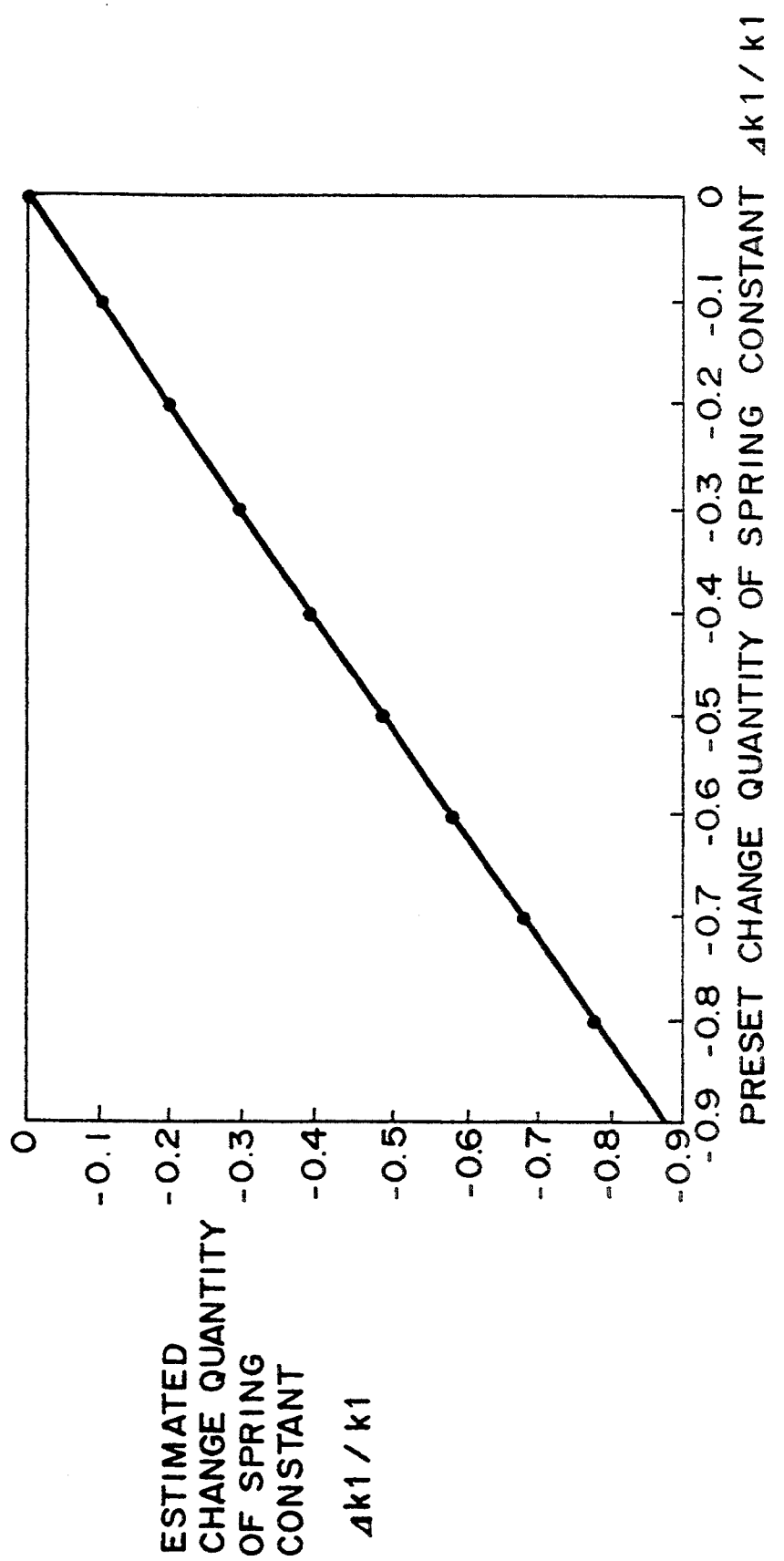
FIG. 12 is an actually measured data graph showing a correlation between the spring constant change quantity estimated using the diagnosing apparatus of FIG. 9 and the actually measured spring constant.

FIG. 12 shows a correlation between the estimated value of the tire spring constant and the actually measured value of the spring constant, according to the abnormality detection algorithm of FIG. 11.

This measuring experiment was executed using the following method:

Firstly, the change quantity Δk1/k1 is preset with respect to the spring constant k1 when the air pressure is normal, and the air pressure is initially reduced to meet the preset value.

While the car is running, an estimated value of the spring constant change quantity after the lapse of 2 seconds after the start of estimation is recorded. A subsequent estimated value will be identical to the estimated value at that time point.

Then the experiment is repeated, with the value of Δk1/k1 being varied stepwise at a pitch of 0.1. The resulting data is shown in FIG. 12. It is understood from this experimental result that with the diagnosing apparatus 35 of this invention, the spring constant change quantity can be estimated at a high precision of less than plus/minus 3%.

In this embodiment, the relative speed is used in calculating the cross-correlation. Alternatively, the over-spring speed may be used in calculating the correlation. In this case, the cross-correlation calculating part 70 should be designed so as to calculate a cross-correlation between the estimated disturbance $\hat{w}$ and the over-spring speed based on the following equation. And the auto-correlation calculating part 74 should be designed so as to calculate an auto-correlation $$C(\dot{x}_2, \dot{x}_2)$$

of the over-spring speed. And the normalizing part 72 should be designed so as to divide the cross-correlation by the auto-correlation and so as to detect an abnormality in tire air pressure.

$$C(\hat{w}, \dot{x}_2) = \frac{1}{N} \sum_{k=1}^{N} (\hat{w} - \bar{\hat{w}})(\dot{x}_2 - \bar{\dot{x}}_2) \quad \text{[Formula 42]}$$

According to the second embodiment, unlike the conventional art, since it is unnecessary to mount a pressure sensor, a wireless unit, etc. directly in the tire, any problem in reliability, durability, etc. relating to these unnecessary units does not happen to occur.

Further, since sensors 60a, 60b, 60c conventionally used for controlling the active suspension can be used also for the sensor in the second embodiment, it is unnecessary to mount a new sensor for detection of an air pressure abnormality.

In the second embodiment, the tire air pressure abnormality is discriminated by setting the standard value of air pressure change quantity of the tire to be judged abnormal and comparing the change quantity obtained by the disturbance observer 12 and the standard value. The apparatus of this invention should by no means be limited to the illustrated examples and may be used for various kinds of additional applications. For example, since the change quantity of the tire spring constant can be detected accurately, it is possible to use the apparatus as an air pressure monitor so that the driver can always check the state of the detected air pressure. Further, if information on the detected air pressure is utilized to the control rules for the active suspension, it is possible to realize a comfortable driving fit to the changes in air pressure. By using this air pressure information to the suspension control which can vary the damper constant, it is possible to realize a more comfortable driving fit to the changes in air pressure.

In the second embodiment, the system 10 composed of a suspension and a wheel is modeled by the state equation of Formula 34 so that only the over-spring and under-spring accelerations of the suspension can be measured, while the remaining state quantities are obtained by integrating these signals. In the case where the sensor for measuring the suspension is not an acceleration sensor, the model is varied to fit to the quantity of state to be measured by the sensor so that the tire air pressure abnormality can be discriminated in the same method.

For example, assuming that the quantities of state to be measured by the sensor are not acceleration signals but an over-spring change x2 and a relative change y, a model corresponding to Formula 34 is defined by the following equation:

$$\frac{d}{dt}\begin{bmatrix} x_2 \\ \dot{x}_2 \\ y \\ \dot{y} \\ f \end{bmatrix} = \begin{bmatrix} 0 & 1 & 0 & 0 & 0 \\ 0 & 0 & k_2/m_2 & 0 & 1/m_2 \\ 0 & 0 & 0 & 1 & 0 \\ -k_1/m_1 & 0 & -a & 0 & -b \\ 0 & 0 & 0 & 0 & -1/T \end{bmatrix}\begin{bmatrix} x_2 \\ \dot{x}_2 \\ y \\ \dot{y} \\ f \end{bmatrix} + \begin{bmatrix} 0 \\ 0 \\ 0 \\ 0 \\ 1/T \end{bmatrix} u + \begin{bmatrix} 0 \\ 0 \\ 0 \\ k_1/m_1 \\ 0 \end{bmatrix} \quad \text{[Formula 43]}$$

In Formula 43, of the state $$x = x_2\ \dot{x}_2\ y\ \dot{y}\ f]^T$$

of the suspension, the over-spring speed and relative speed should be obtained from the difference from the over-spring change x2 and the relative change y.

Third Embodiment

Figure 10:
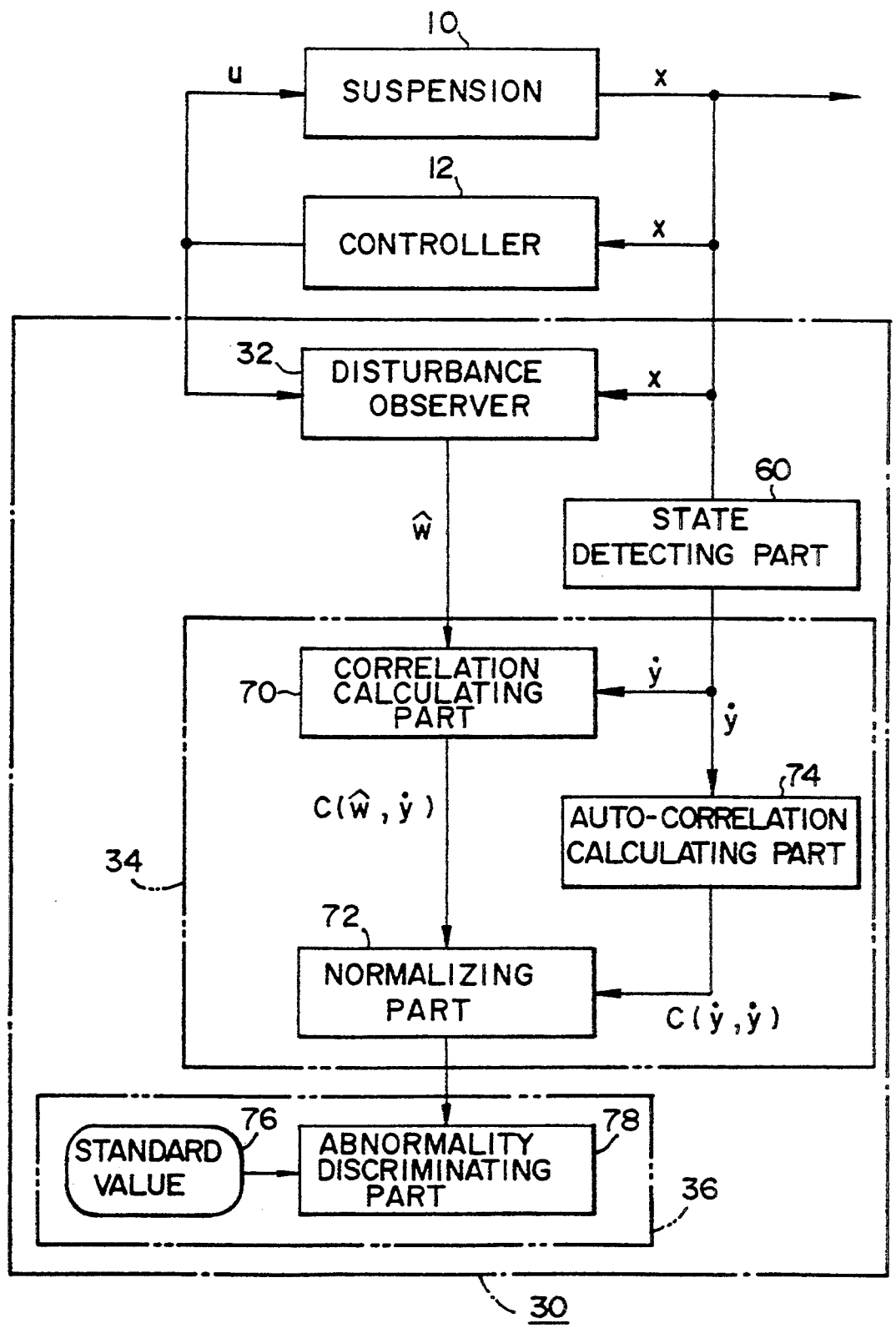
FIG. 10 is a block diagram showing a third embodiment of the present invention, which is a modification of the diagnosing apparatus of FIG. 9.

FIG. 10 shows a diagnosing apparatus 30 according to a third embodiment in which such suspension model 10 is the diagnosing object.

The disturbance observer 32 is designed so as to estimate and calculate the integrated disturbance, which is expressed by the following equation, when the tire air pressure changes and hence the tire spring constant changes.

$$\hat{w} = -\frac{\Delta k_1}{m_1} x_2 - \frac{\Delta k_1}{m_1} y + \frac{k_1 + \Delta k_1}{m_1} x_0 \quad \text{[Formula 44]}$$

By dividing the cross-correlation between the estimated disturbance and the relative change y by the auto-correlation of the relative change, it is possible to judge the tire air pressure abnormality in a manner similar to the previous embodiment. Alternatively, by dividing the cross-correlation between the estimated disturbance $\hat{w}$ and the over-spring change x2 by the auto-correlation function of the over-spring change x2, it is also possible to judge the tire air pressure abnormality likewise.

Accordingly, in the second and third embodiments, the quantity of state to be used for calculating the cross-correlation with the estimated disturbance $\hat{w}$ may be a quantity of state which is influential on the system according to the air pressure change.

Dynamic System Having Not Active But Conventional Suspension

Fourth to Sixth Embodiments

Figure 13:
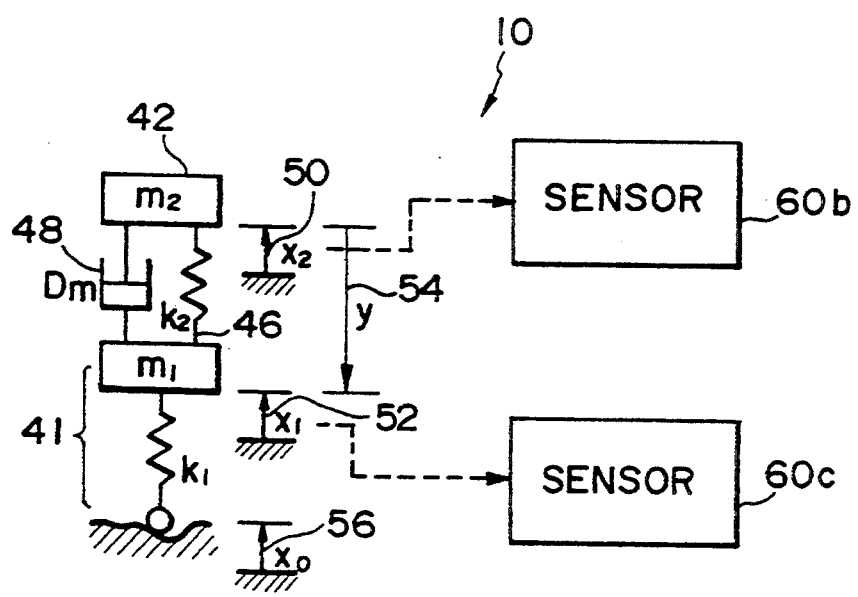
FIG. 13 is a diagram showing a dynamic system composed of a conventional suspension and a wheel.

FIG. 13 shows a suspension system 10 composed of a wheel and a not active but conventional suspension. In this suspension system 10, a wheel 41 includes an under-spring mass part indicated by a parameter m1, and a spring part of the tire indicated by a spring constant k1. Reference numeral 42 designates a vehicle body part having an over-spring mass quantity m2; 46, a spring having a spring constant k2; 48, a damper having a damper constant Dm; 56, a road face change indicated by a variable x0; 52, an under-spring change indicated by a variable x1; 50, an over-spring change indicated by a variable x2; and 54, a relative change (x1−x2) indicated by a variable y. The dynamic system 10 like the foregoing embodiments, is equipped with acceleration sensors 60b, 60c mounted on the over-spring part and under-spring part, respectively, for detecting vertical vibrations of the wheel.

This suspension system 10 can be expressed by the following state equation:

$$\frac{d}{dt}\begin{bmatrix} \dot{x}_2 \\ \ddot{x}_2 \\ \dot{y} \\ \ddot{y} \end{bmatrix} = \begin{bmatrix} 0 & 1 & 0 & 0 \\ 0 & 0 & k_2/m_2 & Dm/m_2 \\ 0 & 0 & 0 & 1 \\ -k_1/m_1 & 0 & -a & -Dm \cdot b \end{bmatrix}\begin{bmatrix} \dot{x}_2 \\ \ddot{x}_2 \\ \dot{y} \\ \ddot{y} \end{bmatrix} + \begin{bmatrix} 0 \\ 0 \\ 0 \\ k_1/m_1 \end{bmatrix} x_0 \quad \text{[Formula 45]}$$

where, a=k1/m1+k2/m1+k2/m2, b=1/m1+1/m2

Fourth Embodiment

Figure 14:
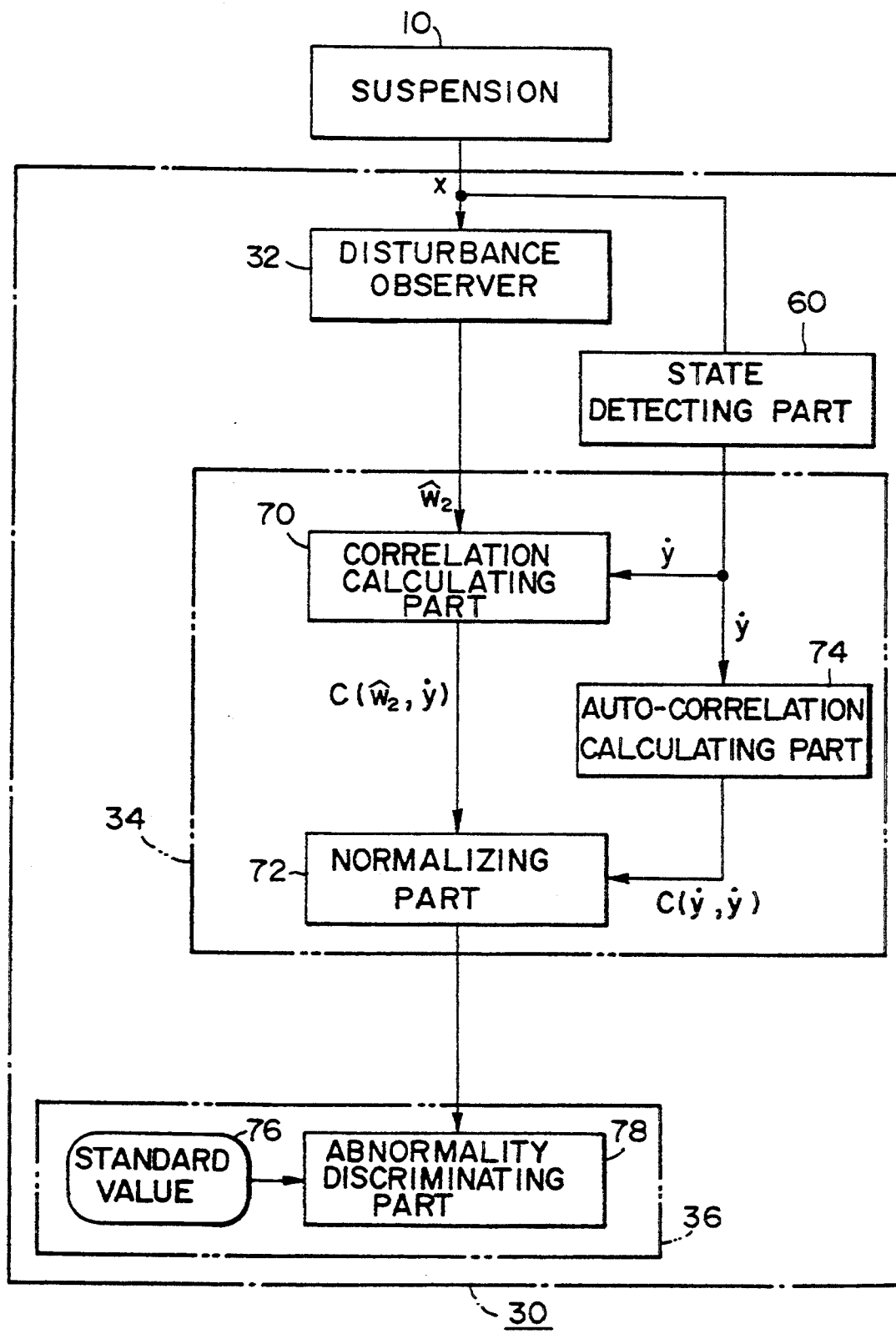
FIG. 14 is a block diagram showing a diagnosing apparatus according to a fourth embodiment in which the dynamic system of FIG. 13 is a diagnosing object.

FIG. 14 shows a fourth embodiment in which the suspension system 10 of FIG. 13 is the diagnosing object.

In some of the existing suspension systems 10, the damping force of the suspension is varied according to the road face condition and the driver's judgment; this can be modeled by assuming that the damper constant Dm changes. At that time, Dm in FIG. 13 stands for a typical value of Dm changing.

Each element of the quantity of state x contained in Formula 45 is calculated and outputted by the calculating part mounted in the suspension system 10 in a manner similar to the previous embodiment. Namely, the over-spring acceleration is outputted directly from the sensor 62b, and the over-spring speed is obtained by integrating the value of the over-spring acceleration. The relative acceleration is obtained from the difference between the under-spring acceleration and the over-spring acceleration, and the relative speed is obtained by integrating the relative acceleration, etc. Accordingly, the output of the suspension system 10 is the internal state vector x of Formula 45.

A dynamic system 30 in which the foregoing suspension system 10 is the diagnosing object will now be described in detail.

If the tire spring constant is k1 when the tire air pressure is normal, the disturbance observer 32 estimates and calculates an integrated disturbance expressed by the following equation:

$$\hat{w} = \begin{bmatrix} \hat{w}_1 \\ \hat{w}_2 \end{bmatrix} = \begin{bmatrix} \frac{\Delta Dm}{m_2} \ddot{y} \\ -\Delta Dmb\ddot{y} + \frac{k_1}{m_1} x_0 \end{bmatrix} \quad \text{[Formula 46]}$$

The damping constant Dm of the suspension is assumed to be variable, and a change quantity from the typical value is expressed by $\Delta Dm$.

Assuming that the tire air pressure varies and its spring constant varies by $\Delta k1$ to be (k1+$\Delta k1$), the disturbance observer 32 outputs a disturbance signal expressed by the following equation:

$$\hat{w} = \begin{bmatrix} \hat{w}_1 \\ \hat{w}_2 \end{bmatrix} = \begin{bmatrix} \frac{\Delta Dm}{m_2} \ddot{y} \\ -\Delta Dmb\ddot{y} - \frac{\Delta k_1}{m_1} \dot{x}_2 - \frac{\Delta k_1}{m_1} \dot{y} + \frac{k_1 + \Delta k_1}{m_1} \dot{x}_0 \end{bmatrix} \quad \text{[Formula 47]}$$

Thus, $\hat{w}$ estimated by the disturbance observer 32 contains a disturbance caused due to the change in damper constant, an internal disturbance caused due to the change in tire air pressure, and an external disturbance received from the road face.

The cross-correlation calculating part 70 calculates a cross-correlation between the estimated second element of the integrated disturbance $\hat{w}_2$ containing the internal disturbance, which is caused due to the tire air pressure change, and the relative speed. The auto-correlation calculating part 74 calculates and outputs an auto-correlation of the relative speed by the same method as the foregoing embodiment.

And the normalizing part 72 divides the output of the cross-correlation calculating part 70 by the output of the auto-correlation calculating part 74 to detect the spring constant change quantity, and outputs it to the abnormality discriminating part 78.

The abnormality discriminator 78 compares the inputted spring constant change quantity with a predetermined standard value to discriminate the air pressure abnormality.

As mentioned above, according to this embodiment, even in a case of a wheel, which is installed in a not active conventional suspension, it is possible to detect an abnormality of the tire air pressure by merely mounting the acceleration sensors 60b, 60c for detecting the over-spring and under-spring accelerations of the suspension.

In the fourth embodiment, the system 10 composed of a suspension and a wheel is modeled by the state equation of Formula 43 so that only the over-spring and under-spring accelerations of the suspension can be measured by the sensors, while the remaining state quantities are obtained by integrating these signals. In the case where the sensor for measuring the suspension is not an acceleration sensor, the model is varied to fit to the quantity of state to be measured by the sensor so that the tire air pressure abnormality can be discriminated in the same way.

Fifth Embodiment

The fifth embodiment is characterized in that the state quantities to be measured by the sensors are not acceleration signals but an over-spring change x2 and a relative change y. In the fifth embodiment, a model corresponding to Formula 43 is defined by the following equation:

[Formula 48]
$$\frac{d}{dt}\begin{bmatrix} x_2 \\ \dot{x}_2 \\ y \\ \dot{y} \end{bmatrix} = \begin{bmatrix} 0 & 1 & 0 & 0 \\ 0 & 0 & k_2/m_2 & Dm/m_2 \\ 0 & 0 & 0 & 1 \\ -k_1/m_1 & 0 & -a & -Dm \cdot b \end{bmatrix}\begin{bmatrix} x_2 \\ \dot{x}_2 \\ y \\ \dot{y} \end{bmatrix} + \begin{bmatrix} 0 \\ 0 \\ 0 \\ k_1/m_1 \end{bmatrix} x_0$$

In Formula 48, of the quantities of state x of the suspension, the over-spring speed and the relative speed are obtained from the difference of the over-spring change x2 and the relative change y.

Figure 15:
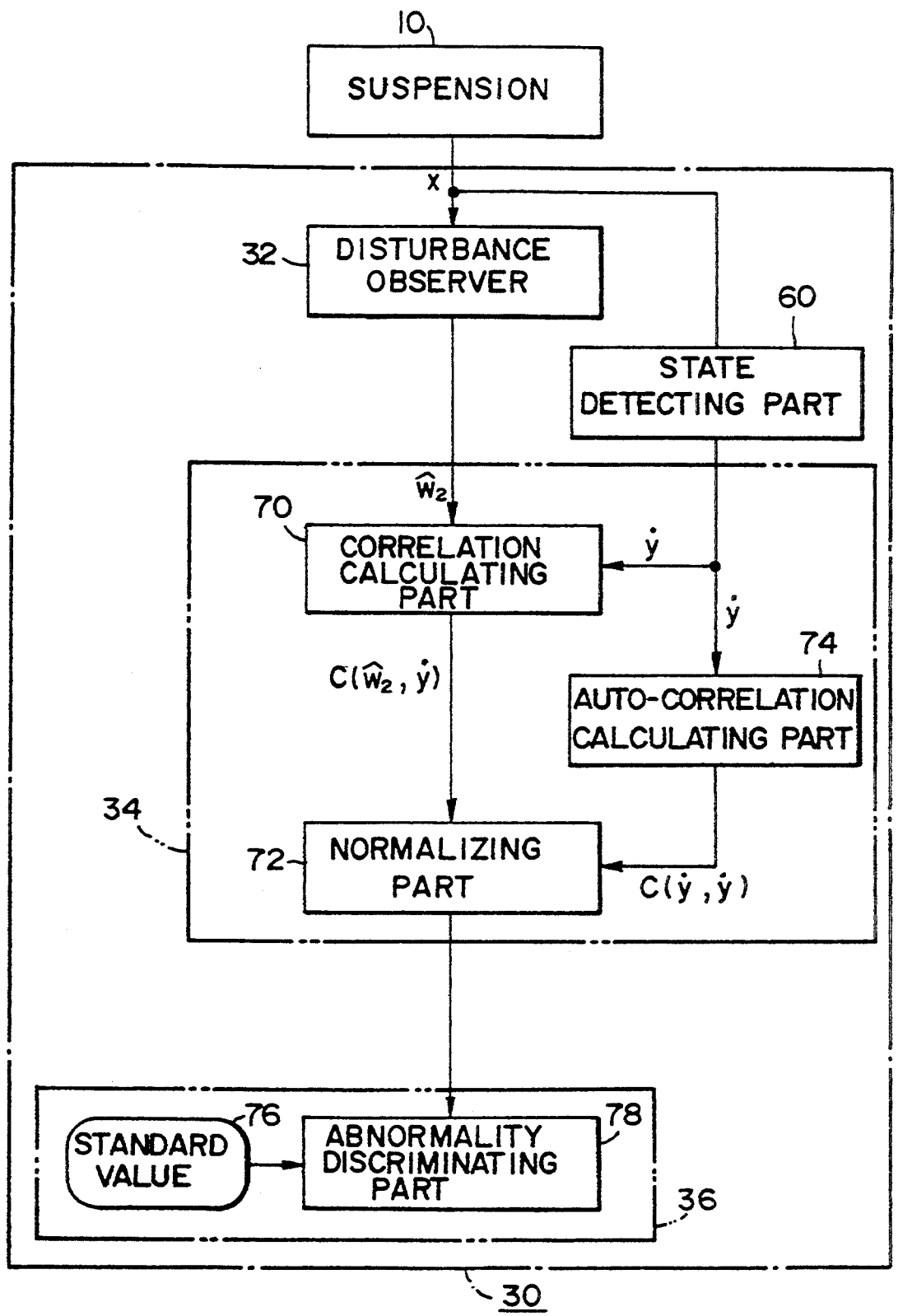
FIG. 15 is a block diagram showing a modified form of the diagnosing apparatus of FIG. 14 according to a fifth embodiment of the present invention.

FIG. 15 shows a diagnosing apparatus of the fifth embodiment, in which the suspension system 10 is the diagnosing object.

If the tire air pressure changes and hence tire spring constant changes, the disturbance observer 32 estimates and calculates the integrated disturbance expressed by the following equation:

[Formula 49]
$$\hat{w} = \begin{bmatrix} \hat{w}_1 \\ \hat{w}_2 \end{bmatrix} =$$

$$\begin{bmatrix} \frac{\Delta Dm}{m_2} \dot{y} \\ -\Delta Dm b \ddot{y} - \frac{\Delta k_1}{m_1} x_2 - \frac{\Delta k_1}{m_1} y + \frac{k_1 + \Delta k_1}{m_1} x_0 \end{bmatrix}$$

Using the correlation calculating part 70 and the auto-correlation calculating part 74, a cross-correlation between the estimated disturbance $\hat{w}_2$ and the relative change y and an auto-correlation of the relative change y are calculated. And by dividing the values of the thus obtained cross-correlation and auto-correlation by the normalizing part 72, it is possible to discriminate the tire air pressure abnormality in a manner similar to the foregoing embodiment. Alternatively, a cross-correlation function between the estimated disturbance $\hat{w}_2$ and the over-spring change x2 may be divided by an auto-correlation function of the over spring change so that the tire air pressure abnormality can be discriminated.

In the fifth embodiment, by calculating the cross-correlation, a disturbance $$-\Delta Dm \, b \, \ddot{y}$$

(internal disturbance caused due to the change in damper constant change) contained in the estimated disturbance $\hat{w}_2$ is removed like the external disturbance. Alternatively, the term of this internal disturbance may be canceled from the estimated disturbance $\hat{w}_2$ before calculating the correlation.

Sixth Embodiment

Figure 16:
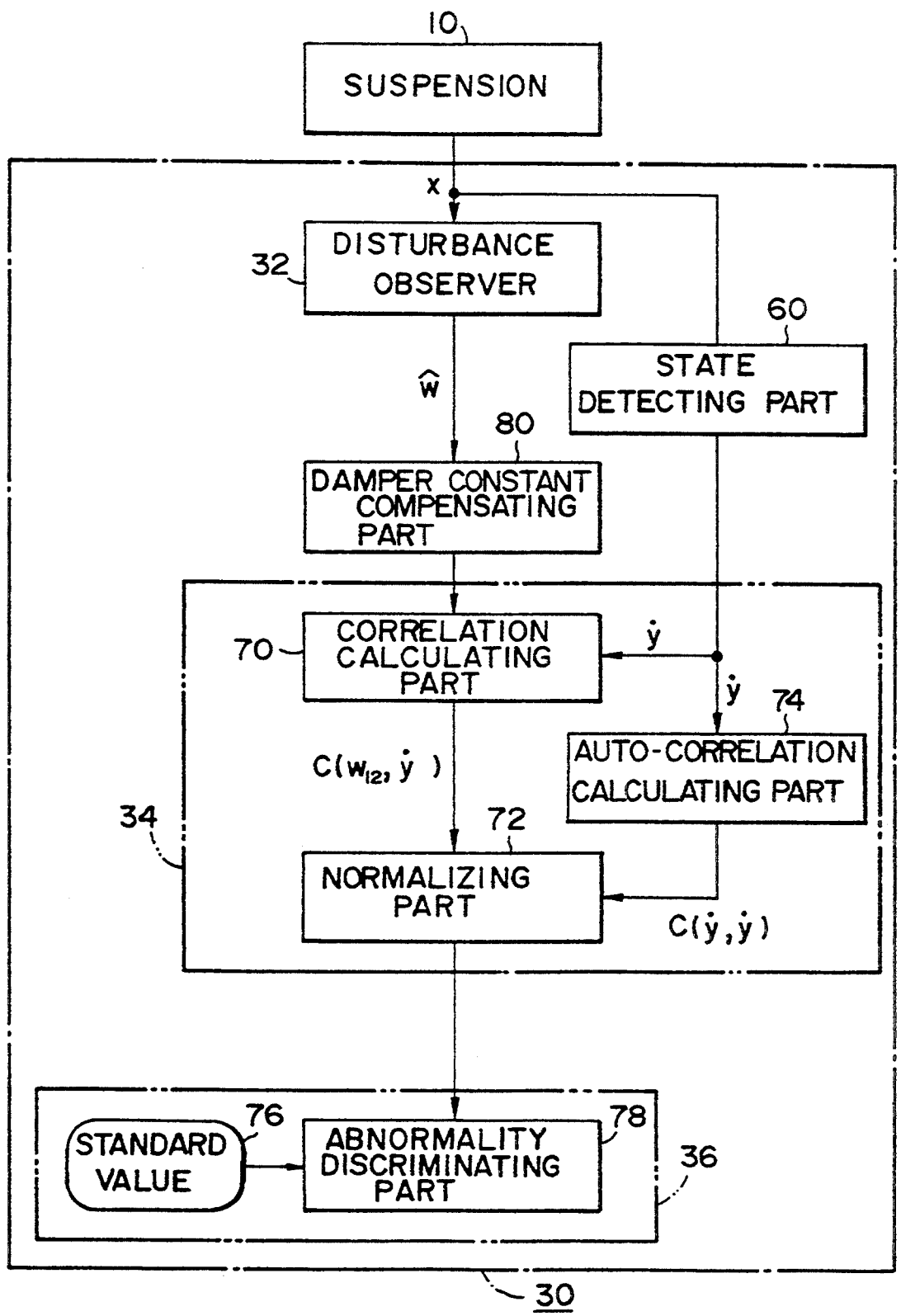
FIG. 16 is a block diagram showing another modified form of the diagnosing apparatus of FIG. 14 according to a sixth embodiment of the present invention.
Figure 17:
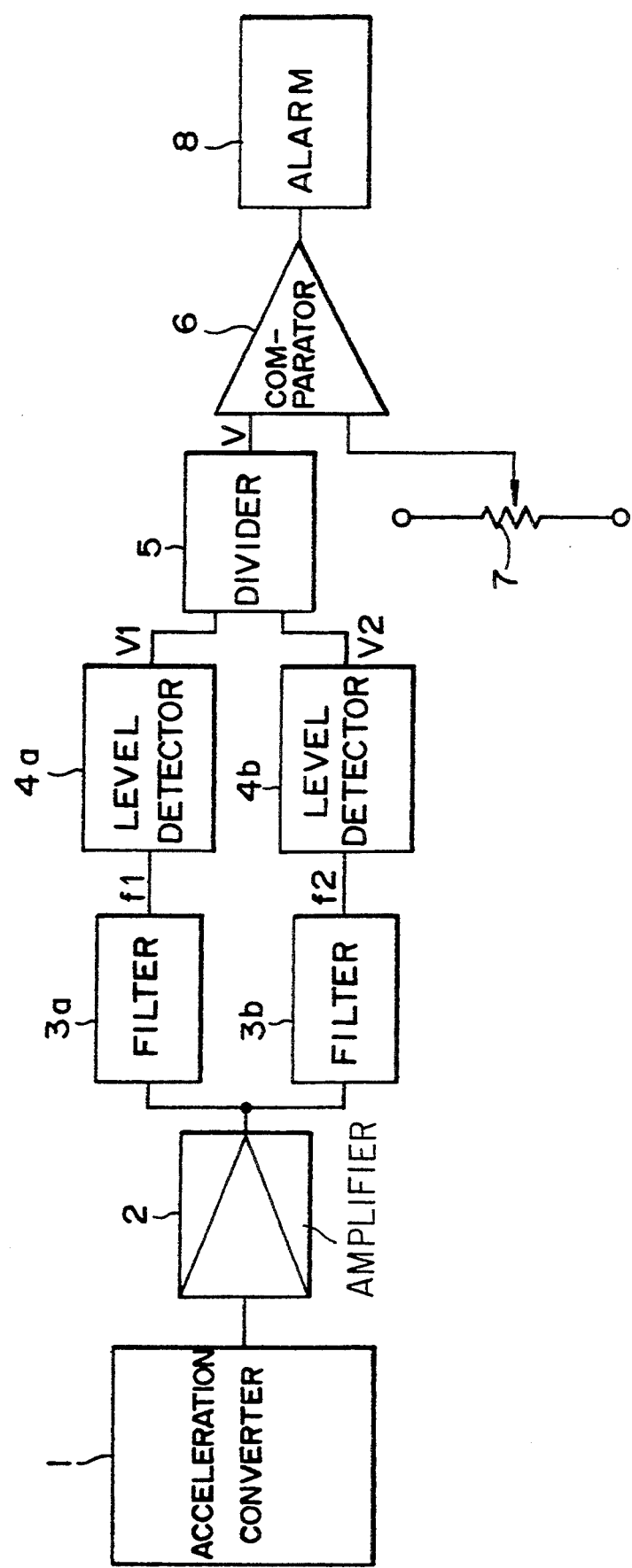
FIG. 17 is a block diagram showing a tire air pressure diagnosing apparatus according the conventional art.
Figure 18:
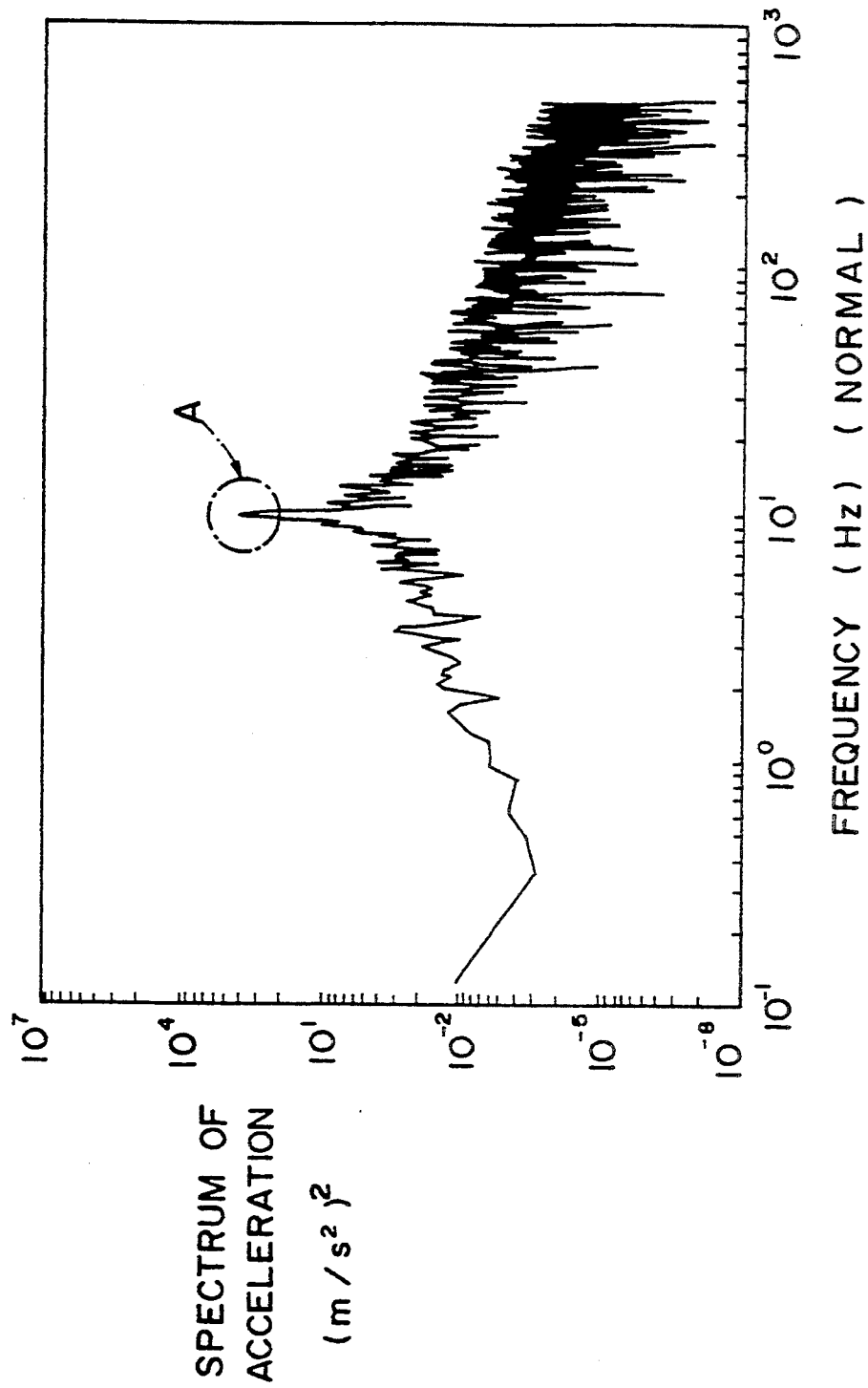
FIG. 18 is a graph of under-normal-condition data measured using the conventional apparatus of FIG. 17.
Figure 19:
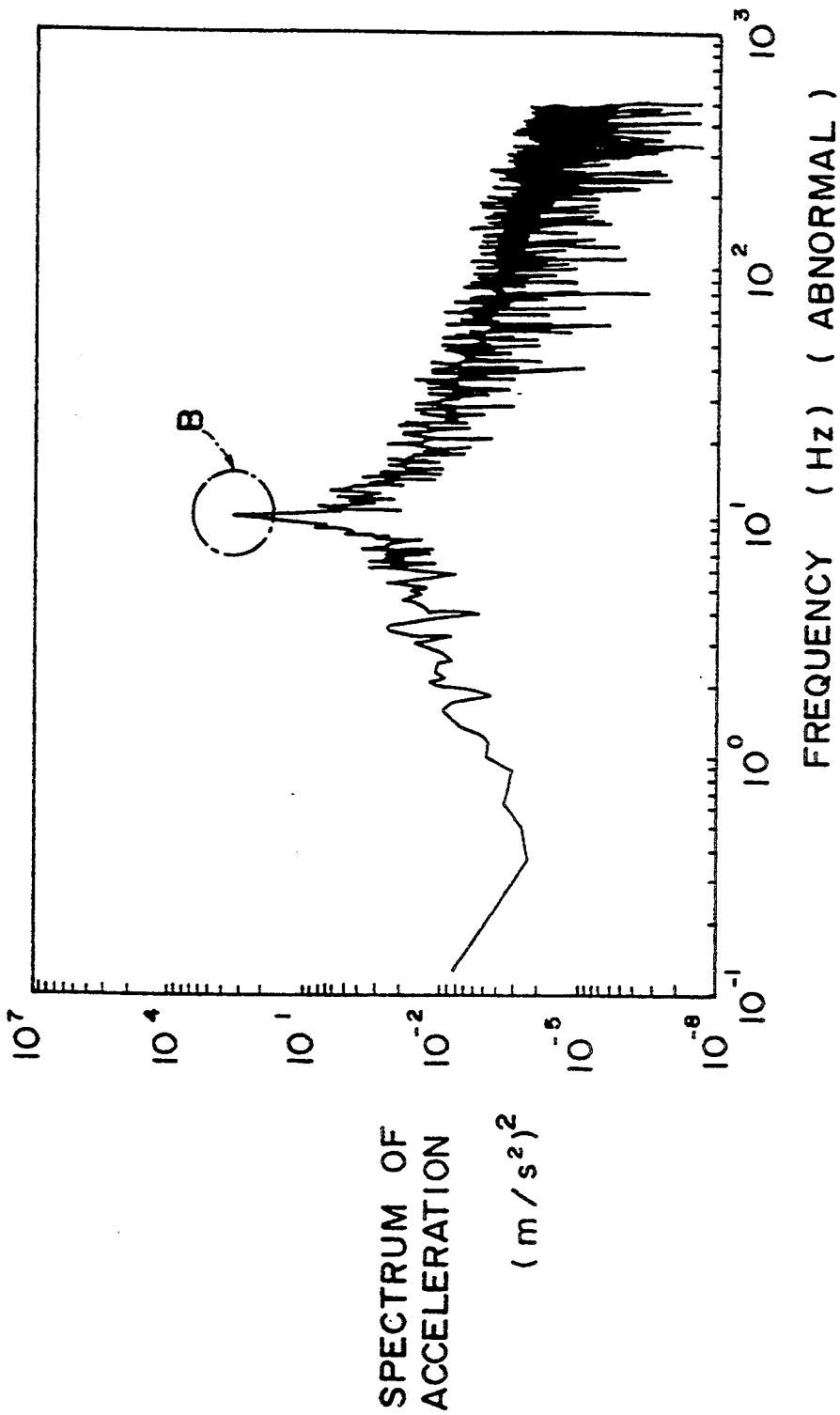
FIG. 19 is a graph of under-abnormal-condition data measured using the conventional apparatus of FIG. 17.

FIG. 16 is a block diagram showing a diagnosing apparatus according to a sixth embodiment in which this method is incorporated. In FIG. 16, a damper constant compensating part 80 uses the estimated disturbance $\hat{w}$ from the disturbance observer 32 to calculate the following:

[Formula 50]

$$w_{12} = \hat{w}_1 \cdot m_2 \cdot b + \hat{w}_2$$

Since this equation yields the following equation:

[Formula 51]
$$w_{12} = -\frac{\Delta k_1}{m_1} \dot{x}_2 - \frac{\Delta k_1}{m_1} \dot{y} + \frac{k_1 + \Delta k_1}{m_1} \dot{x}_0$$

from Formula 47, it is understood that the term resulting from the change in damper constant has been canceled. Likewise by calculating a cross-correlation between $w_{12}$ and the relative speed or over-spring speed, it is possible to detect the air pressure abnormality.

Also in the fifth embodiment of FIG. 15, by the providing the damper constant compensating part 80, the disturbance due to the change in damping constant is canceled before calculating the cross-correlation. Therefore, if this invention is applied to a suspension in which the damper constant change is extremely large, it is possible to improve the degree of accuracy in detecting the air pressure abnormality.

Seventh Embodiment

In the first embodiment, it is assumed that the quantity of internal state of the dynamic system 10 is not correlated with the external disturbance. Alternatively, there may be a correlation between the quantity of internal state and the external disturbance, depending on the structure of a dynamic system and the control rules of a controller.

This embodiment will now be described as a seventh embodiment in correspondence with the first to third modes of the first embodiment. Parts or elements corresponding to those of the first embodiment are designated by like reference numerals, so their description is omitted here.

First Mode

In the first mode of this embodiment, all the quantities of internal state x(t) of the diagnosing object 10 can be measured using sensors, etc., and the disturbance estimating means 32 is designed so as to estimate only the integrated disturbance vector w(t).

Figure 21:
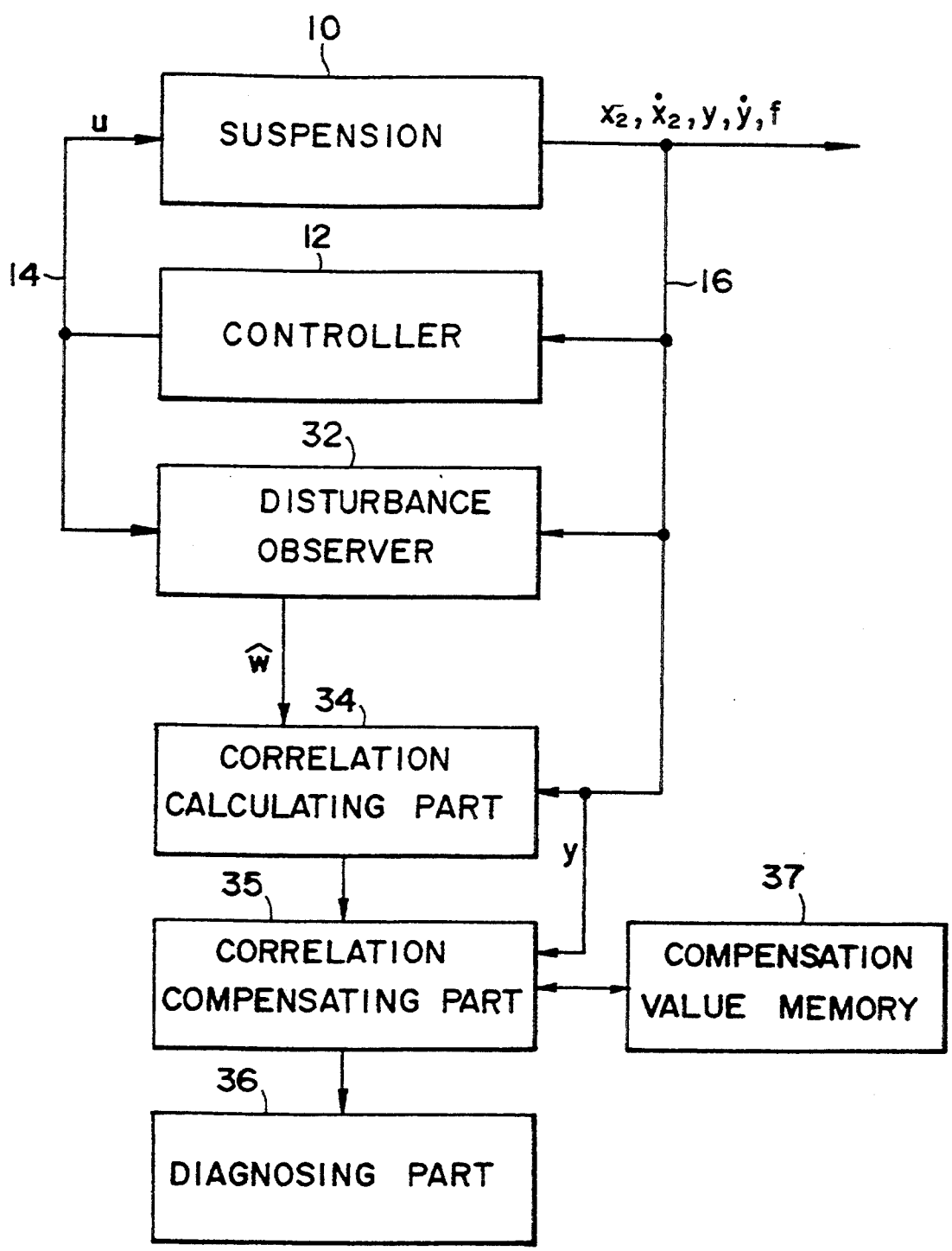
FIG. 21 is a block diagram showing an apparatus according to a seventh embodiment of the present invention.

The block diagram of the diagnosing apparatus 30 is similar to FIG. 21.

The diagnosing apparatus 30 of the first mode is designed so as to include a correlation compensating part 35 and a compensation value memory 37.

Specifically, the correlation calculating part 34 calculates a cross-correlation between the quantity of internal state and the estimated value of the integrated disturbance vector. In the case where there is a slight correlation between the quantity of internal state and the road face disturbance generating as the external disturbance, it is impossible to effectively eliminate any influence of the road face disturbance penetrating as the external disturbance.

Therefore, in the correlation compensating part 35, by the result of calculation of correlation, the quantity of internal state and the compensation value preset in the compensation value memory 37, the result of calculation of correlation is compensated to eliminate any influence of the road disturbance.

The diagnosing part 36 can compensate the compensated result of calculation of correlation, can detect the occurrence of a fault and can specify a definite fault portion.

The construction and operation of the correlation compensating part 35 will now be described.

From Formula 18, since of the integrated disturbance, containing the road face disturbance x0 is the second element of the integrated disturbance $\hat{w}_2$, a correlation function C21 between the estimated value $\hat{w}_2$ and measured value y w2 is compensated.

Firstly, a compensation value to be preset in the memory 37 is obtained as follows.

While the dynamic system is operating in the standard state (e.g., the fault-free state), a disturbance is estimated by the disturbance observer 32. This estimated value is equal to the value obtained from Formula 18 under the following condition:

[Formula 69]

$$\Delta k_1 = \Delta k_2 = \Delta D_m = 0$$

namely, the value results as follows:

$$\hat{w}_2 = \frac{k_1}{m_1} x_0 \quad \text{[Formula 70]}$$

$$\hat{w}_1 = \hat{w}_3 = \hat{w}_4 = \hat{w}_5 = 0$$

Accordingly, a correlation between the estimated value and measured value y of this w2 is equivalent to a correlation between the road face disturbance x0 and measured value y, and hence can be rewritten as follows:

$$C(\hat{w}_2, y) \simeq \frac{k_1}{m_1} C(x_0, y) \quad \text{[Formula 71]}$$

In the standard state, this correlation is calculated. And this value is divided by an auto-correlation C(y, y) of the measured value y to obtain a normalized value, which is to be stored as a compensation value h in the memory 37. This compensation value is obtained by the following:

$$h \triangleq \frac{C(\hat{w}_2, y)/C(y, y)}{k_1/m_1} = \frac{C(x_0, y)}{C(y, y)} \quad \text{[Formula 72]}$$

The compensation value h has a substantially constant value regardless of the road face disturbance. The correlation between the road face disturbance x0 and measured value y in other operating state can be obtained by multiplying the compensation value h by the auto-correlation of the measured value y. Namely, the correlation C21 between the estimated value and measured value y of w2 in the existence of a fault can be approximated by the following:

$$C_{21} \simeq \left( \frac{\Delta k_1}{m_1} + \frac{\Delta k_2}{m_1} + \frac{\Delta k_2}{m_2} \right) C(y, y) + \frac{k_1 + \Delta k_1}{m_1} C(y, y) h \quad \text{[Formula 73]}$$

Accordingly, during the fault diagnosis, the correlation compensating part 35 calculates the auto-correlation C(y, y) of the measured value y. Using the value C(y, y) and the compensation value h previously stored in the memory 37, the output C21 of the correlation calculating part 34 is compensated as follows:

$$\left( C_{21} - \frac{k_1}{m_1} C(y, y) h \right) \to C_{21} \quad \text{[Formula 74]}$$

to output this result as new C21 to the diagnosing part 36.

The compensated function C21 can be expressed by the following:

$$C_{21} \simeq \left( \frac{\Delta k_1}{m_1} + \frac{\Delta k_2}{m_1} + \frac{\Delta k_2}{m_2} \right) C(y, y) + \frac{\Delta k_1}{m_1} C(y, y) h \quad \text{[Formula 75]}$$

The diagnosing part 36, like the first embodiment, detects the occurrence of a fault and specifies a definite fault portion, based on the result of calculation of the compensated correlation. For example, since in the correlation C41 between $\hat{w}_4$ and y there appears only the gas spring change, it is possible to specify the gas spring fault readily if this value has an abnormality. Likewise, if there is an abnormality in the correlation C42 between ŵ4 the measured value ẏ, it is judged that the damper is faulty. The tire pressure abnormality is discriminated from the correlation function C21. C21 has a value due to the gas spring fault or the tire air pressure abnormality; since the gas spring fault is detected by the above described discrimination from C41, it is judged that the tire is abnormal, if the gas spring is not faulty and the value of C21 has an abnormality.

Thus in the first mode, even if the quantity of internal state of the dynamic system 10 is correlated with the external disturbance, it is possible to separate the external disturbance easily from the internal disturbance due to a fault and to specify the fault portion.

Further, the first mode illustrates the case in which the compensation value h is substantially constant regardless of the road face disturbance. Alternatively, if the compensation value h varies according to the road face disturbance x0, a correlation between the measured value y and the road face disturbance x0 is calculated. By storing the result of this calculation as the compensation value h in the memory 37, it is also possible to compensate the correlation by the compensation value h corresponding to the measured value y in the correlation compensating part 35.

Second Mode

In the second mode of the seventh embodiment, part of the quantity of internal state x(t) of the diagnosing object 10 cannot be measured, or can be estimated by the disturbance estimating means 32 though it is not measured. In either case, the disturbance estimating means 32 is designed so as to estimate the integrated disturbance vector w(t) and the unmeasurable or not-to-be-measured quantity of internal state.

Figure 22:
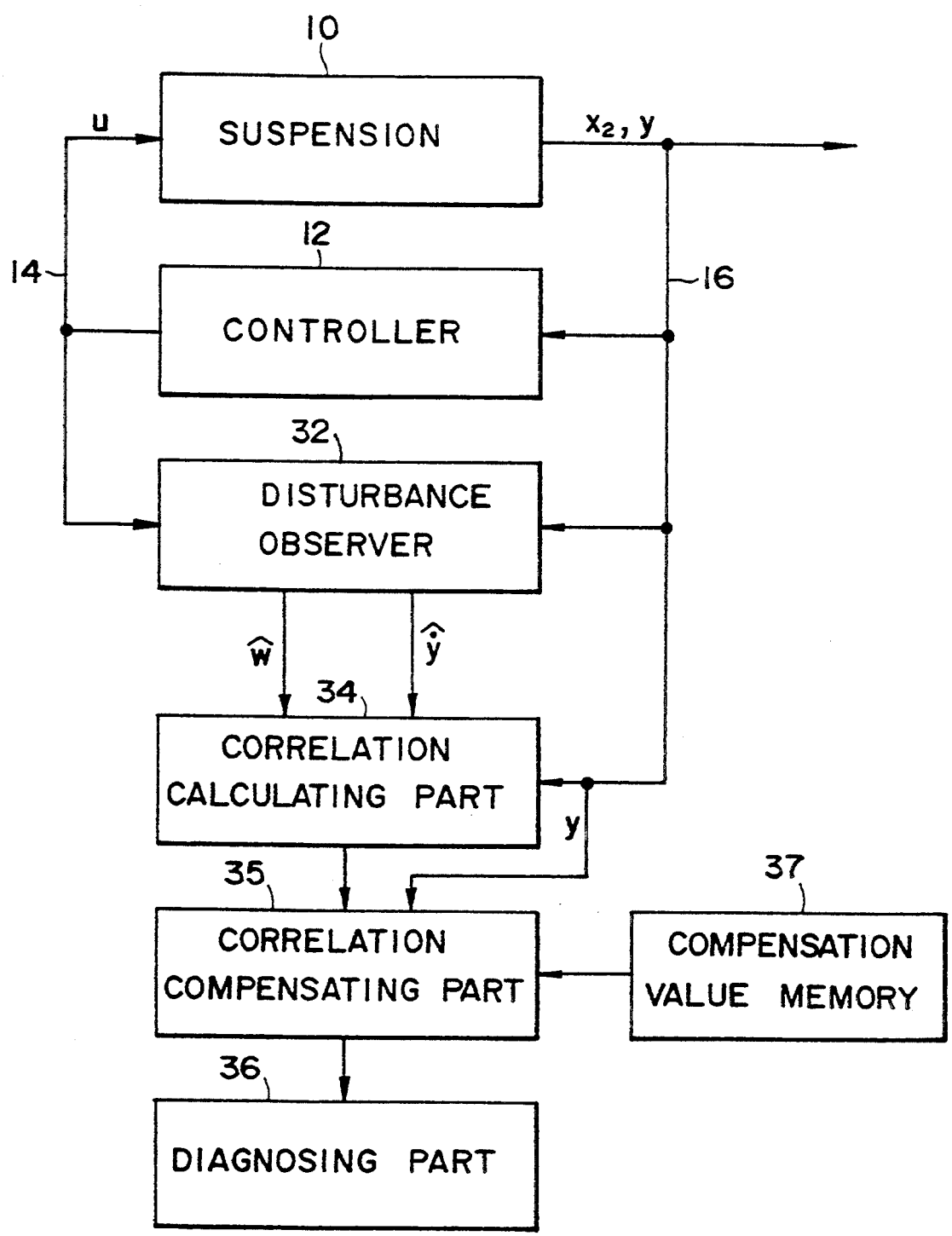
FIG. 22 is a block diagram showing a modified form of the apparatus according to the seventh embodiment.

The block diagram of the diagnosing apparatus at that time is shown in FIG. 22. The correlation compensating part 35 and the compensation value memory 37 in FIG. 22 are identical in construction and operation with those of the embodiment of FIG. 21, so their description is omitted here.

Third Mode

In the third mode of the seventh embodiment, the disturbance estimating means 32 is designed so as to estimate and calculate the integrated disturbance vector w(t) and all the quantities of internal state x(t) containing the unmeasurable quantity of internal state, if part of the quantities of internal state x(t) of the diagnosing object 10 cannot be measured.

Figure 23:
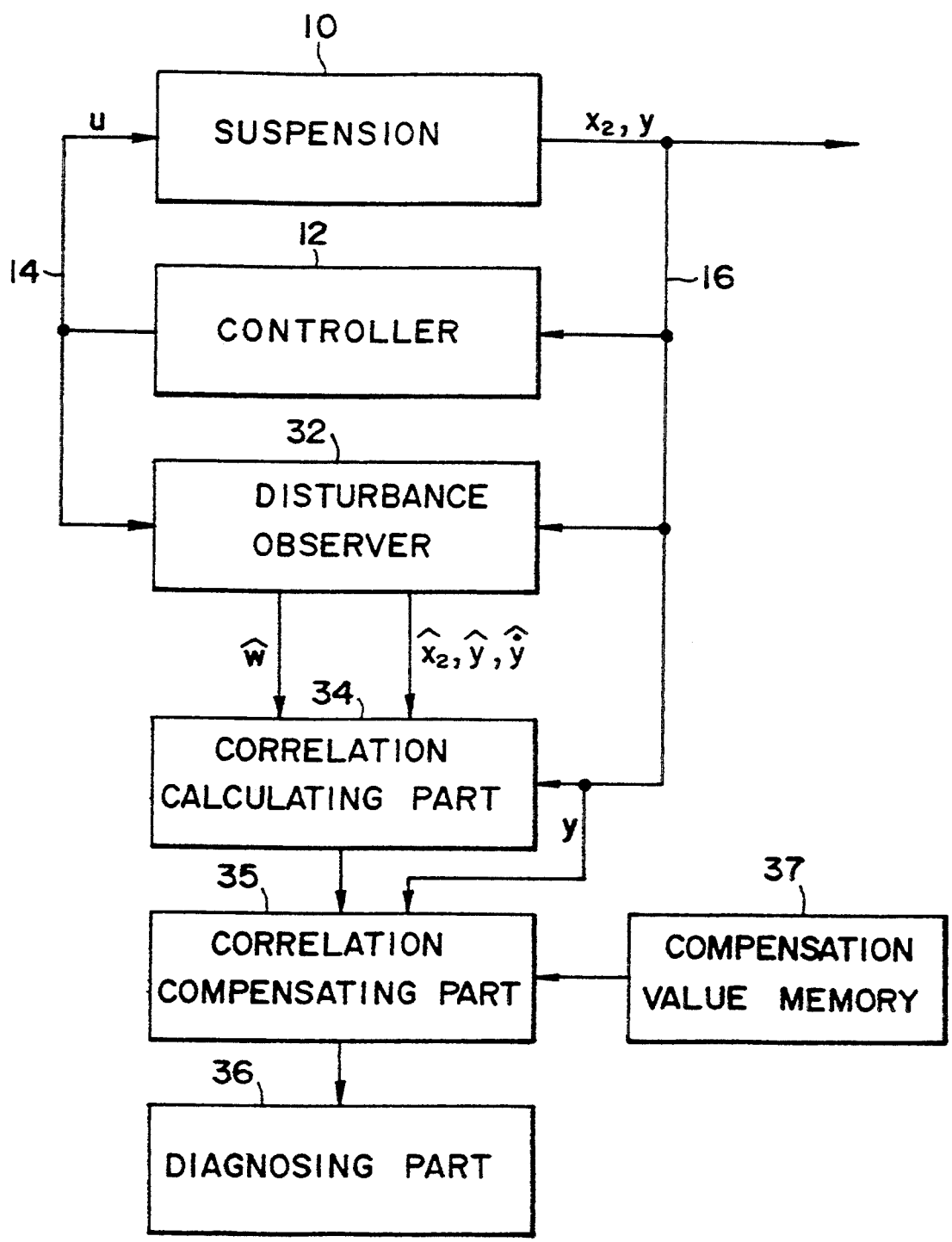
FIG. 23 is a block diagram showing another modified form of the apparatus according to the seventh embodiment.

The block diagram of the diagnosing apparatus at that time is shown in FIG. 23. The correlation compensating part 35 and the compensation value memory 37 in FIG. 23 are identical in construction and operation with those of the embodiment of FIG. 21, so their description is omitted here.

Eighth to Twelfth Embodiments

In the second to sixth embodiments, the diagnosing apparatus 30 is designed with the assumption that no correlation exists between the road face disturbance and the quantity of internal state. However, depending on the construction of the suspension 10 and the control algorithm of the controller 12, a correlation may be created between the road face disturbance and the quantity of internal state. An air pressure diagnosing apparatus in such a case will now be described as eighth to twelfth embodiments.

Eighth Embodiment

Firstly, the eighth embodiment, in which a correlation exists between the road face disturbance and the quantity of internal state of the suspension 10 in the second embodiment of FIG. 9, will be described.

Figure 24:
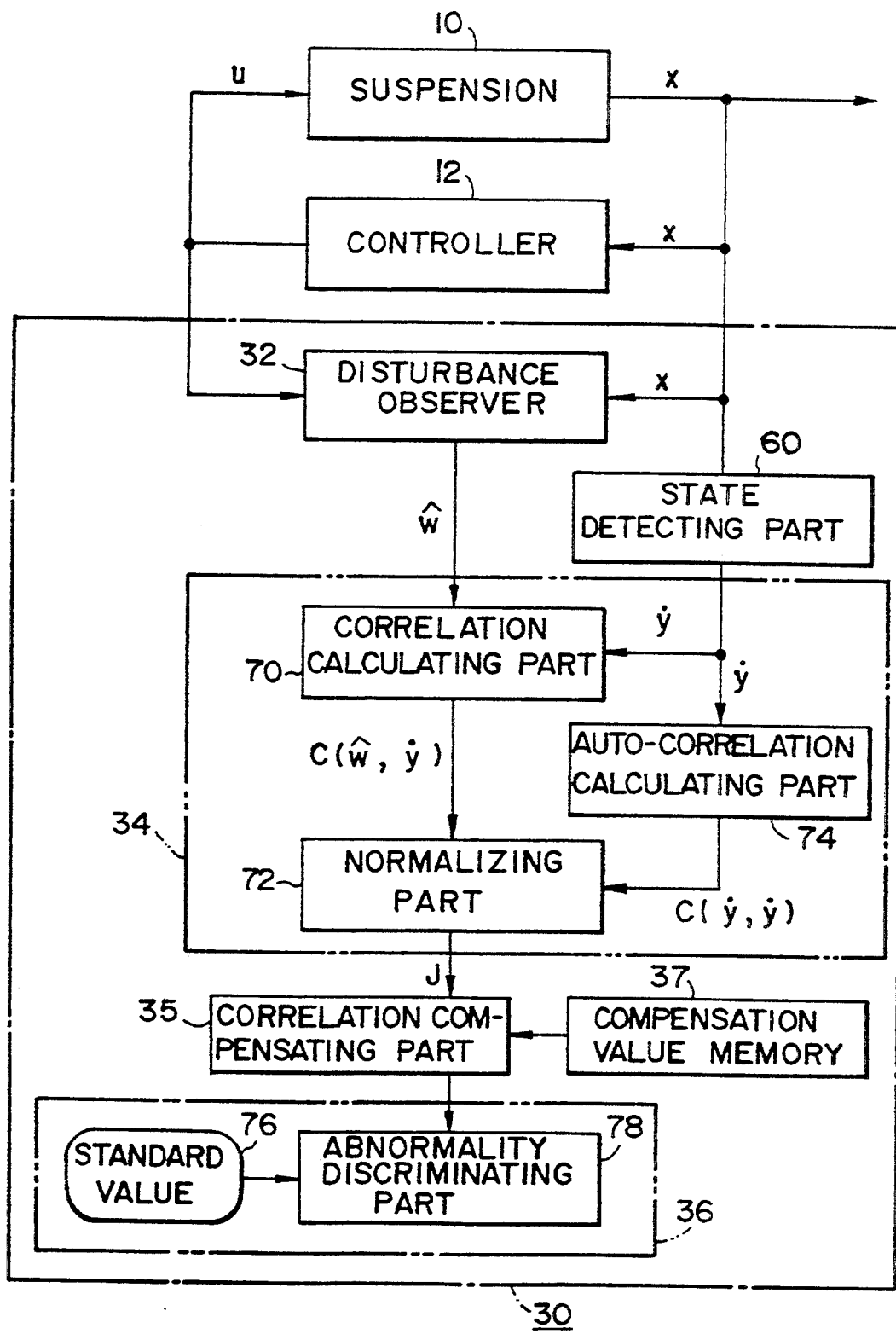
FIG. 24 is a block diagram showing an apparatus according to an eighth embodiment of the present invention.

FIG. 24 is a block diagram of this embodiment.

In FIG. 24, the cross-correlation calculating part 70 calculates a cross-correlation between the relative speed or the quantity of internal state of the suspension and the estimated value of the integrated disturbance estimated by the disturbance observer 32. At that time, if there is a correlation between the two values, it is impossible to eliminate the influence of the road face disturbance penetrating as the external disturbance.

Accordingly, by the result of calculating the correlation, the quantity of internal state and the compensation value preset in the memory 37, the correlation compensating part 35 compensates the result of calculating the correlation and removes the influence of the road face disturbance.

The diagnosing part 36 detects the tire air pressure abnormality in the same operation as the embodiment of FIG. 9, based on the result of calculating the compensated correlation.

The operation of the correlation compensating part 35 will now be described.

It was mentioned that the disturbance observer 32 estimated the disturbance expressed by Formula 36, when the tire air pressure changed and its spring constant changed. The correlation calculating part 70, like the foregoing embodiment, calculates a cross-correlation between the measured value and relative speed of the disturbance, and the normalizing part 72 divides the result of calculation by an auto-correlation function of the relative speed. And the output of the normalizing part 72 will be as follows:

$$J \simeq -\frac{\Delta k_1}{m_1} + \frac{k_1 + \Delta k_1}{m_1} \frac{C(\dot{x}_0, \dot{y})}{C(\dot{y}, \dot{y})} \qquad \text{[Formula 76]}$$

$C(\dot{x}_0, \dot{y})$ is expressed by the following equation:

$$C(\dot{x}_0, \dot{y}) = \frac{1}{N} \sum_{k=1}^{N} (\dot{x}_0 - \bar{\dot{x}}_0)(\dot{y} - \bar{\dot{y}}) \qquad \text{[Formula 77]}$$

where $$\bar{\dot{x}}_0 = \frac{1}{N} \sum_{k=1}^{N} \dot{x}_0 \qquad \text{[Formula 78]}$$

As shown, if a correlation exists between the road face disturbance and the relative speed, the second term of the right side of Formula 76 exerts an influence on the result of calculating the correlation.

On the other hand, while the air pressure is normal, the output J of the normalizing part 72 will be equal to the value obtained from Formula 76 under the condition expressed by the following:

[Formula 79]

$$\Delta k_1 = 0$$

This value can be expressed by the following:

$$J \simeq \frac{k_1}{m_1} \frac{C(\ddot{x}_0, \ddot{y})}{C(\ddot{y}, \ddot{y})} \quad \text{[Formula 80]}$$

The following value:

$$h \stackrel{\Delta}{=} \frac{J}{k_1/m_1} = \frac{C(\ddot{x}_0, \ddot{y})}{C(\ddot{y}, \ddot{y})} \quad \text{[Formula 81]}$$

obtained by dividing the output result J by k1/m1 is previously stored as the compensation value h in the memory 37.

The compensation value h is substantially constant regardless of the magnitude of the road face disturbance. Therefore, when the air pressure is previously normal, the output J of the normalizing part 72 and the result of calculation based on Formula 81 are stored in the memory in correspondence with one another in a suitable operative state of the suspension 10. Each of the stored values may be used as a compensation value.

From Formulas 76 and 81, the output of the normalizing part 72 can be expressed by the following:

$$J \simeq -\frac{\Delta k_1}{m_1} + \frac{k_1 + \Delta k_1}{m_1} h \quad \text{[Formula 82]}$$

the change quantity in spring constant can be obtained by the following:

$$-\frac{\Delta k_1}{m_1} = \frac{J - \frac{k_1}{m_1} h}{1 - h} \quad \text{[Formula 83]}$$

The correlation compensating part 35 reads the compensation value j using J outputted from the normalizing part 72, calculates Formula 83 using the compensation value h, and outputs the result of calculation to the diagnosing part 36 as new J.

Similar to the embodiment of FIG. 9, the diagnosing part 36 discriminates the air pressure abnormality.

Thus, in this embodiment, even when the quantity of internal state of the suspension is correlated with the road face disturbance, it is possible to separate the external disturbance easily from the internal disturbance due to the air pressure abnormality and to discriminate the air pressure abnormality.

Figure 29:
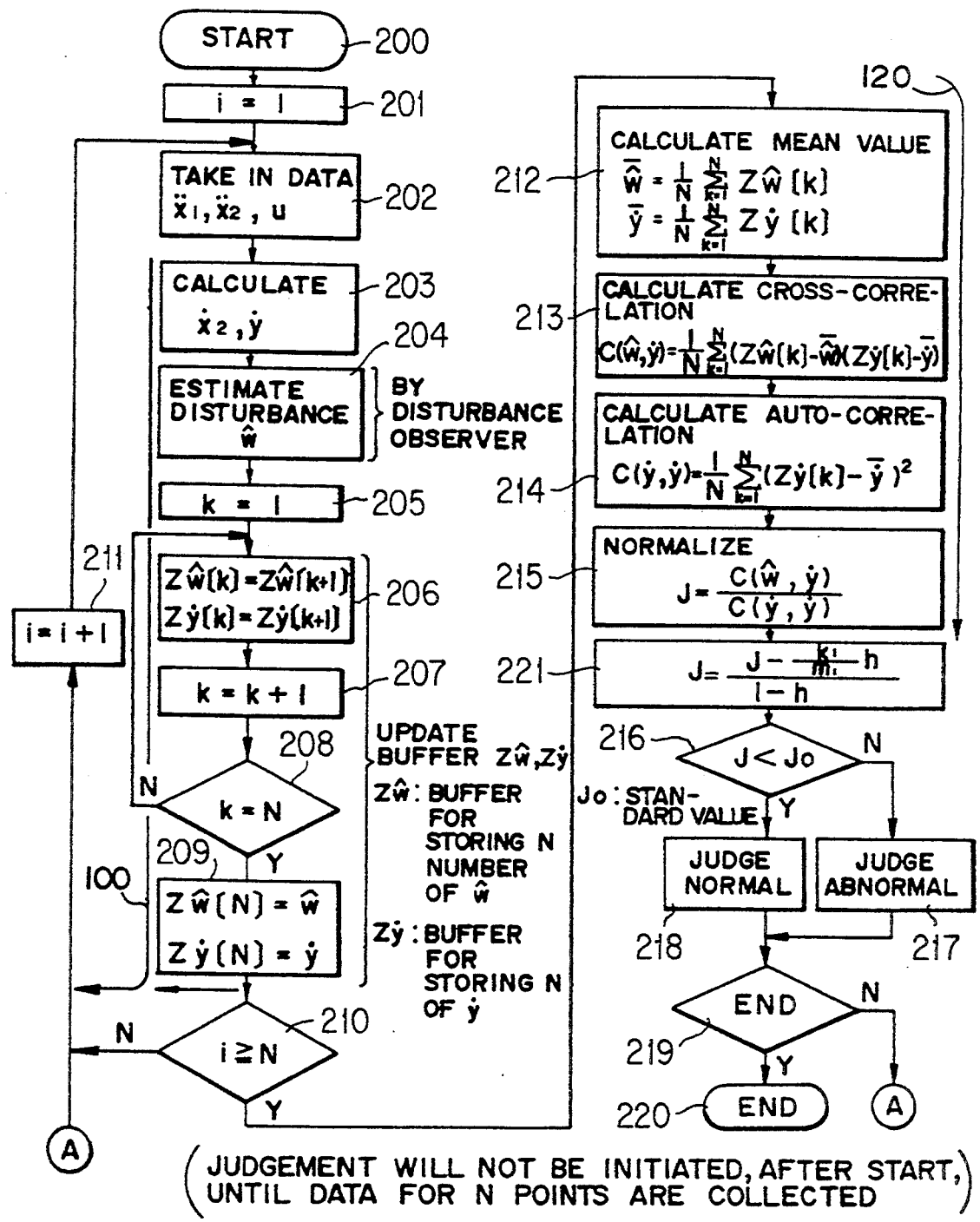
FIG. 29 is a flow diagram showing the operation of the apparatus of the eighth embodiment.

FIG. 29 is a flow diagram showing an algorithm for detection of a tire air pressure abnormality according to the foregoing embodiment. Along flow 120, the cross-correlation and auto-correlation are calculated, Formula 83 is calculated using the normalized value J of Formula 76 and the compensation value h, and using the calculated value as new J, discrimination is made whether the tire is normal or abnormal. The steps shown in FIG. 29 are essentially the same as those of FIG. 11, with an additional computation for "J" (step 221) prior to the judging step.

Figure 30A:
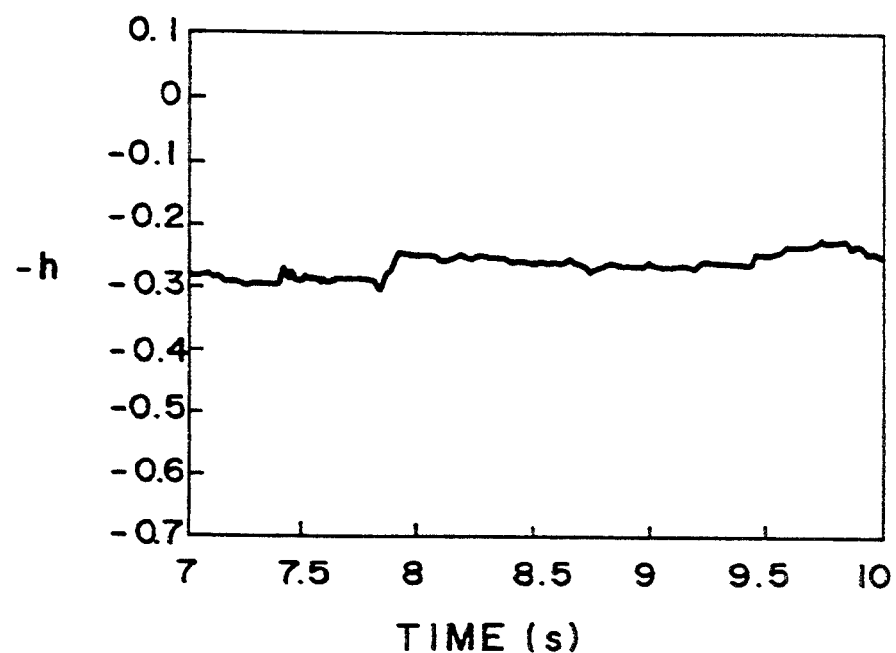
FIGS. 30a and 30b show time-related changes of compensation values obtained when a vehicle is running under a constant condition.
Figure 30B:
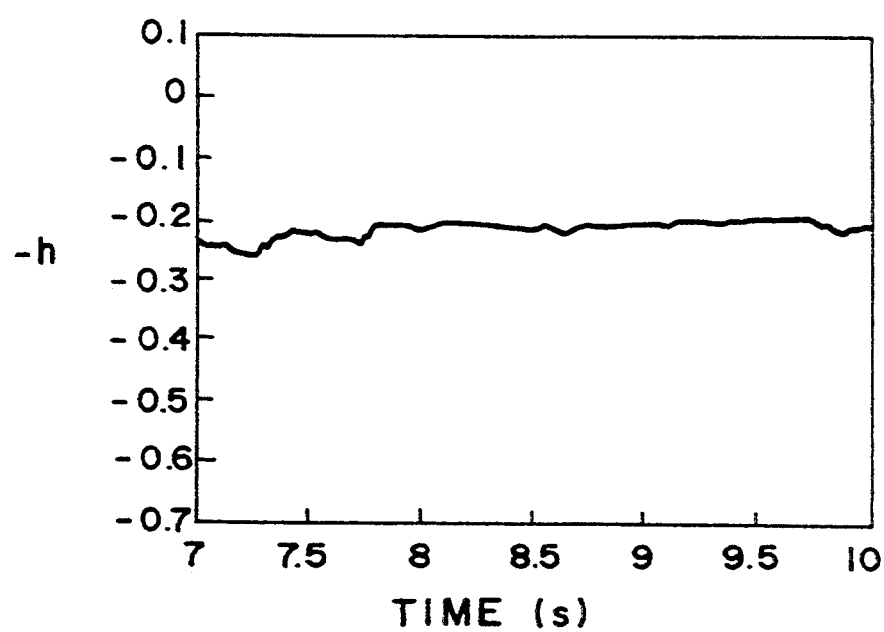

FIG. 30a shows time-related changes obtained as the results of calculation of Formula 81 while the car is running under the condition that the controller is adjusted so as to create a correlation between the relative speed of the suspension and the road face disturbance and under the state that the air pressure is 2.0 kg/cm² (one example of standard state). FIG. 30b shows the results of the same calculation obtained while the car is running on a rougher road surface than the case of FIG. 30a. It is noted from these results that the result of calculation of Formula 81 has only few time-related changes and scarcely varies even if the state of road face varies. It is therefore understood that a typical value of these values can be used as the compensation value h.

Figure 31A:
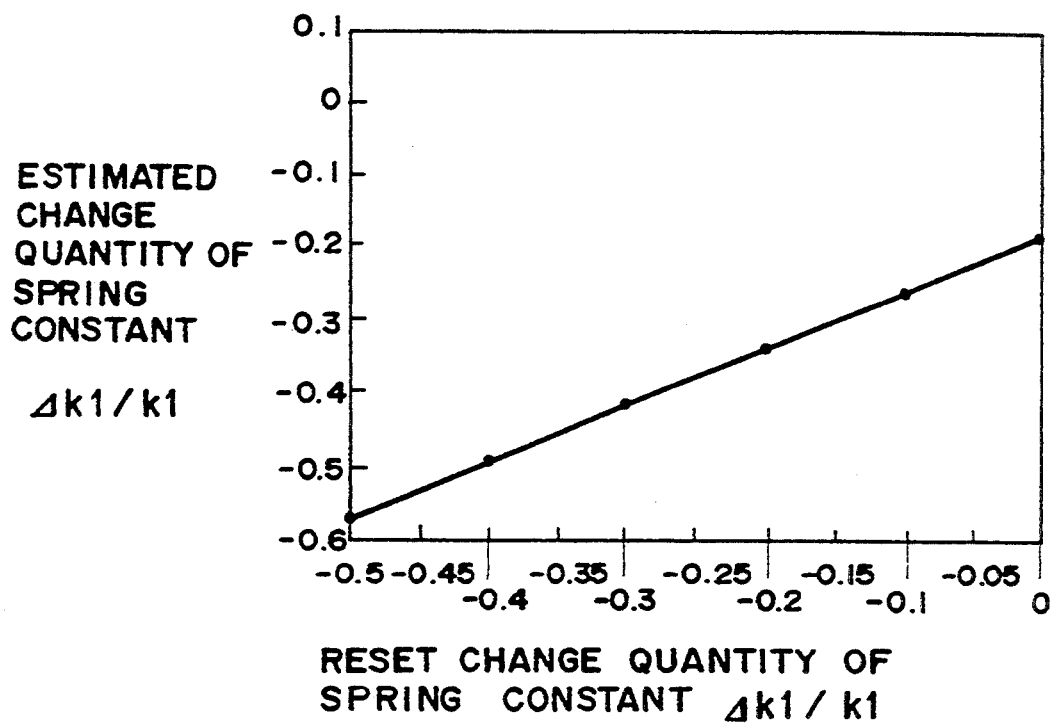
FIGS. 31a and 31b show a correlation between the estimated value of a tire spring constant and the actually measured spring constant.

FIG. 31a shows the correlation between the estimated tire spring constant value and the actually measured spring constant value according to the abnormality detection algorithm of FIG. 11 while a correlation exists between the relative speed of the suspension and the road face disturbance. From FIG. 31a it is understood that if a correlation exists between the relative speed and the road face disturbance, the spring constant change quantity cannot be estimated accurately.

Figure 31B:
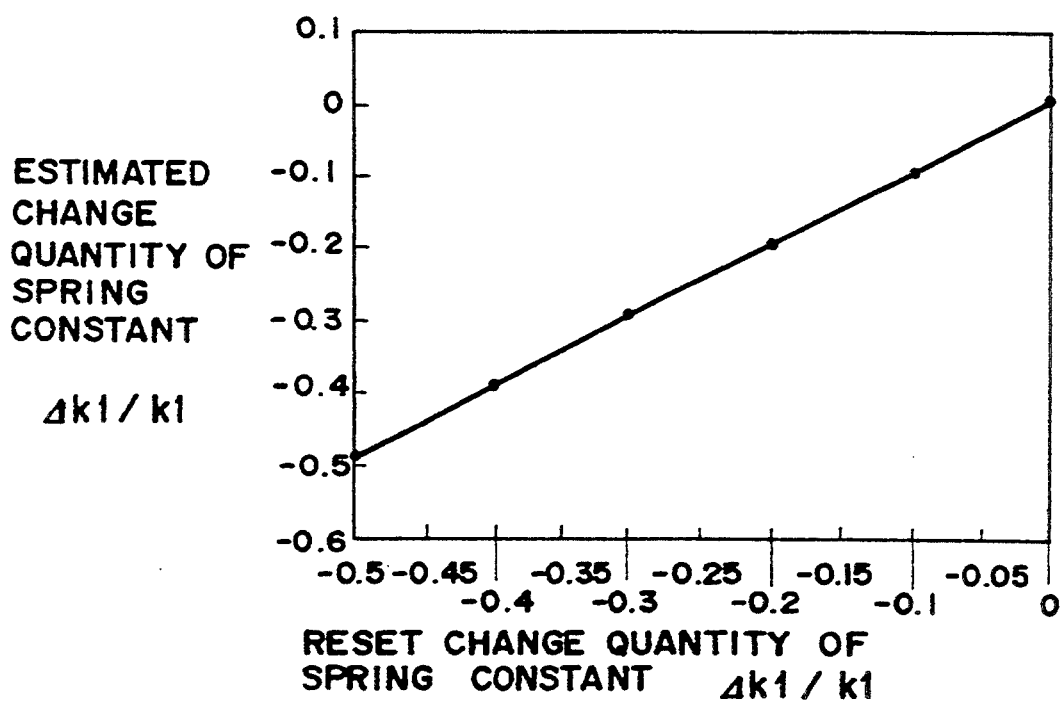

FIG. 31b shows the correlation between the estimated tire spring constant value and the actually measured spring constant values according to the abnormality detection algorithm of FIG. 29. In this algorithm, a mean value of the values shown in FIG. 30a is used as the compensation value. It is understood from FIG. 31b that by performing the compensation calculation according Formula 83, the spring constant change quantity can be estimated with high precision.

Ninth Embodiment

A ninth embodiment, in which a correlation exists between the road face disturbance and the relative change of the suspension 10 in the third embodiment of FIG. 10, will now be described.

Figure 25:
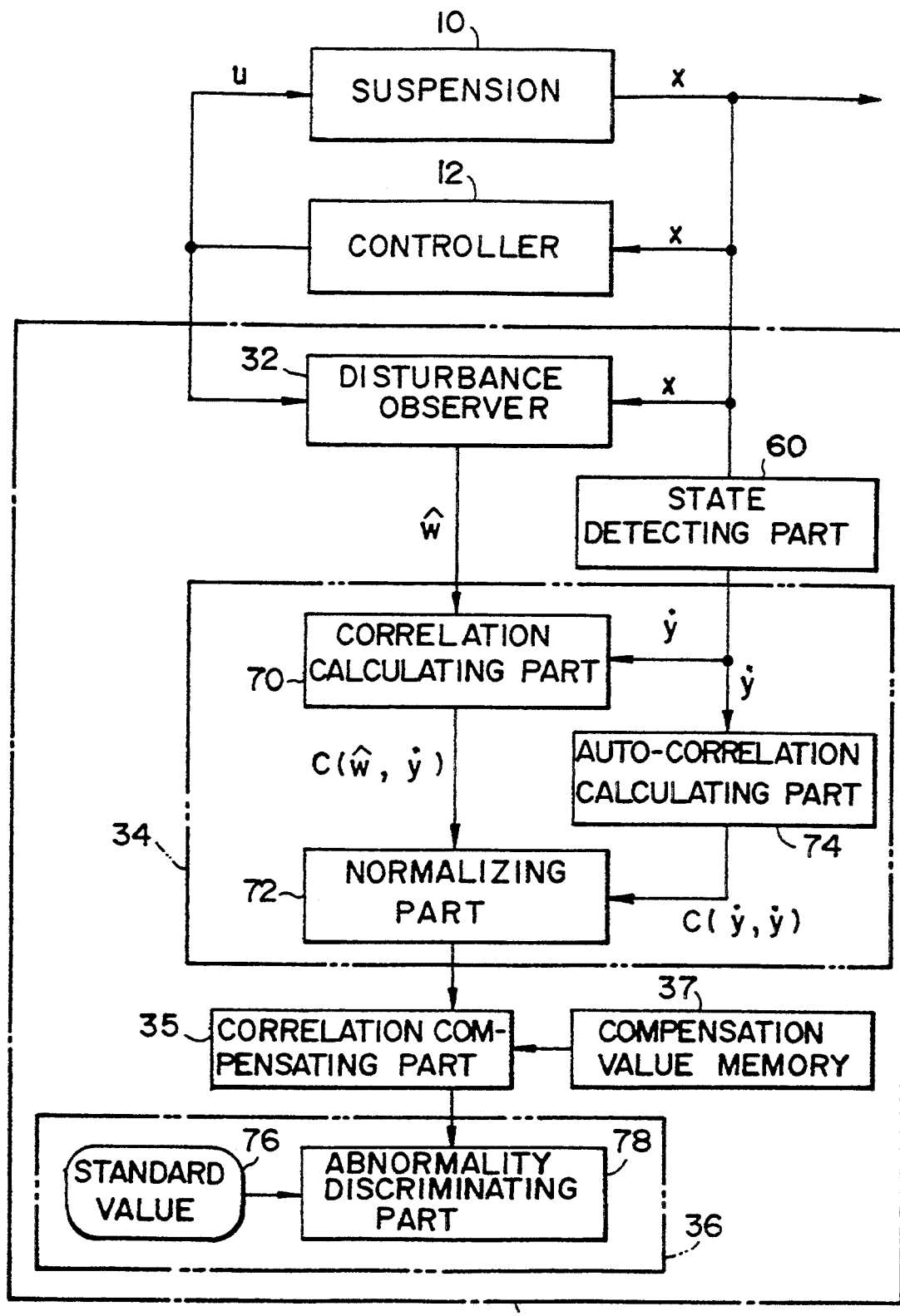
FIG. 25 is a block diagram showing an apparatus according to a ninth embodiment of the present invention.

FIG. 25 is a block diagram showing this embodiment. The correlation compensating part 35 can compensate the result of calculation of the correlation by the result of calculation of the correlation, the relative change and the compensation value h preset in the memory 37, and eliminates the influence of the road face disturbance. In this case, a value calculated based on the output of the normalizing part 72 when the air pressure is normal is used as the compensation value h.

Tenth Embodiment

A tenth embodiment, in which a correlation exists between the road face disturbance and the relative speed of the suspension 10 in the fourth embodiment of FIG. 14, will now be described.

Figure 26:
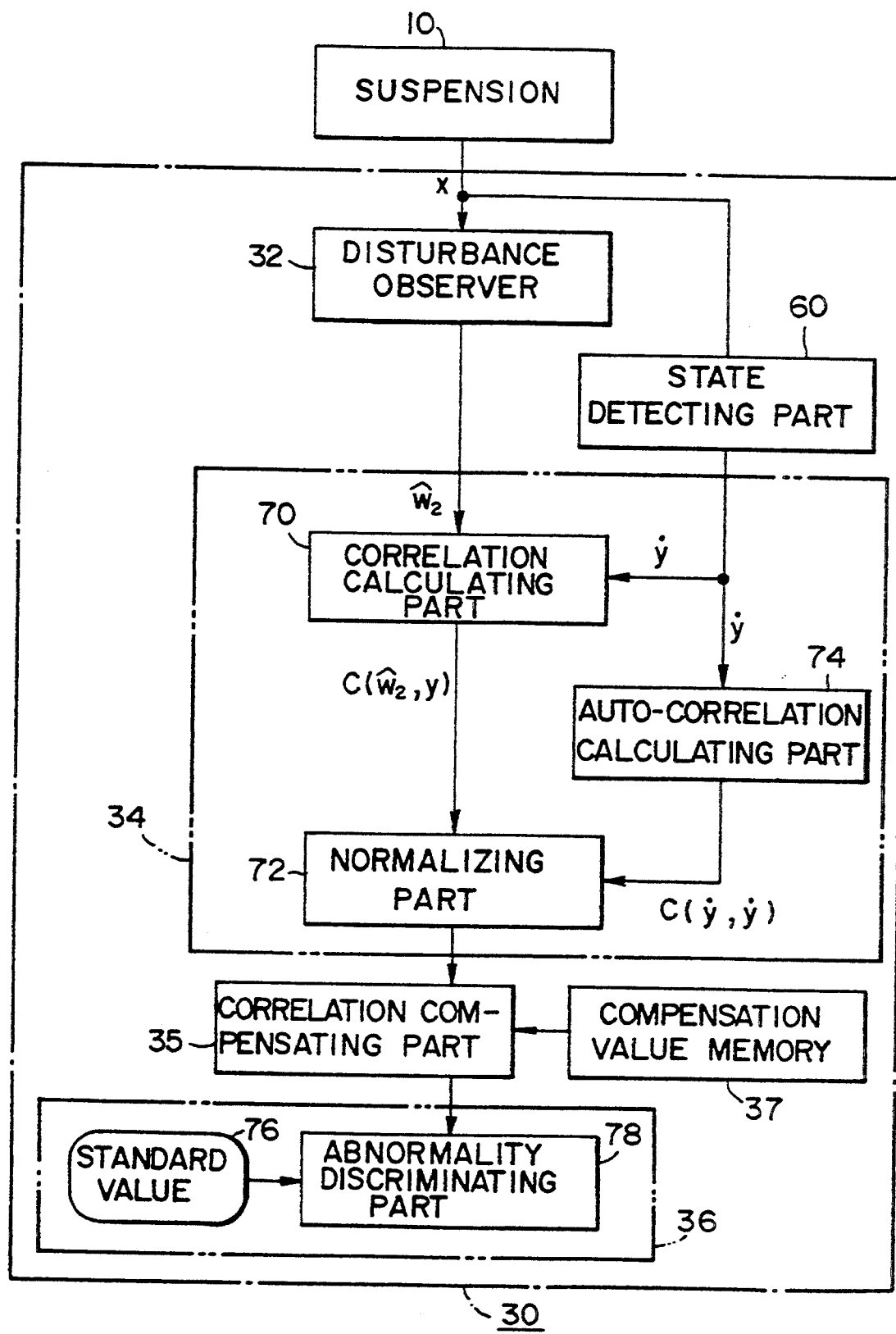
FIG. 26 is a block diagram showing an apparatus according to a tenth embodiment of the present invention.

FIG. 26 is a block diagram of this embodiment. In FIG. 26, the correlation calculating part 70 calculates a cross-correlation between the relative speed of the suspension and the second element of the integrated disturbance $\hat{w}2$ estimated by the disturbance observer 32.

The correlation compensating part 35 compensates the result of calculation of the correlation by the result of calculation of the correlation, the relative speed and the compensation value h preset in the memory 37, and eliminates the influence of the road face disturbance.

The diagnosing part 36 detects an abnormality in air pressure, based on the compensated result of calculation of the correlation, similar to the embodiment of FIG. 9. A value calculated based on the output of the normalizing part 72 when the air pressure is normal is used as the compensation value h.

Eleventh Embodiment

An eleventh embodiment, in which a correlation exists between the road face disturbance and the relative change of the suspension 10 in the fifth embodiment of FIG. 15, will now be described.

Figure 27:
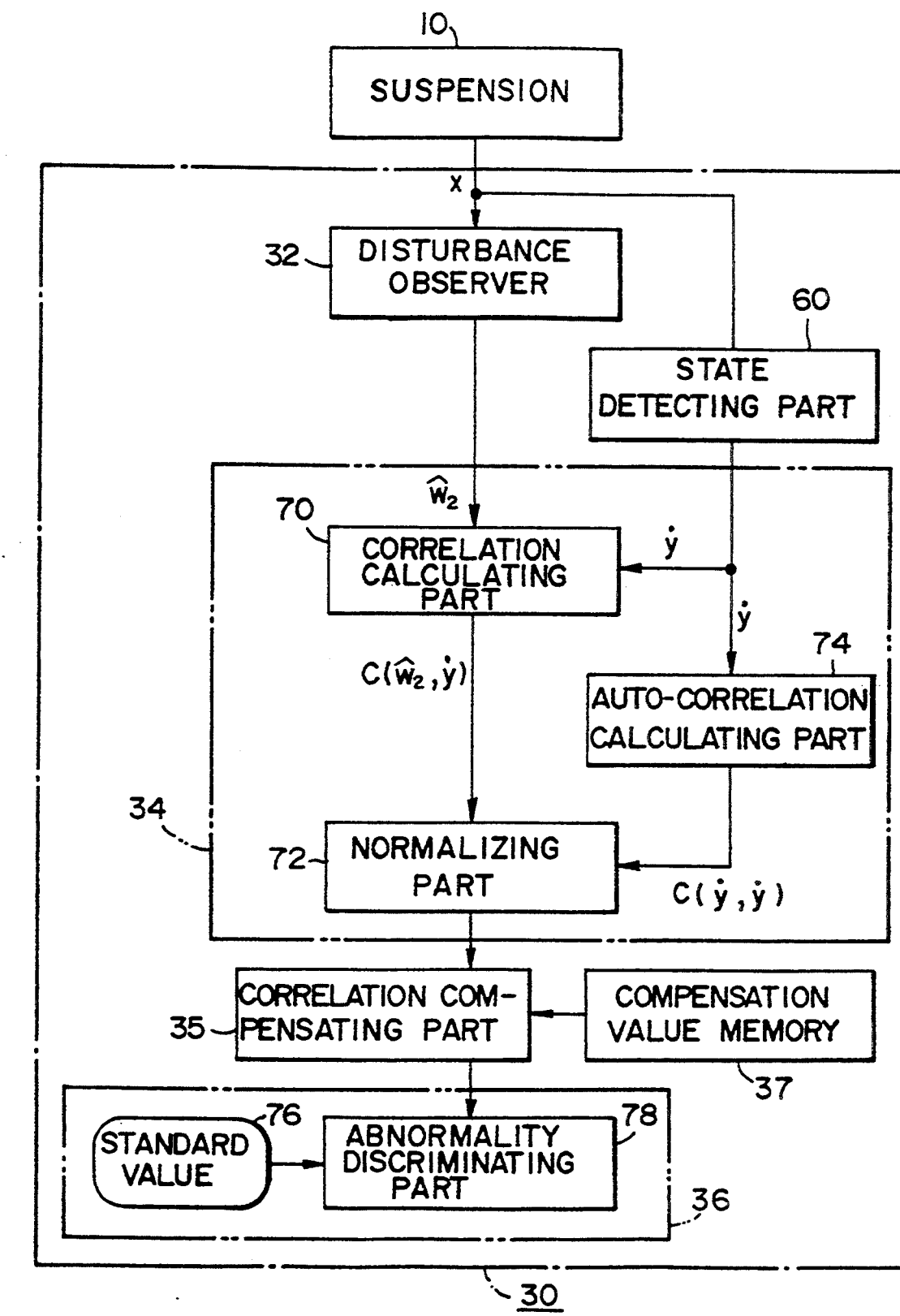
FIG. 27 is a block diagram showing an apparatus according to an eleventh embodiment of the present invention.

FIG. 27 is a block diagram of this embodiment. In FIG. 27, the correlation calculating part 70 calculates a cross-correlation between the relative change of the suspension and the estimated value of the integrated external disturbance w2 estimated by the disturbance observer 32.

The correlation compensating part 35 compensates the result of calculation of the correlation by the result of calculation of the correlation, the relative change and the compensation value h preset in the memory 37, and eliminates the influence of the road face disturbance.

The diagnosing part 36 detects an abnormality in air pressure, based on the compensated result of calculation of the correlation, similar to the embodiment of FIG. 9. A value calculated based on the output of the normalizing part 72 when the air pressure is normal is used as the compensation value h.

Twelfth Embodiment

A twelfth embodiment, in which a correlation exists between the road face disturbance and the relative speed of the suspension 10 in the sixth embodiment of FIG. 16, will now be described.

Figure 28:
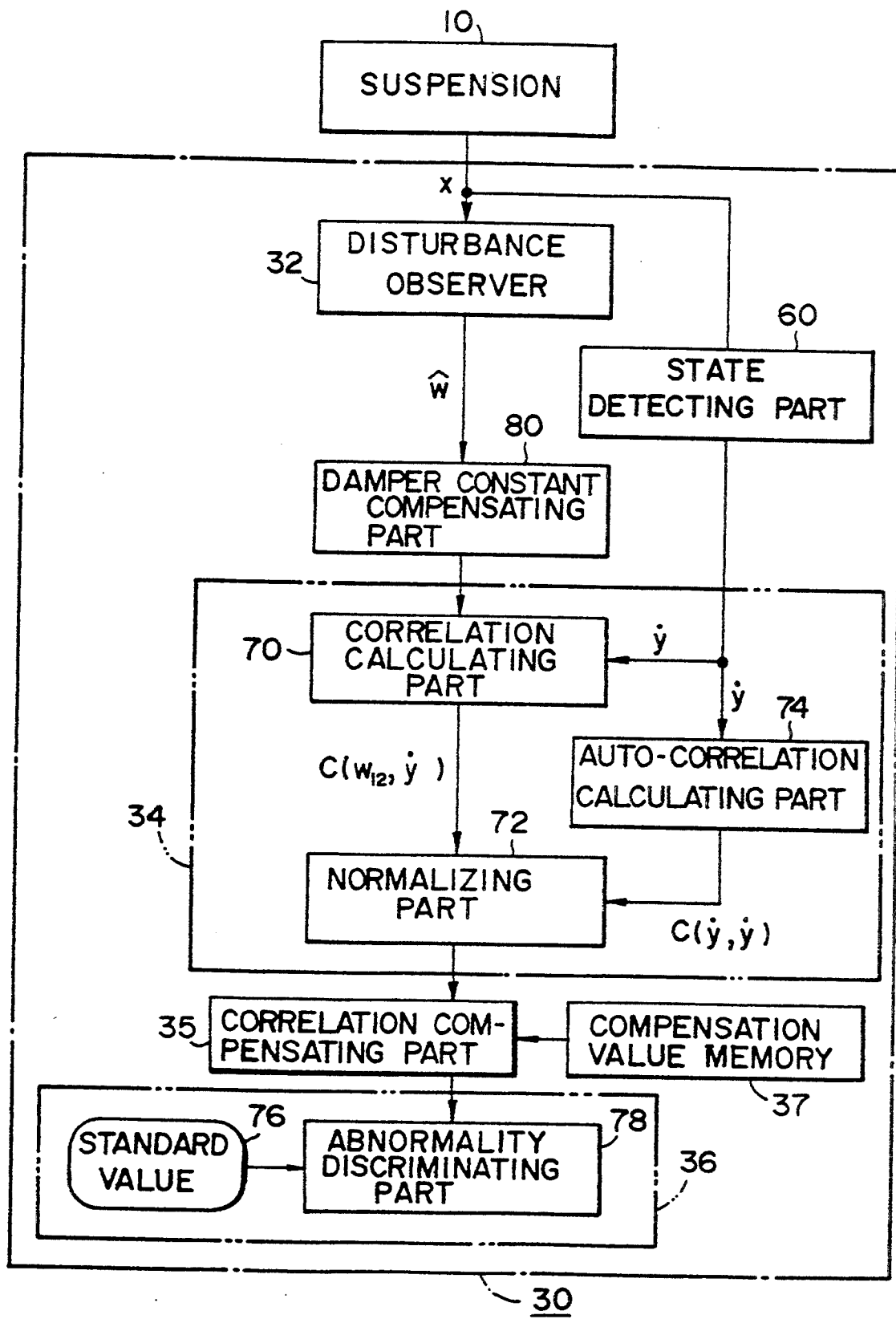
FIG. 28 is a block diagram showing an apparatus according to a twelfth embodiment of the present invention.

FIG. 28 is a block diagram of this embodiment. In FIG. 28, the correlation calculating part 70 calculates a cross-correlation between the relative speed of the suspension and the output w12 of the damper constant compensating part 80 estimated by the disturbance observer 32.

The correlation compensating part 35 compensates the result of calculation of the correlation by the result of calculation of the correlation, the relative speed and the compensation value h preset in the memory 37, and eliminates the influence of the road face disturbance.

The diagnosing part 36 detects an abnormality in air pressure, based on the compensated result of calculation of the correlation, similar to the embodiment of FIG. 9. A value calculated based on the output of the normalizing part 72 when the air pressure is normal is used as the compensation value h.

Thus, in this invention, even if the quantity of internal state of the suspension is correlated with the external disturbance, it is possible to separate the road face disturbance easily from the internal disturbance caused due to the air pressure abnormality and to detect an abnormality in tire air pressure.

Thirteenth Embodiment

A vehicle body weight detecting apparatus, for detecting a change in vehicle body weight using the principles of the dynamic system diagnosing apparatus of this invention, will now be described in detail. Parts or elements corresponding to those of the foregoing embodiment are designated by like reference numerals, and their description is omitted.

This embodiment will now be described in the following two separate cases: one case in which this invention is applied to an active suspension, and the other case in which the invention is applied to a conventional and hence passive suspension.

First Case Where Active Suspension Is To Be Diagnosed

Figure 32:
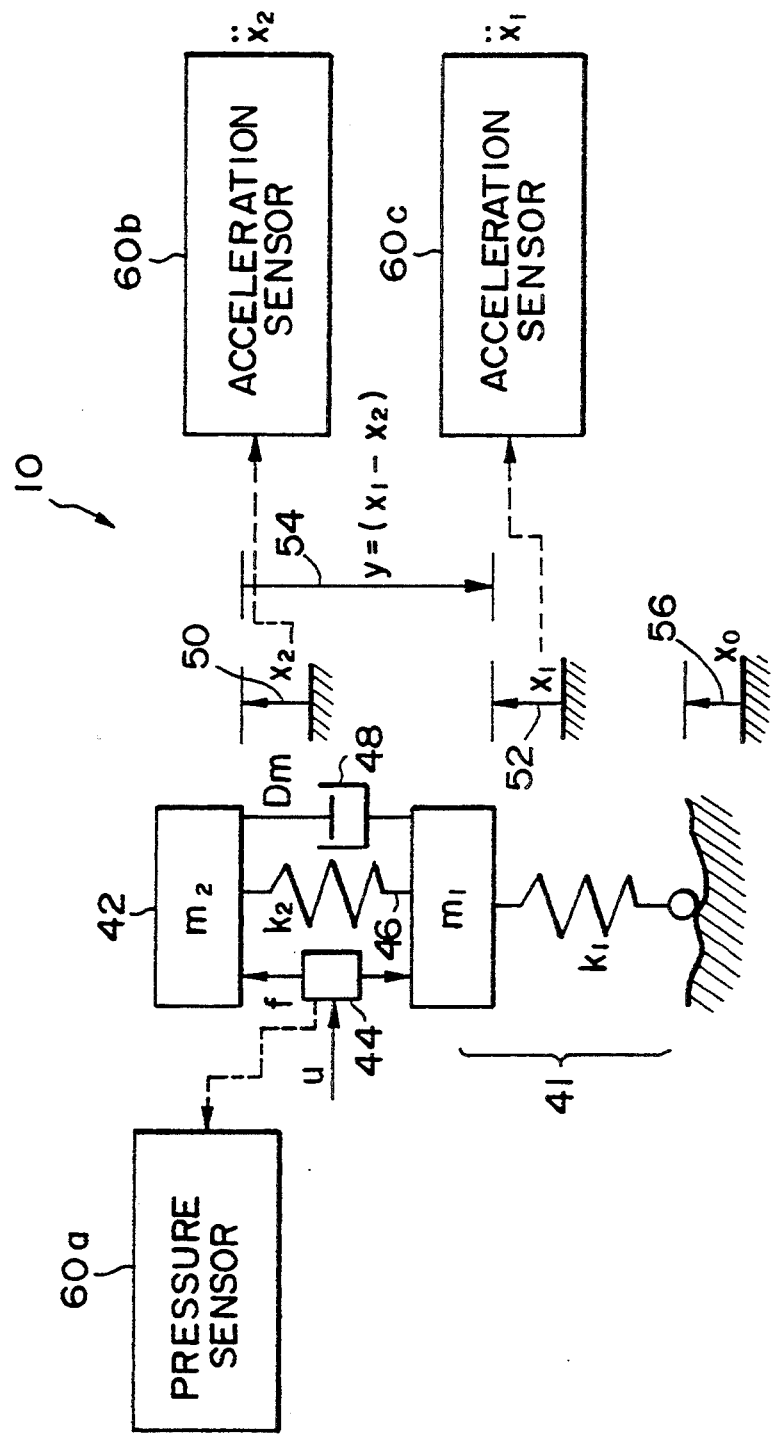
FIG. 32 is a diagram showing an automotive suspension system to be diagnosed by an apparatus according to a thirteenth embodiment.

FIG. 32 shows a suspension system as the diagnosing object of this embodiment. In FIG. 32, since the system is identical to the diagnosing object of FIG. 3, parts or elements corresponding to those of FIG. 3 are designated by like reference numerals, and their description is omitted here. In this dynamic system 10, like the second and third embodiments, acceleration sensors 60b, 60c for detecting vertical vibrations of a wheel are mounted at over-spring and under-spring portions. This suspension system 10 can be expressed by the following state equation:

[Formula 84]

$$\frac{d}{dt}\begin{bmatrix} \dot{x}_2 \\ \ddot{x}_2 \\ \dot{y} \\ \ddot{y} \\ f \end{bmatrix} =$$

$$\begin{bmatrix} 0 & 1 & 0 & 0 & 0 \\ 0 & 0 & k_2/m_2 & Dm/m_2 & -1(m_2T) \\ 0 & 0 & 0 & 1 & 0 \\ -k_1/m_1 & 0 & -a & -Dmb & b/T \\ 0 & 0 & 0 & 0 & -1/T \end{bmatrix} \begin{bmatrix} \dot{x}_2 \\ \ddot{x}_2 \\ \dot{y} \\ \ddot{y} \\ f \end{bmatrix} +$$

$$\begin{bmatrix} 0 \\ 1/(m_2T) \\ 0 \\ -b/T \\ 1/T \end{bmatrix} u + \begin{bmatrix} 0 \\ 0 \\ 0 \\ k_1/m_1 \\ 0 \end{bmatrix} \dot{x}_j$$

where $a = k_1/m_1 + k_2/m_1 + k_2/m_2$, $b = 1/m_1 + 1/m_2$, and T is a delay time between the operating quantity u and the active control force f.

In FIG. 32, the over-spring mass m2 represents a vehicle body weight. Accordingly, in this embodiment, the vehicle body weight change is represented by the change in parameter m2, and at the same time, the air pressure abnormality of the tire 41, the abnormality of the gas spring 46 and the abnormality of the damper 48 are assumed and treated as the respective changes of the parameters k1, k2 and Dm.

Figure 33:
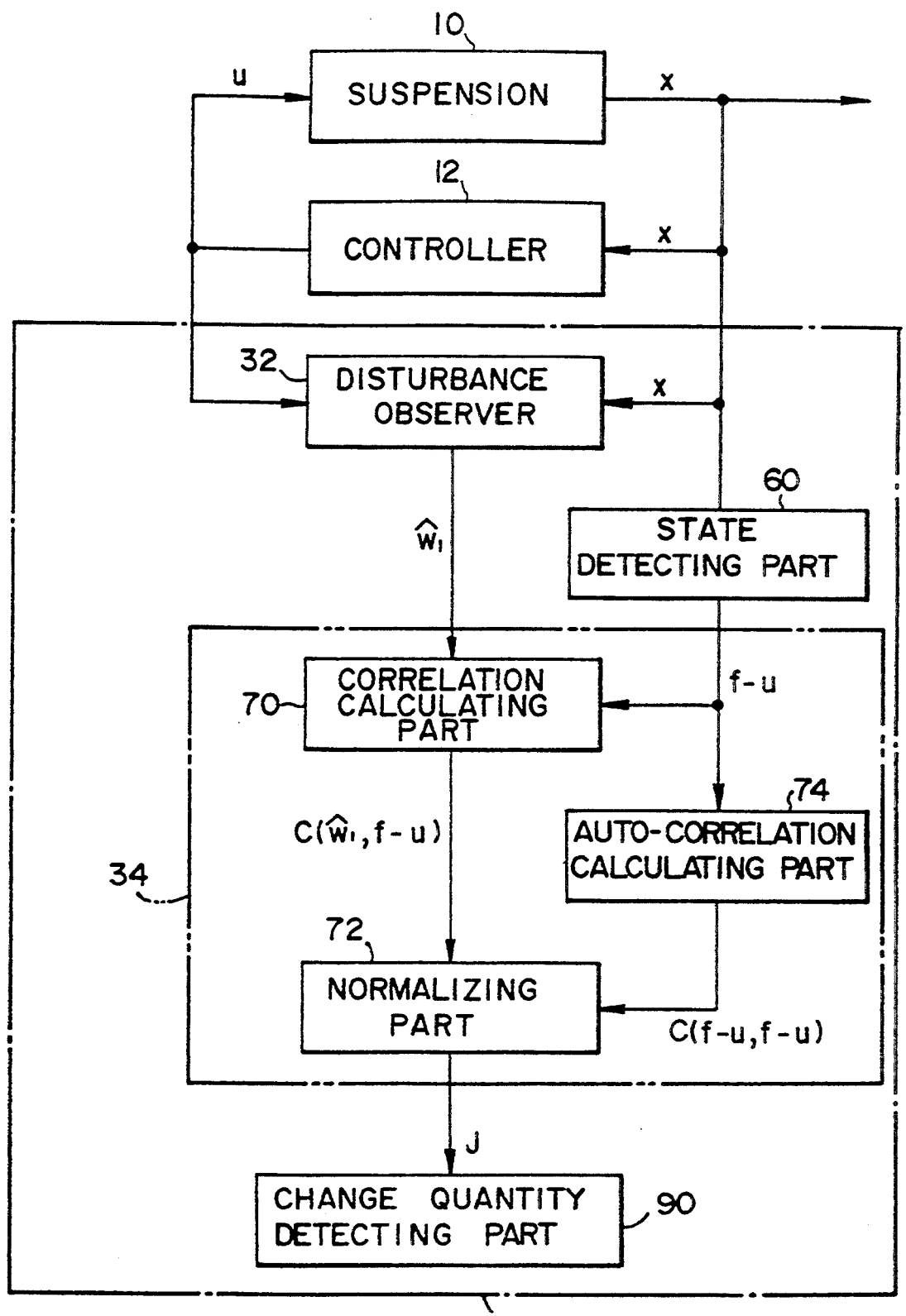
FIG. 33 is a block diagram of the apparatus of the thirteenth embodiment.

FIG. 33 is a block diagram of the system of this embodiment. The suspension system 10 to be as the diagnosing object is a system designed so as to receive, as an input, the operating quantity u to be outputted from the controller 12 and in such a manner that a vector $$x = [\dot{x}_2 \ \ddot{x}_2 \ \dot{y} \ \ddot{y} \ f]^T$$

contained in Formula 84 is a quantity of internal state.

Of various elements contained in the internal state vector x, the over spring acceleration is detected directly from the acceleration sensor 60b of FIG. 32, and over-spring speed is obtained by integrating the over-spring acceleration. The relative acceleration is obtained from the difference between the under-spring acceleration to be detected by the acceleration sensor 60c and the over-spring acceleration. The relative speed is obtained by integrating the relative acceleration. Various calculating parts for performing such calculations are incorporated in the suspension system 10 of this embodiment. Accordingly, the output of the suspension 10 is an internal state vector $$x = [\dot{x}_2 \ \ddot{x}_2 \ \dot{y} \ \ddot{y} \ f]^T$$

contained in Formula 84.

The controller 12 of this embodiment receives, as an input, the internal state vector x to be outputted as mentioned above, and calculates and outputs the operating quantity u to be an input of the active suspension system 10.

Further, the diagnosing apparatus 30 of this embodiment, in which the active suspension system 10 is the diagnosing object, comprises a disturbance observer 32, a correlation calculating part 34 and a change quantity detecting part 90.

The disturbance observer 32 is designed so as to receive, as inputs, the output u of the controller 12 and the output x of the active suspension system 10, and so as to estimate the above assumed parameter change as an internal disturbance caused in the active suspension system 10.

The state detecting part 60 extracts the quantity of state (f−u in this case) exerting an influence on the system 10 according to the change of the vehicle body weight m2 from the output x of the active suspension system 10. The reason why (f−u) is selected as the quantity of state will be described below in connection with the operation.

The correlation calculating part 34 includes a cross-correlation calculating part 70, a normalizing part 72 and an auto-correlation calculating part 74.

The cross-correlation calculating part 70 calculates and outputs a cross-correlation between the integrated disturbance estimated by the disturbance observer 32 and (f−u).

The auto-correlation calculating part 74 calculates an auto-correlation function of the quantity of state (f−u).

Further, the normalizing part 72 normalizes the cross-correlation function calculated by the cross-correlation calculating part 70 by dividing the cross-correlation by the auto-correlation function calculated by the auto-correlation calculating part 74, and the change quantity detecting part 90 detects a change in vehicle body weight.

The operation of this embodiment will now be described.

The assumed parameter changes are defined as follows:

[Formula 85]
$$\begin{cases} m_2 \rightarrow m_2 + \Delta m_2 \\ k_1 \rightarrow k_1 + \Delta k_1 \\ k_2 \rightarrow k_2 + \Delta k_2 \\ D_m \rightarrow D_m + \Delta D_m \end{cases}$$

When the above-mentioned parameter changes are caused, a response of the system 10 varied due to the change can be regarded as a composite response composed of a normal response and an internal disturbance corresponding to the parameter change.

The disturbance observer 32 receives, as inputs, the output and input signals x and u of the suspension system 10, and estimates and calculates an integrated disturbance vector w containing the internal and external disturbances, and outputs the integrated disturbance vector w. The estimated value at that time will be as follows:

[Formula 86]
$$\hat{w} = \begin{bmatrix} \hat{w}_1 \\ \hat{w}_2 \end{bmatrix} =$$

$$\begin{bmatrix} \Delta a_{23}\dot{y} + \Delta a_{24}\ddot{y} + \Delta a_{25}f + \Delta b_2 u \\ \Delta a_{41}\dot{x}_2 + \Delta a_{43}\dot{y} + \Delta a_{44}\ddot{y} + \Delta a_{45}f + \Delta b_4 u + \frac{k_1 + \Delta k_1}{m_1}\dot{x}_0 \end{bmatrix}$$

where, $$\Delta a_{23} = \frac{k_2 + \Delta k_2}{m_2 + \Delta m_2} - \frac{k_2}{m_2},$$

$$\Delta a_{24} = \frac{D_m + \Delta D_m}{m_2 + \Delta m_2} - \frac{D_m}{m_2},$$

$$\Delta a_{25} = -\Delta b = -\frac{1}{T}\left(\frac{1}{m_2 + \Delta m_2} - \frac{1}{m_2}\right)$$

$$\Delta a_{41} = -\frac{\Delta k_1}{m_1},$$

$$\Delta a_{43} = -\left(\frac{\Delta k_1}{m_1} + \frac{\Delta k_2}{m_1} + \frac{k_2 + \Delta k_2}{m_2 + \Delta m_2} - \frac{k_2}{m_2}\right),$$

$$\Delta a_{44} = -(D_m + \Delta D_m)\left(\frac{1}{m_1} + \frac{1}{m_2 + \Delta m_2}\right) +$$

$$D_m\left(\frac{1}{m_1} + \frac{1}{m_2}\right),$$

$$\Delta a_{45} = -\Delta b_4 = \frac{1}{T}\left(\frac{1}{m_2 + \Delta m_2} - \frac{1}{m_2}\right)$$

In Formula 86, the terms indicated by only the change of the vehicle body weight m2 are $\Delta a_{25}f$ of the third term and $\Delta b_2 u$ of the fourth term of the disturbance element: $\hat{w}_1$ as well as $\Delta a_{45}f$ of the fourth term and $\Delta b_4 u$ of the fifth term of the disturbance element: $\hat{w}_2$. In order to extract the change of the vehicle body weight m2 from the integrated disturbance indicated by $\hat{w}_1$ and $\hat{w}_2$, it is advisable to use the disturbance element $\hat{w}_1$ free of the road face disturbance x0 which is an external disturbance.

$\hat{w}_1$ can be rewritten as follows:

[Formula 87]

$$\hat{w}_1 = \Delta a_{23}\dot{y} + \Delta a_{24}\ddot{y} + a_{25}(f - u)$$

The quantity $\Delta a_{25}$ representing the change of the vehicle body weight m2 is extracted from Formula 87. Accordingly, the correlation calculating part 70 calculates a cross-correlation between the estimated integrated disturbance $\hat{w}_1$ and (f−u). Assuming that this correlation is as follows:

[Formula 88]

$$C(\hat{w}_1, f-u)$$

this Formula 88 is calculated as follows:

$$C(\hat{w}_1, f-u) = \frac{1}{N}\sum_{k=1}^{N}(\hat{w}_1 - \bar{\hat{w}}_1)((f-u) - \overline{(f-u)}) \quad \text{[Formula 89]}$$

By calculating such cross-correlation, the term of $\Delta a25$ and the remaining terms are separated from each other so that only the change of the vehicle body weight m2 can be extracted. Namely, the estimated value of the integrated disturbance $\hat{w}_1$ to be outputted is obtained, and a mean value expressed by the following equation by sampling (f−u) successively at N points.

$$\bar{\hat{w}}_1 = \frac{1}{N}\sum_{k=1}^{N}\hat{w}_1, \overline{f-u} = \frac{1}{N}\sum_{k=1}^{N}(f-u) \quad \text{[Formula 90]}$$

Using these mean values, the correlation of Formula 89 is calculated. As its correlation function is calculated, the terms except the term of $\Delta a25$ are canceled so that the value will be as follows:

$$C(\hat{w}_1, f-u) = -\frac{1}{T}\left(\frac{1}{m_2 + \Delta m_2} - \frac{1}{m_2}\right)C(f-u, f-u) \quad \text{[Formula 91]}$$

The resulting correlation function is expressed as the product of the term representing the change of the vehicle body weight m2 and the auto-correlation function of the quantity of state (f−u) of the suspension, the quantity of state having been used in calculation of correlation. Therefore, by dividing the obtained correlation function by the auto-correlation function of the quantity of state (f−u), it is possible to detect the change of the vehicle body weight m2 quantitatively.

The auto-correlation function of this quantity of state (f−u) is calculated by the auto-correlation calculating part 74 and is inputted to the normalizing part 72. The normalizing part 72 detects and outputs the change of the vehicle body weight m2, as shown by the following equation, by dividing the correlation function, which is outputted from the cross-correlation calculating part 70, by auto-correlation function, which is outputted from the auto-correlation calculating part 74.

$$J = \Delta a_{25} = \frac{C(\hat{w}_1, f-u)}{C(f-u, f-u)} = -\frac{1}{T}\left(\frac{1}{m_2 + \Delta m_2} - \frac{1}{m_2}\right) \quad \text{[Formula 92]}$$

In Formula 92, the parameters m2 and T are given values. Therefore, the change quantity detecting part 90 calculates the following equation using the output J of the normalizing part 72 so that the change quantity $\Delta m2$ of the vehicle body weight m2 can be obtained accurately.

$$\Delta m_2 = \left(\frac{1}{1 - JTm_2} - 1\right)m_2 \quad \text{[Formula 93]}$$

In this embodiment, (f−u) is selected for the quantity of state used in calculation of correlation. Alternatively f may be selected. At that time, the cross-correlation calculating part 70 calculates a correlation between the estimated value of the first element of the integrated disturbance w1 and the state f and outputs a value expressed by the following equation:

$$C(\hat{w}_1, f) = -\frac{1}{T}\left(\frac{1}{m_2 + \Delta m_2} - \frac{1}{m_2}\right)\{C(f, f) - C(u, f)\} \quad \text{[Formula 94]}$$

Since the state f is such that the operating quantity u has been delayed by a time T, the correlation C(u, f) between the operating quantity u and the state f might not be zero. In order to obtain the change of the vehicle body weight m2, firstly, the auto-correlation of the state f is calculated and, at the same time, a cross-correlation C(u, f) between the operating quantity u and the state f is obtained. Then, the difference C(f, f)−C(u, f) between this value and the auto-correlation function C(f, f) of the state f is obtained. The normalizing part 72 can detect the change of the vehicle body weight m2 by dividing the output of the cross-correlation calculating part 70 by the value of the obtained difference. The output J of the normalizing part 72 at that time is as follows:

$$J = \frac{C(\hat{w}_1, f)}{C(f, f) - C(u, f)} = -\frac{1}{T}\left(\frac{1}{m_2 + \Delta m_2} - \frac{1}{m_2}\right) \quad \text{[Formula 95]}$$

In the similar method, the cross-correlation calculating part 70 obtains a correlation function $$C(\hat{w}_1, \dot{y})$$

between the estimated value of the disturbance $\hat{w}_1$ and the relative speed $\dot{y}$.

The auto-correlation calculating part 74 obtains an auto-correlation function $$C(\dot{y}, \dot{y})$$

of the relative speed $\dot{y}$.

The normalizing part 72 divides the correlation function $$C(\hat{w}_1, \dot{y})$$

by the relative speed $\dot{y}$ of the auto-correlation function $$C(\dot{y}, \dot{y})$$

As the output J of the normalizing part 72, the quantity:

$$J = \Delta a_{23} = \frac{C(\hat{w}_1, \dot{y})}{C(\dot{y}, \dot{y})} = \frac{k_2 + \Delta k_2}{m_2 + \Delta m_2} - \frac{k_2}{m_2} \quad \text{[Formula 96]}$$

expressed in terms of the change of gas spring constant k2 and the change of vehicle body weight m2 is obtained. However, since the change quantity $\Delta m2$ of the vehicle body weight m2 can be obtained by the method described in the embodiment given above, by using $\Delta m2$, it is possible to obtain also the change quantity $\Delta k2$ of the gas spring constant k2.

Further, the cross-correlation calculating part 70 obtains a correlation $$C(\hat{w}_1, \ddot{y})$$

between the estimated value of the disturbance $\hat{w}_1$ and the relative acceleration $\ddot{y}$.

The auto-correlation calculating part 74 obtains an auto-correlation function $$C(\ddot{y}, \ddot{y})$$

of the relative acceleration $\ddot{y}$.

The normalizing part 72 divides the correlation function $$C(\hat{w}_1, \ddot{y})$$

by the relative acceleration $\ddot{y}$ of the auto-correlation function $$C(\ddot{y}, \ddot{y})$$

As the output J of the normalizing part 72, the quantity:

$$J = \Delta a_{24} = \frac{C(\hat{w}_1, \ddot{y})}{C(\ddot{y}, \ddot{y})} = \frac{Dm + \Delta Dm}{m_2 + \Delta m_2} - \frac{Dm}{m_2} \quad \text{[Formula 97]}$$

expressed in terms of the change of the damper constant Dm and the change of the vehicle body weight m2 is obtained. Using the change quantity Δm2 of the vehicle body weight m2 obtained in the above-embodiment, the change quantity ΔDm of the damper constant Dm is obtained.

Likewise, the cross-correlation calculating part 70 obtains a correlation function $$C(\hat{w}_2, \dot{y})$$

between the estimated value of the integrated disturbance $\hat{w}_2$ and the relative speed $\dot{y}$. The auto-correlation calculating part 74 obtains the auto-correlation function $$C(\dot{y}, \dot{y})$$

of a relative acceleration $\dot{y}$. The normalizing part 72 divides the correlation function $$C(\hat{w}_2, \dot{y})$$

by the auto-correlation function $$C(\dot{y}, \dot{y})$$

of the relative speed $\dot{y}$ to obtain change quantity Δk1 of the tire spring constant k1 and the quantity $$J = \Delta a_{43} = \frac{C(\hat{w}_2, \dot{y})}{C(\dot{y}, \dot{y})} = \quad \text{[Formula 98]}$$

$$\left( \frac{\Delta k_1}{m_1} + \frac{\Delta k_2}{m_1} + \frac{k_2 + \Delta k_2}{m_2 + \Delta m_2} - \frac{k_2}{m_2} \right)$$

expressed in terms of the change quantity Δk2 of the gas spring constant k2 and the change quantity Δk2 of the vehicle body weight m2 as the output J of the normalizing part 72. Since the change quantity of the gas spring constant k2 and the change quantity Δm2 of the vehicle body weight m2 are already obtained by the above-mentioned method, it is possible to know the change quantity Δk1 of the tire spring constant k1.

Thus, according to this embodiment, the change quantity of the vehicle body weight m2 can be detected easily, and using the obtained value, the remaining parameter change quantities also can be obtained in order.

Utilizing the change quantity of the vehicle body weight and the change quantities of various parameters in control rules of the active suspension, it is possible to achieve an optimum comfortable driving to fit to these changes.

Figure 36:
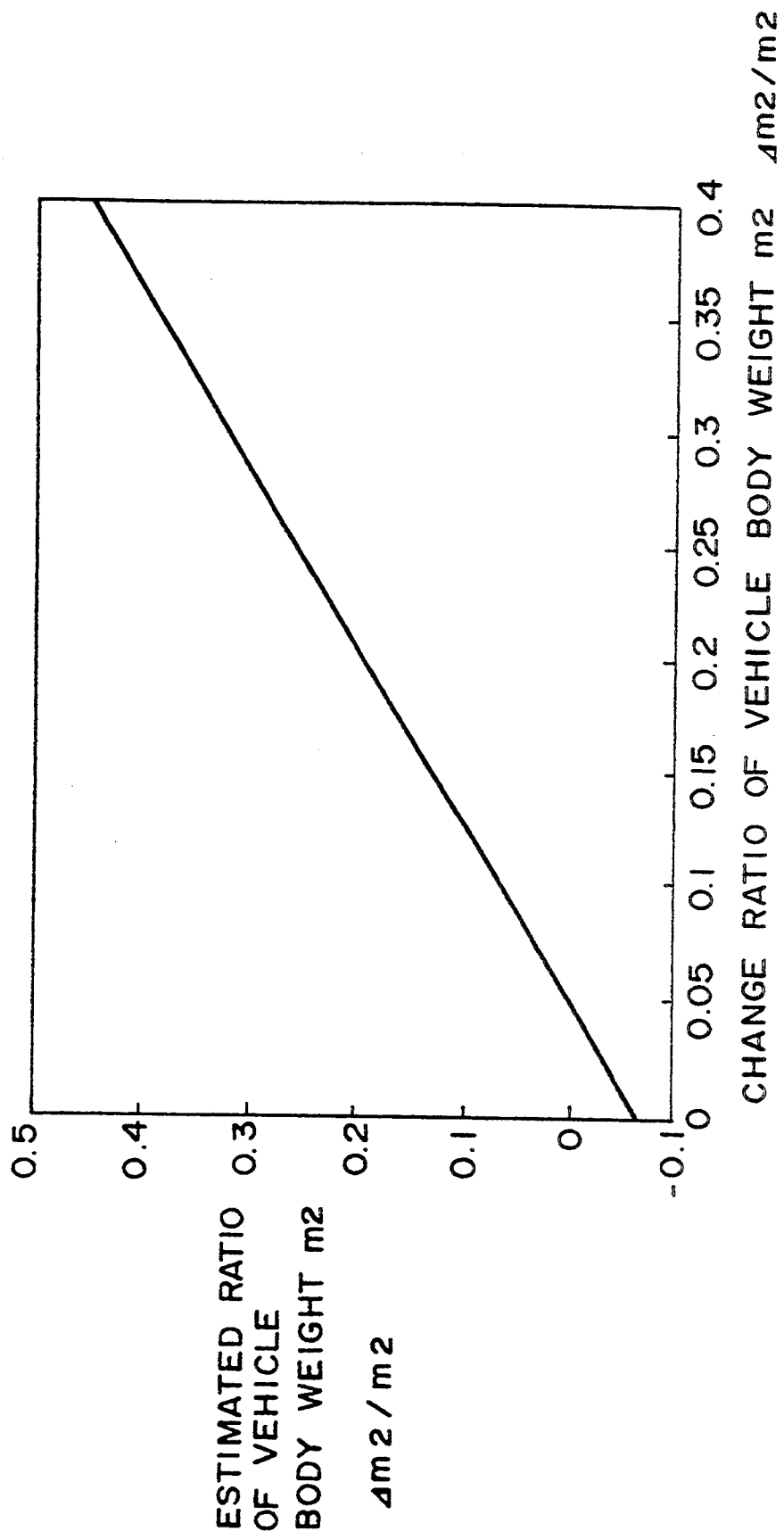
FIG. 36 is a graph showing the result of an experiment conducted using the apparatus of FIG. 33.

FIG. 36 shows the result of simulation conducted based on the block diagram of FIG. 33. In this simulation, estimation of the disturbance and sampling of data take place every 5 ms to calculate the cross-correlation and auto-correlation using the information obtained in the past two seconds. In FIG. 36, by changing the vehicle body weight change with respect to the standard weight in a range of 0% to 40%, the changing rate can be calculated from the estimated value of the change quantity of the vehicle body weight at that time. From this result, it is understood that the changing rate of the vehicle weight can be estimated with precision within an error range of plus/minus 10%.

Second Case Where Passive Suspension Is Diagnosed

The suspension system, which is the diagnosing object of this embodiment, is identical to the diagnosing object of the tire air pressure diagnosing apparatus of FIG. 13, and its description is omitted here. As mentioned above, the state equation of the suspension system 10 will be as Formula 45.

In FIG. 13, the over-spring mass m2 represents a vehicle body weight. Accordingly, in this embodiment, the vehicle body weight change is represented by the change in parameter m2, and at the same time, the air pressure abnormality of the tire 41, the abnormality of the gas spring 46 and the abnormality of the damper 48 are assumed and treated as the respective changes of the parameters k1, k2 and Dm.

Figure 34:
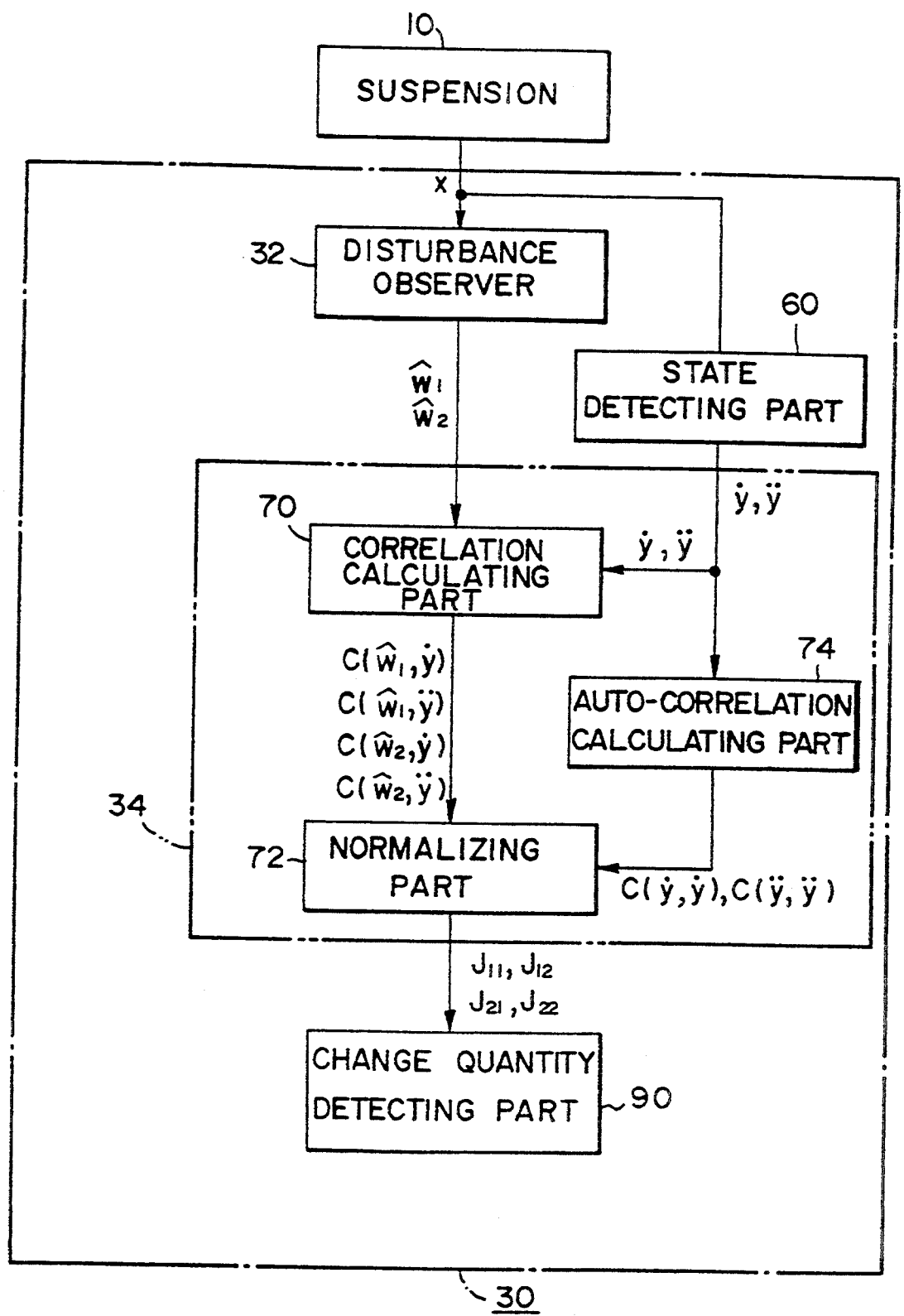
FIG. 34 is a block diagram showing a modified form of the apparatus of the thirteenth embodiment.

FIG. 34 is a block diagram of the system of this embodiment. As mentioned, the output of the suspension system 10 or the diagnosing object is the internal state vector x of Formula 45.

The diagnosing apparatus 30 of this embodiment, in which the suspension system 10 is the diagnosing object, comprises a disturbance observer 32, a correlation calculating part 34, a state detecting part 60 and a change quantity detecting part 90. The disturbance observer 32 is designed so as to receive, as an input, the output x of the passive suspension system 10, and so as to estimate the change of the above assumed parameter as the internal disturbance caused in the passive suspension system 10.

The state detecting part 60 extracts from the output x of the passive suspension system 10 the quantities of state (the relative speed and the relative acceleration here) exerting an influence on the system 10 due to change of the vehicle body weight m2.

The cross-correlation calculating part 34 includes a cross-correlation calculating part 70, a normalizing part 72 and an auto-correlation calculating part 74.

The cross-correlation calculating part 70 calculates and outputs a cross-correlation between the disturbance estimated by the disturbance observer 32, and the relative speed and relative acceleration.

Further, the auto-correlation calculating part 74 calculates respective auto-correlation functions of the relative speed and relative acceleration.

And the normalizing part 72 divides the cross-correlation function calculated by the cross-correlation calculating part 70 by the auto-correlation function calculated by the auto-correlation calculating part 74 to normalize the cross-correlation function. The change quantity detecting part 90 detects the change of vehicle body weight.

The operation of the apparatus of this embodiment will now be described.

The assumed parameters are defined as follows:

$$\begin{cases} m_2 \rightarrow m_2 + \Delta m_2 \\ k_1 \rightarrow k_1 + \Delta k_1 \\ k_2 \rightarrow k_2 + \Delta k_2 \\ Dm \rightarrow Dm + \Delta Dm \end{cases} \quad \text{[Formula 99]}$$

When the foregoing parameter change occurs, a response of the suspension system 10 varied due to the change can be regarded as a composite response including the normal response and an internal disturbance corresponding to the parameter change.

The disturbance observer 32 receives, as inputs, the output signal x and input signal u of the suspension system 10 and estimates and calculates the integrated disturbance vector w containing the internal disturbance. The estimated disturbance $\hat{w}$ at that time will be as follows:

$$\hat{w} = \begin{bmatrix} \hat{w}_1 \\ \hat{w}_2 \end{bmatrix} = \begin{bmatrix} \Delta a_{23}\dot{y} + \Delta a_{24}\ddot{y} \\ \Delta a_{41}\dot{x}_2 + \Delta a_{43}\dot{y} + \Delta a_{44}\ddot{y} + \frac{k_1 + \Delta k_1}{m_1}x_0 \end{bmatrix} \quad \text{[Formula 100]}$$

where, $$\Delta a_{23} = \frac{k_2 + \Delta k_2}{m_2 + \Delta m_2} - \frac{k_2}{m},$$

$$\Delta a_{24} = \frac{Dm + \Delta Dm}{m_2 + \Delta m_2} - \frac{Dm}{m_2},$$

$$\Delta a_{41} = -\frac{\Delta k_1}{m_1},$$

$$\Delta a_{43} = -\left(\frac{\Delta k_1}{m_1} + \frac{\Delta k_2}{m_1} + \frac{k_2 + \Delta k_2}{m_2 + \Delta m_2} - \frac{k_2}{m_2}\right),$$

$$\Delta a_{44} = -(Dm + \Delta Dm)\left(\frac{1}{m_1} + \frac{1}{m_2 + \Delta m_2}\right) + Dm\left(\frac{1}{m_1} + \frac{1}{m_2}\right),$$

Since in Formula 100 there exists no term represented only by the change of the vehicle body weight m2, the change of the vehicle body weight m2 is detected using some change terms. Firstly, the cross-correlation calculating part 70 calculates a cross-correlation between the estimated first and second elements of the integrated disturbance $\hat{w}_1$, $\hat{w}_2$ and the relative speed and relative acceleration. Now, assuming that the cross-correlation function between $\hat{w}_1$ and the relative speed is $$C(\hat{w}_1, \dot{y})$$

that the cross-correlation function between $\hat{w}_1$ and the relative acceleration is $$C(\hat{w}_1, \ddot{y})$$

that cross-correlation function between $\hat{w}_2$ and the relative speed is $$C(\hat{w}_2, \dot{y})$$

and that the cross-correlation function between $\hat{w}_2$ and the relative acceleration is $$C(\hat{w}_2, \ddot{y}),$$

these values will be as follows:

$$C(\hat{w}_1, \dot{y}) = \left(\frac{k_2 + \Delta k_2}{m_2 + \Delta m_2} - \frac{k_2}{m_2}\right)C(\dot{y}, \dot{y}) \quad \text{[Formula 101]}$$

$$C(\hat{w}_1, \ddot{y}) = \left(\frac{Dm + \Delta Dm}{m_2 + \Delta m_2} - \frac{Dm}{m_2}\right)C(\ddot{y}, \ddot{y})$$

$$C(\hat{w}_2, \dot{y}) = -\left(\frac{\Delta k_1}{m_1} + \frac{\Delta k_2}{m_1} + \frac{k_2 + \Delta k_2}{m_2 + \Delta m_2} - \frac{k_2}{m_2}\right)C(\dot{y}, \dot{y})$$

$$C(\hat{w}_2, \ddot{y}) = \left\{ -(Dm + \Delta Dm)\left(\frac{1}{m_1} + \frac{1}{m_2 + \Delta m_2}\right) + Dm\left(\frac{1}{m_1} + \frac{1}{m_2}\right)\right\}C(\ddot{y}, \ddot{y}) \quad \text{[Formula 102]}$$

By calculating these cross-correlation's, the individual change terms of the estimated integrated disturbance are separated from the remaining terms.

By diving the thus calculated correlation function by the auto-correlation function between the relative speed and relative acceleration, the change terms can be extracted. The normalizing part 72 divides the correlation function outputted from the cross-correlation calculating part 70 by the auto-correlation function outputted from the auto-correlation calculating part 74 to output four values as follows:

$$J_{11} = \frac{C(\hat{w}_1, \dot{y})}{C(\dot{y}, \dot{y})} = \frac{k_2 + \Delta k_2}{m_2 + \Delta m_2} - \frac{k_2}{m_2} \quad \text{[Formula 103]}$$

$$J_{12} = \frac{C(\hat{w}_1, \ddot{y})}{C(\ddot{y}, \ddot{y})} = \frac{Dm + \Delta Dm}{m_2 + \Delta m_2} - \frac{Dm}{m_2}$$

$$J_{21} = \frac{C(\hat{w}_2, \dot{y})}{C(\dot{y}, \dot{y})} = -\left(\frac{\Delta k_1}{m_1} + \frac{\Delta k_2}{m_1} + \frac{k_2 + \Delta k_2}{m_2 + \Delta m_2} - \frac{k_2}{m_2}\right)$$

$$J_{22} = \frac{C(\hat{w}_2, \ddot{y})}{C(\ddot{y}, \ddot{y})} = -(Dm + \Delta Dm)\left(\frac{1}{m_1} + \frac{1}{m_2 + \Delta m_2}\right) + Dm\left(\frac{1}{m_1} + \frac{1}{m_2}\right)$$

From the thus obtained Jij (i,j=1,2), the change quantity detecting part 9 detects the change of the vehicle body weight. Since the assumed parameter changes are four kinds of changes $\Delta m_2$, $\Delta k_1$, $\Delta k_2$, $\Delta Dm$ and the output of the normalizing part 72 are four kinds of outputs J11, J12, J21, J22, the change quantities can be detected using the method such as simultaneous equations.

For example, if J12 is added to J22, the result is as follows:

$$J_{12} + J_{22} = -\frac{\Delta Dm}{m_1} \quad \text{[Formula 104]}$$

Since m1 and Dm is already known, the change quantity ΔDm of the damper constant can be obtained from the foregoing equation.

By the thus obtained ΔDm and J12, the change quantity Δm2 of the vehicle body weight can be obtained.

Further, from the thus obtained Δm2 and J11, the change quantity Δk2 of the gas spring constant can be obtained. Since Δm2 and Δk2 has already been obtained, it is possible to obtain the change quantity Δk1 of the tire spring constant from these values and J21.

Thus, in this embodiment, even if the change quantity of the vehicle body weight cannot be detected directly by the output of the normalizing part 72, it is possible to detect the change quantity of the vehicle body weight by using a number of outputs of the normalizing part 72. Likewise the remaining parameter change quantities also can be detected.

This embodiment applied to the passive suspension can similarly be applied also to an active suspension.

In this embodiment, the diagnosing apparatus 30 is designed with the assumption that no correlation exists between the road face disturbance and the quantity of internal state. However, a correlation might exist between the road face disturbance the quantity of internal state, depending on the construction of the suspension 10 and the control algorithm of the controller 12. A vehicle body weight change detecting apparatus when applied in such case will now be described as the following embodiment:

Fourteenth Embodiment

Figure 35:
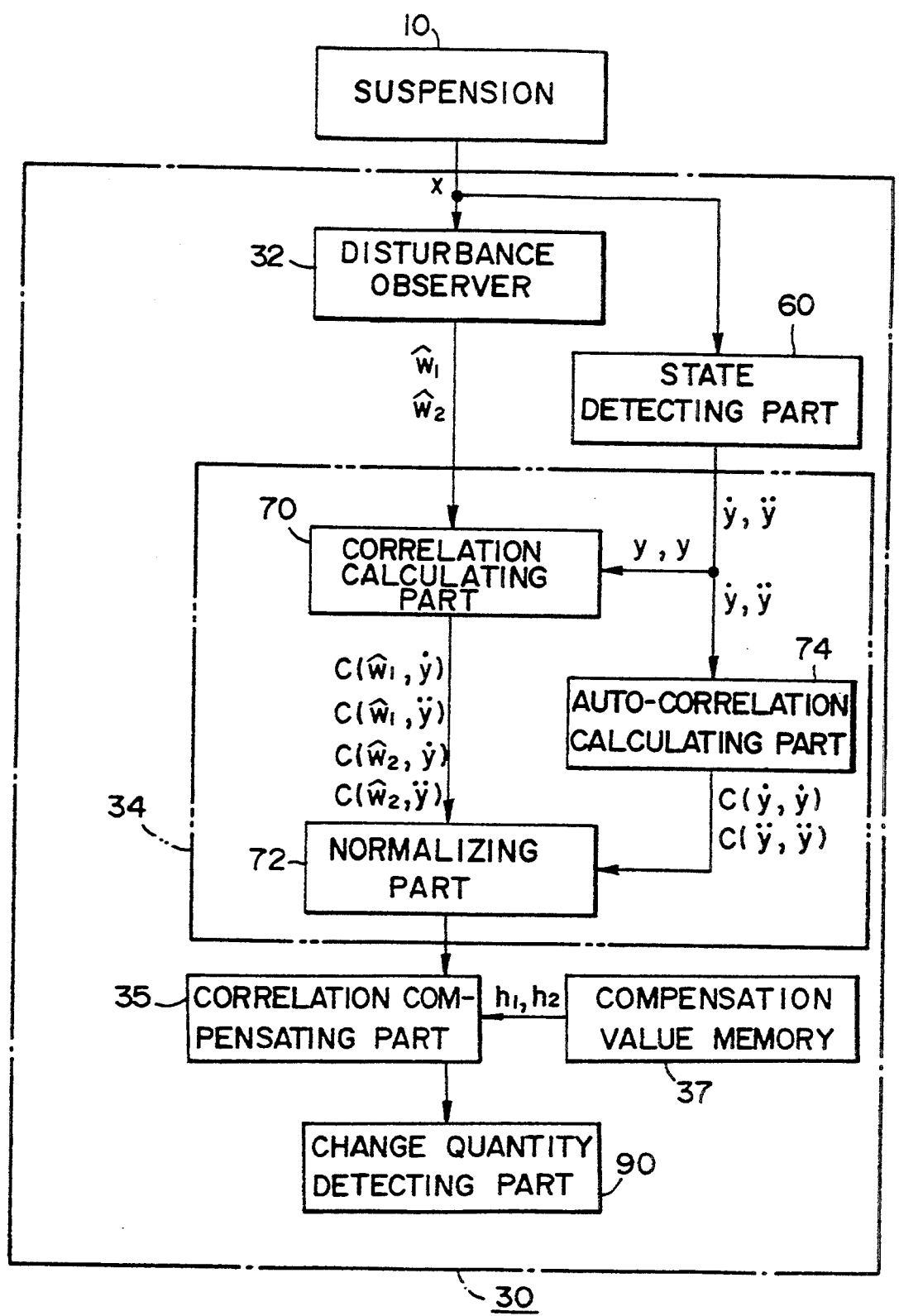
FIG. 35 is a block diagram showing an apparatus according to a fourteenth embodiment.

FIG. 35 shows a fourteenth Embodiment in which a correlation exists between the road face disturbance and the quantity of internal state of the suspension 10.

In FIG. 35, the correlation calculating part 70 calculates a cross-correlation between the quantities of internal state, which are the relative speed and relative acceleration of the suspension, and the estimated value of the integrated disturbance estimated by the disturbance observer 32. If correlation exists between them, it is impossible to eliminate any influence of the road face disturbance penetrating as the external disturbance.

Therefore, the correlation compensating part 35 compensates the result of calculation of correlation by the result of calculation of correlation, the quantities of internal state and the compensation value h, which is previously stored in the memory 37, and thereby eliminates the influence of the road face disturbance.

The change quantity detecting part 90 detects the change quantity of the vehicle body weight, based on the compensated result of calculation of correlation, in the same operation as of the foregoing embodiment of FIG. 34.

Operation of the correlation compensating part 35 is described in the following.

Similar to the foregoing embodiment, the assumed parameter changes are defined as follows:

$$\begin{cases} m_2 \to m_2 + \Delta m_2 \\ k_1 \to k_1 + \Delta k_1 \\ k_2 \to k_2 + \Delta k_2 \\ Dm \to Dm + \Delta Dm \end{cases} \quad \text{[Formula 105]}$$

As mentioned above, when the above-mentioned change is caused, the disturbance observer 32 estimates the disturbance expressed by Formula 100. Similar to the foregoing embodiment, the correlation calculating part 70 calculates a correlation between the estimated value of the integrated disturbance and the relative speed, and the normalizing part 72 divides this result by an auto-correlation function of the relative speed. As a result, the output of the normalizing part 72 will be as follows:

$$J_{11} = \frac{C(\hat{w}_1, \dot{y})}{C(\dot{y}, \dot{y})} = \frac{k_2 + \Delta k_2}{m_2 + \Delta m_2} - \frac{k_2}{m_2} \quad \text{[Formula 106]}$$

$$J_{12} = \frac{C(\hat{w}_1, \dot{y})}{C(\dot{y}, \dot{y})} = \frac{Dm + \Delta Dm}{m_2 + \Delta m_2} - \frac{Dm}{m_2}$$

$$J_{21} = \frac{C(\hat{w}_2, \dot{y})}{C(\dot{y}, \dot{y})} = -$$

$$\left( \frac{\Delta k_1}{m_1} + \frac{\Delta k_2}{m_1} + \frac{k_2 + \Delta k_2}{m_2 + \Delta m_2} - \frac{k_2}{m_2} \right) +$$

$$\frac{k_1 + \Delta k_1}{m_1} \frac{C(\dot{x}_0, \dot{y})}{C(\dot{y}, \dot{y})}$$

$$J_{22} = \frac{C(\hat{w}_2, \dot{y})}{C(\dot{y}, \dot{y})} = -(Dm + \Delta Dm)\left( \frac{1}{m_1} + \frac{1}{m_2 + \Delta m_2} \right) +$$

$$Dm\left( \frac{1}{m_1} + \frac{1}{m_2} \right) + \frac{k_1 + \Delta k_1}{m_1} \frac{C(\dot{x}_0, \dot{y})}{C(\dot{y}, \dot{y})}$$

Thus, if correlation exists between the road face disturbance and the relative speed and relative acceleration, the second term of right side of J21 and the third term of right side of J22 of Formula 106 exerts an influence on the result of calculation of correlation.

Under the normal state free of parameter changes, the output of the normalizing part 72 will be equal to Formula 106 where:

[Formula 107]

Δk1=Δk2=Δm2=ΔDm=O

This value can be expressed as follows:

$$J_{11} = 0 \quad \text{[Formula 108]}$$

$$J_{12} = 0$$

$$J_{21} \triangleq \frac{k_1}{m_1} \frac{C(\dot{x}_0, \dot{y})}{C(\dot{y}, \dot{y})}$$

$$J_{22} \triangleq \frac{k_1}{m_1} \frac{C(\dot{x}_0, \dot{y})}{C(\dot{y}, \dot{y})}$$

Of this output results, the following value:

$$h_1 \stackrel{\Delta}{=} \frac{J_{21}}{k_1/m_1} = \frac{C(x_0, y)}{C(y, y)} \quad \text{[Formula 109]}$$

$$h_2 \stackrel{\Delta}{=} \frac{J_{22}}{k_1/m_1} = \frac{C(x_0, y)}{C(y, y)}$$

obtained by dividing J21 and J22 by k1/m1 is previously stored in the memory 37 as the compensation value h.

Namely, the compensation value h1, h2 is substantially constant regardless of the magnitude of the road face disturbance. Therefore, J21 and J22 of the output of the normalizing part 72 when the parameter value is normal and under a suitable operating state of the suspension 10, and a calculation result based on Formula 109 are stored in the memory 37, and are used as the compensation values.

Using this compensation value, the correlation compensating part 35 performs the following compensation:

$$J_{21} - \frac{k_1}{m_1} h_1 \to J_{21} \quad \text{[Formula 110]}$$

$$J_{22} - \frac{k_1}{m_1} h_2 \to J_{22}$$

As a result, the correlation calculating part 35 outputs the following values:

$$J_{11} = \frac{k_2 + \Delta k_2}{m_2 + \Delta m_2} - \frac{k_2}{m_2} \quad \text{[Formula 111]}$$

$$J_{12} = \frac{Dm + \Delta Dm}{m_2 + \Delta m_2} - \frac{Dm}{m_2}$$

$$J_{21} = -\left(\frac{\Delta k_1}{m_1} + \frac{\Delta k_2}{m_1} + \frac{k_2 + \Delta k_2}{m_2 + \Delta m_2} - \frac{k_2}{m_2}\right) + \frac{\Delta k_1}{m_1} h_1$$

$$J_{22} = -(Dm + \Delta Dm)\left(\frac{1}{m_1} + \frac{1}{m_2 + \Delta m_2}\right) +$$

$$Dm\left(\frac{1}{m_1} + \frac{1}{m_2}\right) + \frac{\Delta k_1}{m_1} h_2$$

The change quantity detecting part 90 detects the change quantity of the vehicle body weight based on Formula 111. Namely, in Formula 111, variables to be obtained are four variables $\Delta k_1$, $\Delta k_2$, $\Delta m_2$, $\Delta Dm$. Since Formula 111 contains four equations, it is possible to obtain the parameter change quantities $\Delta k_1$, $\Delta k_2$, $\Delta m_2$, $\Delta Dm$ using, for example, simultaneous equations. The parameter change quantities include the change quantity $\Delta m_2$ of the vehicle body weight.

In this embodiment, a standard state of the vehicle body weight is assumed to be the vehicle body weight when compensation values h are recorded in the experiment.

The correlation between the actual change of the vehicle body weight and the estimated value according to this embodiment is shown in FIG. 36. According to this embodiment, it is possible to estimate the change of the vehicle body weight accurately.

Fifteenth Embodiment

A fifteenth embodiment of this invention will now be described.

In the foregoing embodiments, a fault of the system is diagnosed from the integrated disturbance when no correlation exists between the states of the dynamic system. Alternatively, there may exist a correlation between the states, depending on the system. In the alternative case, in the method of normalizing the correlation between the integrated disturbance and the state by the auto-correlation of the state, as indicated by the correlation calculating part 34, an error might occur in diagnosis.

Figure 37:
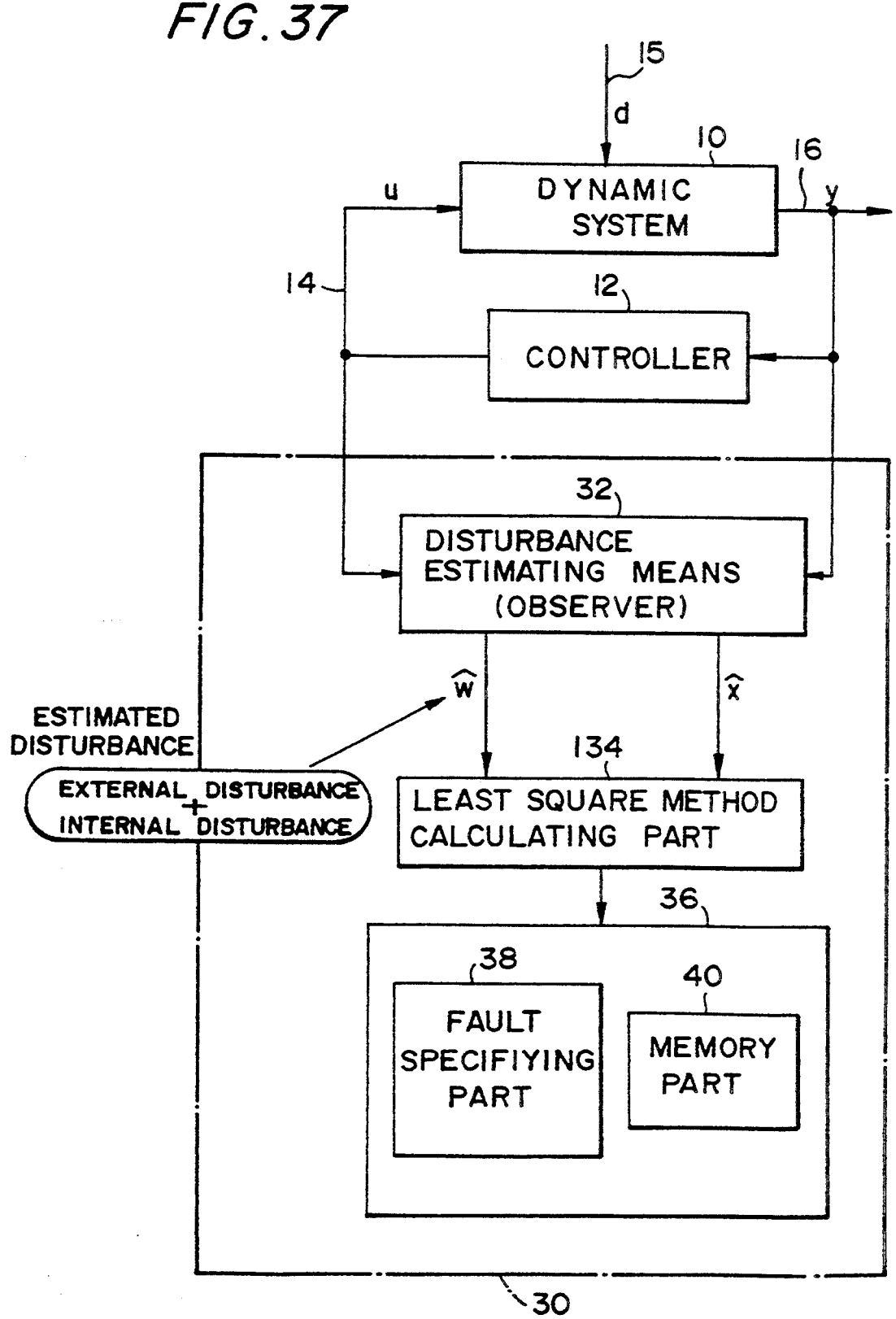
FIG. 37 is a block diagram showing an apparatus according to a fifteenth embodiment.

In such case, using the least square method, the correlation between states is compensated. FIG. 37 is a block diagram showing such a method. In FIG. 37, the change as of the tire air pressure is replaced with the change in physical parameters of the system 10. This change is estimated as the internal disturbance by the disturbance observer 32; that is, the disturbance observer estimates the integrated disturbance vector represented by the sum of the external disturbance d and the internal disturbance $\Delta Ax$, as already mentioned. The first element of the integrated disturbance vector can be written as Formula 26.

In Formula 26, it is assumed that $\Delta a_{11}$ is an element caused by the tire air pressure change and that the remaining elements are caused by the change except the tire air pressure. Now assume a correlation exists between the states x1 and x2, for example. In this case, in order to detect $\Delta a_{11}$, a correlation $C([Dw]1, x1)$ between $[Dw]1$ and x1 is calculated as follows:

[Formula 117]

$$C([Dw]_1, x_1) = \Delta a_{11} C(x_1, x_1) + \Delta a_{12} C(x_1, x_2)$$

When Formula 117 is divided by the auto-correlation $C(x1,x1)$ of the state x1, it will be as follows:

$$\frac{C([Dw]_1, x_1)}{C(x_1, x_1)} = \Delta a_{11} + \Delta a_{12} \frac{C(x_1, x_2)}{C(x_1, x_1)} \quad \text{[Formula 118]}$$

However, since there exists a correlation between the states x1 and x2, the second term of right hand side of the foregoing equation will not be zero.

In this case, even if the correlation $C(x1,x2)$ between the states x1 and x2 were previously obtained, compensation could not have been made as $\Delta a_{12}$ cannot be known. In other words, as long as $\Delta a_{12}$ is not zero, it is impossible to obtain $\Delta a_{11}$ accurately.

Consequently, Formula 26 is rewritten as follows:

[Formula 119]

$$[Dw]_1 = [\Delta a_{11} \; \Delta a_{12} \ldots] \begin{bmatrix} x_1 \\ x_2 \\ \ldots \end{bmatrix} + d_1$$

$$= \Delta a^T x + d_1$$

where, $$\Delta a^T = [\Delta a_{11} \; \Delta a_{12} \ldots]$$

$$x = \begin{bmatrix} x_1 \\ x_2 \\ \ldots \end{bmatrix}$$

Δa such as to minimize a squared error index expressed by the following equation is obtained:

$$I_1(\Delta a) = \sum_{k=1}^{N} (\Delta a^T x(k) - [Dw]_1(k))^2 \quad \text{[Formula 120]}$$

The foregoing equation is partial-differentiated by Δa and the result is made zero.

$$\Delta a = \left\{ \sum_{k=1}^{N} x(k)x^T(k) \right\}^{-1} \left\{ \sum_{k=1}^{N} x(k)[Dw]_1(k) \right\} \quad \text{[Formula 121]}$$

This method is characterized in that not only $\Delta a_{11}$ but also the other change of the system are simultaneously obtained as the change vector Δa.

Formulae 119, 120, 121 correspond to Formulae 112, 113, 114.

Another advantage of this method is that the correlation between the states are automatically canceled. For example, if:

$$[Dw]_1 = [\Delta a_{11} \ \Delta a_{12}] \begin{bmatrix} x_1 \\ x_2 \end{bmatrix} + d_1 \quad \text{[Formula 122]}$$

$$= \Delta a^T x + d_1$$

each term of right side of Formula 121 is expressed as follows:

$$\sum_{k=1}^{N} x(k)x^T(k) = N \begin{bmatrix} C(x_1, x_1) & C(x_1, x_2) \\ C(x_1, x_2) & C(x_2, x_2) \end{bmatrix} \quad \text{[Formula 123]}$$

$$\sum_{k=1}^{N} x(k)[Dw]_1(k) = N \begin{bmatrix} \Delta a_{11} C(x_1, x_1) + \Delta a_{12} C(x_1, x_2) \\ \Delta a_{11} C(x_1, x_2) + \Delta a_{12} C(x_2, x_2) \end{bmatrix}$$

If the right side of Formula 121 is calculated,

[Formula 124]

$$\left\{ \sum_{k=1}^{N} x(k)x^T(k) \right\}^{-1} \left\{ \sum_{k=1}^{N} x(k)[Dw]_1(k) \right\}$$

$$= \frac{\begin{bmatrix} C(x_2, x_2) & -C(x_1, x_2) \\ -C(x_1, x_2) & C(x_1, x_1) \end{bmatrix}}{C(x_1, x_1)C(x_2, x_2) - C(x_1, x_2)^2} \begin{bmatrix} \Delta a_{11} C(x_1, x_1) + \Delta a_{12} C(x_1, x_2) \\ \Delta a_{11} C(x_1, x_2) + \Delta a_{12} C(x_2, x_2) \end{bmatrix}$$

$$= \frac{\begin{bmatrix} \Delta a_{11}\{C(x_1, x_1)C(x_2, x_2) - C(x_1, x_2)^2\} + \Delta a_{12}\{C(x_2, x_2)C(x_1, x_2) - C(x_1, x_2)C(x_2, x_2)\} \\ \Delta a_{11}\{-C(x_1, x_2)C(x_1, x_1) + C(x_1, x_1)C(x_1, x_2)\} + \Delta a_{12}\{-C(x_1, x_2)^2 + C(x_1, x_1)C(x_2, x_2)\} \end{bmatrix}}{C(x_1, x_1)C(x_2, x_2) - C(x_1, x_2)^2}$$

$$= \begin{bmatrix} \Delta a_{11} \\ \Delta a_{12} \end{bmatrix}$$

the terms containing the correlation $C(x_1, x_2)$ between the states are canceled so that the changes $\Delta a_{11}$, $\Delta a_{12}$ of the system are obtained simultaneously.

By such operation, a least square method calculating part 134 estimates the change of the system, based on the right side of Formula 121, and outputs the result to the diagnosing part.

Further, in Formula 121, an inverse matrix must be calculated; when the order of matrix is high, large memory and the calculating time are required to calculate the inverse matrix. But this can be avoided using an asymptotic equation expressed by the following:

$$\sum_{k=1}^{N} x(k)x^T(k) = \Gamma^{-1}(N) \quad \text{[Formula 125]}$$

From the foregoing equation, Formula 121 is rewritten as follows:

[Formula 126]

$$\begin{cases} \Gamma(N) = \Gamma(N-1) - \dfrac{\Gamma(N-1)x(N)x^T(N)\Gamma(N-1)}{1 + x^T(N)\Gamma(N-1)x(N)} \\ \Delta a(N) = \Delta a(N-1) - \dfrac{\Gamma(N-1)x(N)}{1 + x^T(N)\Gamma(N-1)x(N)} e(N) \end{cases}$$

where, $e(N) = x^T(N)\Delta a(N-1) - [Dw]_1(N)$

Formula 126 corresponds to Formula 115.

In the method of Formula 126, the asymptotic equation is initialized as follows:

[Formula 127]

$$I(0) = \gamma I (\gamma \gg 1), \Delta a = 0$$

and calculation is started from N=0. In this method, since it is unnecessary to calculate the inverse matrix, it is possible to reduce the calculating time and the size of memory for the high degree of matrix, as compared to the method of calculating Formula 121 directly.

Formula 120 as error index is substituted by the following:

$$I_2(\Delta a) = \sum_{k=1}^{N} \lambda^{N-k} (\Delta a^T x(k) - [Dw]_1(k))^2, \quad \text{[Formula 128]}$$

$$0 < \lambda < 1$$

the following asymptotic equation can be obtained:

$$\begin{cases} \Gamma(N) = \frac{1}{\lambda}\left[\Gamma(N-1) - \frac{\Gamma(N-1)x(N)x^T(N)\Gamma(N-1)}{\lambda + x^T(N)\Gamma(N-1)x(N)}\right] \\ \Delta a(N) = \Delta a(N-1) - \frac{\Gamma(N-1)x(N)}{\lambda + x^T(N)\Gamma(N-1)x(N)} e(N) \end{cases}$$ [Formula 129]

where, $e(N) = x^T(N)\Delta a(N-1) - [Dw]_1(N)$

In Formula 129, $\lambda$ is called a "forgetting factor". This method is to obtain the change of the system giving a small weight on old data. This method converges quickly compared to Formula 126 and is effective when the change of the system varies well with time.

Figure 38:
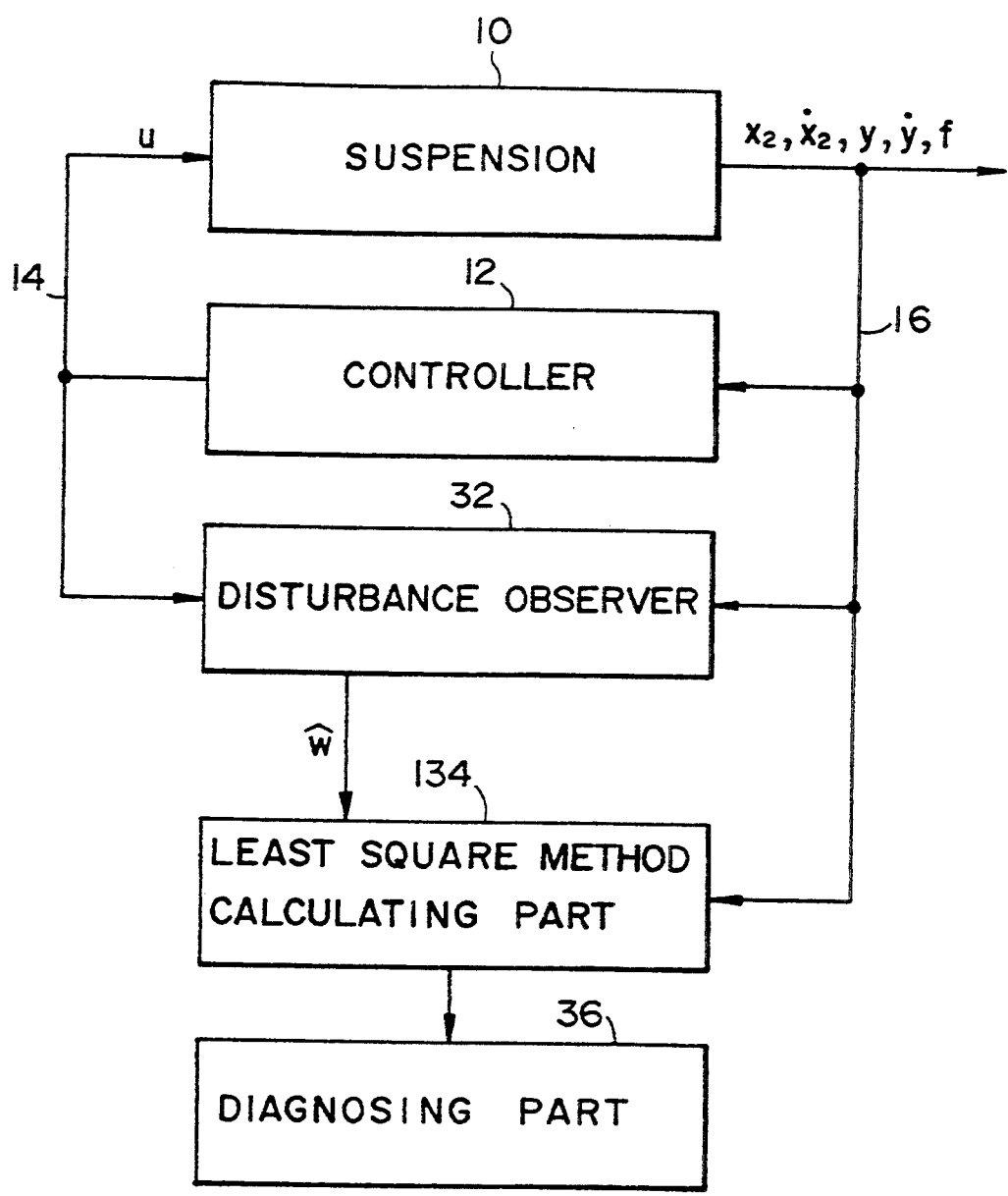
FIG. 38 is a block diagram showing a practical form of the apparatus according to the fifteenth embodiment.

An embodiment in which this invention is applied to the dynamic system of FIG. 3 will now be described. FIG. 38 is a block diagram showing this embodiment. In this embodiment, like the first embodiment, an abnormality of the tire air pressure, a pressure abnormality of the gas spring 46, a fault of the damper 48 are assumed as faults. At that time, as already mentioned, the state equation of the dynamic system is expressed by Formula 15, the integrated disturbance estimated by the disturbance observer 32 when a fault occurs is expressed by Formula 18.

In the least square method calculating part 134, using $$\Delta a = \left\{\sum_{k=1}^{N} x(k)x^T(k)\right\}^{-1} \left\{\sum_{k=1}^{N} x(k)\hat{w}_2(k)\right\}$$ [Formula 131]

or an asymptotic equation corresponding to Formula 131, the change quantity expressed by the following equation:

$$\Delta a^T = \left[\frac{\Delta k_1}{m_1} + \frac{\Delta k_2}{m_1} + \frac{\Delta k_2}{m_2} - \Delta Dmb - \frac{\Delta k_1}{m_1}\right]$$ [Formula 132]

can be obtained based on the following:

$$\hat{w}_2 = \left[\frac{\Delta k_1}{m_1} + \frac{\Delta k_2}{m_1} + \frac{\Delta k_2}{m_2} - \Delta Dmb - \frac{\Delta k_1}{m_1}\right]\begin{bmatrix} y \\ \dot{y} \\ x_2 \end{bmatrix} + \frac{k_1 + \Delta k_1}{m_1}x_0$$

$$= \Delta a^T x + \frac{k_1 + \Delta k_1}{m_1}x_0$$ [Formula 130]

where, $$\Delta a^T = \left[\frac{\Delta k_1}{m_1} + \frac{\Delta k_2}{m_1} + \frac{\Delta k_2}{m_2} - \Delta Dmb - \frac{\Delta k_1}{m_1}\right]$$

$$x = \begin{bmatrix} y \\ \dot{y} \\ x_2 \end{bmatrix}$$

Further, using $$\Delta a = \left\{\sum_{k=1}^{N} x(k)x^T(k)\right\}^{-1} \left\{\sum_{k=1}^{N} x(k)\hat{w}_4(k)\right\}$$ [Formula 134]

or an asymptotic equation corresponding to Formula 134, the change quantity expressed by the following equation:

$$\Delta a^T = \left[\frac{\Delta k_2}{m_2} \quad \frac{\Delta Dm}{m_2}\right]$$ [Formula 135]

can be obtained based on the following:

$$\hat{w}_4 = \left[\frac{\Delta k_2}{m_2} \quad \frac{\Delta Dm}{m_2}\right]\begin{bmatrix} y \\ \dot{y} \end{bmatrix}$$

$$= \Delta a^T x$$ [Formula 133]

where, $$\Delta a^T = \left[\frac{\Delta k_2}{m_2} \quad \frac{\Delta Dm}{m_2}\right]$$

$$x = \begin{bmatrix} y \\ \dot{y} \end{bmatrix}$$

From these $\Delta a$, it is possible to obtain $\Delta k_1$, $\Delta k_2$, $\Delta Dm$.

In this embodiment, the description is made in connection with an active suspension when u is not zero. This invention can be applied also to passive suspension when u is zero.

What is claimed is:

1. A diagnosing apparatus for diagnosing a dynamic system by detecting a fault of the dynamic system, comprising:
   (a) disturbance estimating means for estimating an integrated disturbance vector, which is the sum of external and internal disturbance vectors of the dynamic system, based on an internal state vector of the dynamic system;
   (b) correlation calculating means, coupled to said disturbance estimating means for receiving outputs thereof, and for calculating a cross-correlation between the estimated integrated disturbance vector and the internal state vector and for separating from the integrated disturbance vector a component relating to the internal disturbance; and
   (c) diagnosing means, coupled to said correlation calculating means for receiving an output thereof, and for specifying and diagnosing a corresponding fault portion of the dynamic system from the separated component relating to the internal disturbance.

2. A diagnosing apparatus according to claim 1, wherein said diagnosing means includes:
   a memory means for storing a predetermined fault detecting standard value corresponding to each element of the component relating to the internal disturbance; and
   a fault specifying means for comparing each element of the separated component relating to the internal disturbance with the corresponding fault detecting standard value and for specifying the fault portion of the dynamic system.

3. A diagnosing apparatus according to claim 1, further comprising a sensor for measuring all or part of the elements of the internal state vector of the dynamic system.

4. A diagnosing apparatus according to claim 1, wherein said disturbance estimating means comprises means for estimating and calculating all or part of the elements of the internal state vector of the dynamic system.

5. A diagnosing apparatus according to claim 1, wherein said correlation calculating means comprises means for calculating a cross-correlation between a plurality of elements of the estimated integrated disturbance vector and an element uncorrelated with the external disturbance in the internal state vector and for separating the elements of the integrated disturbance vector, elements of components relating to the internal disturbance, and said diagnosing means comprises means for specifying the fault portion of the dynamic system from the elements of the separated component relating to the internal disturbance.

6. A diagnosing apparatus according to claim 5, wherein said diagnosing means includes:
   a memory means for storing a predetermined fault detecting standard value corresponding to each element of the component relating to the internal disturbance; and
   a fault specifying means for comparing each element of the separated component relating to the internal disturbance with the corresponding fault detecting standard value and for specifying the fault portion of the dynamic system.

7. A diagnosing apparatus according to claim 5, further comprising a sensor for measuring all or part of the elements of the internal state vector of the dynamic system.

8. A diagnosing apparatus according to claim 5, wherein said disturbance estimating means comprises means for estimating and calculating all or part of the elements of the internal state vector of the dynamic system.

9. A diagnosing apparatus according to claim 1, wherein said correlation calculating means comprises means for calculating a correlation between an element of the integrated disturbance vector and an element uncorrelated with the external disturbance in the internal state vector and for separating from the element of the integrated disturbance vector a component relating to the internal disturbance.

10. A diagnosing apparatus according to claim 9, wherein said correlation calculating means comprises means for calculating a cross-correlation between a plurality of elements of the estimated integrated disturbance vector and an element uncorrelated with the external disturbance in the internal state vector and for separating from the elements of the integrated disturbance vector, elements of components relating to the internal disturbance, and said diagnosing means comprises means for specifying the fault portion of the dynamic system from the elements of the separated component relating to the internal disturbance.

11. A diagnosing apparatus according to claim 9, wherein said diagnosing means includes:
    a memory means for storing a predetermined fault detecting standard value corresponding to each element of the component relating to the internal disturbance; and
    a fault specifying means for comparing each element of the separated component relating to the internal disturbance with the corresponding fault detecting standard value and for specifying the fault portion of the dynamic system.

12. A diagnosing apparatus according to claim 9, further comprising a sensor for measuring all or part of the elements of the internal state vector of the dynamic system.

13. A diagnosing apparatus according to claim 9, wherein said disturbance estimating means comprises means for estimating and calculating all or part of the elements of the internal state vector of the dynamic system.

14. A diagnosing apparatus according to claim 1, wherein said correlation calculating means comprises means for calculating the calculation of the cross-correlation by calculating a direction vector of the integrated disturbance, with the internal state vector as a base vector, in such a manner that the time-related sum of the square of an error between the integrated disturbance vector, and the product of the internal disturbance vector and the internal state vector is minimal and for separating from the element of the integrated disturbance vector a component relating to the internal disturbance.

15. A diagnosing apparatus according to claim 14, wherein said correlation calculating means comprises means for calculating a cross-correlation between a plurality of elements of the estimated integrated disturbance vector and an element uncorrelated with the external disturbance in the internal state vector and for separating from the elements of the integrated disturbance vector, elements of components relating to the internal disturbance, and said diagnosing means comprises means for specifying the fault portion of the dynamic system from the elements of the separated component relating to the internal disturbance.

16. A diagnosing apparatus according to claim 14, wherein said diagnosing means includes:
    a memory means for storing a predetermined fault detecting standard value corresponding to each element of the component relating to the internal disturbance; and
    a fault specifying means for comparing each element of the separated component relating to the internal disturbance with the corresponding fault detecting standard value and for specifying the fault portion of the dynamic system.

17. A diagnosing apparatus according to claim 14, further comprising a sensor for measuring all or part of the elements of the internal state vector of the dynamic system.

18. A diagnosing apparatus according to claim 14, wherein said disturbance estimating means comprises means for estimating and calculating all or part of the elements of the internal state vector of the dynamic system.

19. A tire air pressure diagnosing apparatus for diagnosing the state of a tire air pressure of a dynamic system comprising a suspension and a wheel, comprising:
    (a) disturbance estimating means for estimating an integrated disturbance vector, which is the sum of an internal disturbance vector caused by a change of the tire air pressure in the dynamic system and an external disturbance vector to be inputted to the dynamic system from the road surface, based on an internal state vector of the dynamic system;

(b) correlation calculating means, coupled to said disturbance estimating means for receiving outputs thereof, and for calculating a cross-correlation between the estimated integrated disturbance vector and said internal state vector and for separating from the integrated disturbance vector a component relating to the internal disturbance; and (c) diagnosing means, coupled to said correlation calculating means for receiving an output thereof, and for specifying the state of the tire air pressure of the dynamic system from the separated component relating to the internal disturbance.

20. A tire air pressure diagnosing apparatus according to claim 19, wherein said diagnosing means includes an auto-correlation calculating means for calculating an auto-correlation of an element uncorrelated with the external disturbance in the internal state vector, and diagnoses the state of the tire air pressure based on the cross-correlation value and the auto-correlation value.

21. A tire air pressure diagnosing apparatus according to claim 19, wherein said correlation calculating means comprises means for calculating a correlation between an element of the integrated disturbance vector and an element uncorrelated with the external disturbance in the internal state vector and for separating from the element of the integrated disturbance vector a component relating to the internal disturbance.

22. A tire air pressure diagnosing apparatus according to claim 21, wherein said diagnosing means includes an auto-correlation calculating means for calculating an auto-correlation of an element uncorrelated with the external disturbance in the internal state vector, and diagnoses the state of the tire air pressure based on the cross-correlation value and the auto-correlation value.

23. A tire air pressure diagnosing apparatus according to claim 19, wherein said correlation calculating means comprises means for executing the calculation of the cross-correlation by calculating a direction vector of the integrated disturbance, with the internal state vector as a base vector, in such a manner that the time-related sum of the square of an error between the integrated disturbance vector, and the product of the internal disturbance vector and the internal state vector is minimal and for separating from the element of the integrated disturbance vector a component relating to the internal disturbance.

24. A tire air pressure diagnosing apparatus according to claim 23, wherein said diagnosing means includes an auto-correlation calculating means for calculating an auto-correlation of an element uncorrelated with the external disturbance in the internal state vector, and diagnoses the state of the tire air pressure based on the cross-correlation value and the auto-correlation value.

25. A diagnosing apparatus for diagnosing a dynamic system by detecting a fault of the dynamic system, comprising:

(a) disturbance estimating means for estimating an integrated disturbance vector, which is the sum of external and internal disturbance vectors of the dynamic system, based on an internal state vector of the dynamic system;

(b) compensation value storing means for storing a correlation between the internal state vector in a predetermined standard state and the external disturbance vector as a compensation value;

(c) correlation calculating means, coupled to said disturbance estimating means, for calculating a cross-correlation between the estimated integrated disturbance vector and said internal state vector and for separating from the integrated disturbance vector a component relating to the internal disturbance, without any influence by the external disturbance;

(d) correlation compensating means, coupled to said compensation value storing means and to said correlation calculating means for receiving an output thereof, and for compensating said component relating to the internal disturbance separated by said correlation calculating means, based on the internal state vector and the compensation value stored in said compensation value storing means; and (e) diagnosing means, coupled to said correlation compensating means for receiving an output thereof, and for specifying and diagnosing a corresponding fault portion of the dynamic system from the component relating to the internal disturbance compensated by said correlation compensating means.

26. A tire air pressure diagnosing apparatus for diagnosing the state of a tire air pressure of a dynamic system comprising a suspension and a wheel, comprising:

(a) disturbance estimating means for estimating an integrated disturbance vector, which is the sum of an internal disturbance vector caused by a change of the tire air pressure in the dynamic system and an external disturbance vector to be inputted to the dynamic system from the road surface, based on an internal state vector of the dynamic system;

(b) compensation value storing means for storing a correlation between the internal state vector in a predetermined standard state and an external disturbance vector as a compensation value;

(c) correlation calculating means, coupled to said disturbance estimating means, for calculating a cross-correlation between the estimated integrated disturbance vector and said internal state vector and for separating from the integrated disturbance vector a component relating to the internal disturbance, without any influence by the external disturbance;

(d) correlation compensating means, coupled to said compensation value storing means and to said correlation calculating means for receiving an output thereof, and for compensating said component relating to the internal disturbance separated by said correlation calculating means, based on the internal state vector and the compensation value stored in said compensation value storing means; and (e) diagnosing means, coupled to said correlation compensating means for receiving an output thereof, and for specifying the state of the tire air pressure of the dynamic system from the component relating to the internal disturbance compensated by said correlation compensating means.

27. A vehicle body weight change detecting apparatus for diagnosing a change in vehicle body weight of a dynamic system comprising a suspension and a wheel, comprising:

(a) disturbance estimating means for estimating an integrated disturbance vector, which is the sum of an internal disturbance vector caused by the change in vehicle body weight of the dynamic system and an external disturbance vector to be inputted to the dynamic system from the road surface, based on an internal state vector of the dynamic system;

(b) correlation calculating means, coupled to said disturbance estimating means, for calculating a cross-correlation between the estimated integrated disturbance vector and said internal state vector and for separating from the integrated disturbance vector a component relating to the internal disturbance; and (c) detecting means, coupled to said disturbance estimating means and said correlation calculating means for detecting the change in vehicle body weight in the dynamic system from the separated component relating to the internal disturbance.

28. A vehicle body weight detecting apparatus according to claim 27, wherein said correlation calculating means comprises means for calculating a correlation between an element of the integrated disturbance vector and an element uncorrelated with the external disturbance in the internal state vector and for separating from the element of the integrated disturbance vector a component relating to the internal disturbance.

29. A vehicle body weight change detecting apparatus according to claim 27, wherein said correlation calculating means comprises means for executing the calculation of the cross-correlation by calculating a direction vector of the integrated disturbance, with the internal state vector as a base vector, in such a manner that the time-related sum of the square of an error between the integrated disturbance vector, and the product of the internal disturbance vector and the internal state vector is minimal and for separating from the element of the integrated disturbance vector a component relating to the internal disturbance.

30. A vehicle body weight change detecting apparatus for diagnosing a change in vehicle body weight of a dynamic system comprising a suspension and a wheel, comprising:

(a) disturbance estimating means for estimating an integrated disturbance vector, which is the sum of an internal disturbance vector caused by the change in vehicle body weight of the dynamic system and an external disturbance vector to be inputted to the dynamic system from the road surface, based on an internal state vector of the dynamic system;

(b) compensation value storing means for storing a correlation between the internal state vector in a predetermined standard state and an external disturbance vector as a compensation value;

(c) correlation calculating means, coupled to said disturbance estimating means, for calculating a cross-correlation between the estimated integrated disturbance vector and said internal state vector and for separating from the integrated disturbance vector a component relating to the internal disturbance, without any influence by the external disturbance;

(d) correlation compensating means, coupled to said compensation value storing means for receiving an output thereof, and for compensating said component relating to the internal disturbance separated by said correlation calculating means, based on the internal state vector and the compensation value stored in said compensation value storing means; and (e) detecting means, coupled to said disturbance estimating means and said correlation calculating means for detecting the change in vehicle body weight in the dynamic system from the separated component relating to the internal disturbance compensated by said correlation compensating means.

* * * * *